US010454829B2

(12) United States Patent
Ishii et al.

(10) Patent No.: US 10,454,829 B2
(45) Date of Patent: Oct. 22, 2019

(54) ENHANCED LOCAL ACCESS IN MOBILE COMMUNICATIONS USING SMALL NODE DEVICES

(71) Applicant: NTT DOCOMO, INC., Tokyo (JP)

(72) Inventors: Hiroyuki Ishii, Palo Alto, CA (US); Sean A. Ramprashad, Palo Alto, CA (US); Sayandev Mukherjee, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 15/470,262

(22) Filed: Mar. 27, 2017

(65) Prior Publication Data

US 2017/0272364 A1    Sep. 21, 2017

Related U.S. Application Data

(63) Continuation of application No. 14/118,826, filed as application No. PCT/US2012/040288 on May 31, 2012.

(Continued)

(51) Int. Cl.
*H04L 12/801* (2013.01)
*H04W 28/02* (2009.01)
(Continued)

(52) U.S. Cl.
CPC ......... *H04L 47/12* (2013.01); *H04W 28/0289* (2013.01); *H04W 28/08* (2013.01);
(Continued)

(58) Field of Classification Search
CPC ............. H04W 36/04; H04W 36/0061; H04W 84/045; H04W 24/02; H04W 76/02;
(Continued)

(56) References Cited

U.S. PATENT DOCUMENTS 6,829,479 B1   12/2004  Chang et al.
8,493,887 B2    7/2013  Palanki et al.
(Continued)

FOREIGN PATENT DOCUMENTS

CN    102025403 A    4/2011
CN    102067715 A    5/2011
(Continued)

OTHER PUBLICATIONS

Office Action issued in corresponding Korean Application No. 10-2014-7000053, dated Jan. 18, 2018 (30 pages).
(Continued)

*Primary Examiner* — Jung Liu
(74) *Attorney, Agent, or Firm* — Osha Liang LLP

(57) ABSTRACT

A network device in a wireless communication system includes a first communication circuit that receives a first control-plane message from a base station (BS) over a first communication link; a second communication circuit that transmits user-plane data to a user equipment (UE) over a second communication link established responsive to the first control-plane message; and a third communication circuit that receives the user-plane traffic data from a server over a third communication link. The UE communicates user-plane data with the BS and the network device simultaneously at a predetermined time. The first communication circuit receives a second control-plane message from the BS. The second communication circuit transmits a pilot signal to the UE responsive to the second control-plane message to enable the UE to measure a radio link quality of the second communication link using the pilot signal. The second communication link is maintained, at least in part, based on the radio link quality of the second communication link.

9 Claims, 36 Drawing Sheets

Related U.S. Application Data

(60) Provisional application No. 61/533,382, filed on Sep. 12, 2011, provisional application No. 61/512,132, filed on Jul. 27, 2011, provisional application No. 61/505,955, filed on Jul. 8, 2011, provisional application No. 61/503,975, filed on Jul. 1, 2011, provisional application No. 61/502,023, filed on Jun. 28, 2011, provisional application No. 61/500,426, filed on Jun. 23, 2011, provisional application No. 61/492,321, filed on Jun. 1, 2011.

(51) Int. Cl.
*H04W 28/08* (2009.01)
*H04W 52/24* (2009.01)
*H04W 52/38* (2009.01)
*H04W 76/14* (2018.01)
*H04W 76/15* (2018.01)
*H04W 36/00* (2009.01)

(52) U.S. Cl.
CPC ..... *H04W 36/0069* (2018.08); *H04W 52/242* (2013.01); *H04W 52/383* (2013.01); *H04W 76/14* (2018.02); *H04W 76/15* (2018.02)

(58) Field of Classification Search
CPC ....... H04W 8/04; H04W 88/06; H04W 47/12; H04W 28/0289; H04W 76/023
See application file for complete search history.

(56) References Cited

U.S. PATENT DOCUMENTS

| | | | |
|---|---|---|---|
| 2002/0089949 A1 | 7/2002 | Bjelland et al. | |
| 2005/0213538 A1 | 9/2005 | Ebiko et al. | |
| 2006/0172742 A1 | 8/2006 | Chou et al. | |
| 2007/0097938 A1* | 5/2007 | Nylander | H04L 61/1511 370/338 |
| 2007/0109962 A1 | 5/2007 | Leng et al. | |
| 2008/0076425 A1* | 3/2008 | Khetawat | H04W 88/12 455/436 |
| 2009/0059790 A1 | 3/2009 | Calvert et al. | |
| 2009/0232019 A1 | 9/2009 | Gupta et al. | |
| 2009/0285166 A1* | 11/2009 | Huber | G06Q 20/1235 370/329 |
| 2009/0305699 A1* | 12/2009 | Deshpande | H04W 48/02 455/434 |
| 2009/0310554 A1 | 12/2009 | Sun et al. | |
| 2009/0310561 A1 | 12/2009 | Grob et al. | |
| 2010/0027471 A1 | 2/2010 | Palanki et al. | |
| 2010/0027510 A1* | 2/2010 | Balasubramanian, Sr. | H04W 48/18 370/332 |
| 2010/0054237 A1* | 3/2010 | Han | H04J 3/0638 370/350 |
| 2010/0056160 A1 | 3/2010 | Kim et al. | |
| 2010/0128697 A1 | 5/2010 | Choi-Grogan | |
| 2010/0135251 A1 | 6/2010 | Sambhwani et al. | |
| 2010/0137016 A1* | 6/2010 | Voyer | H04W 52/46 455/522 |
| 2010/0149347 A1 | 6/2010 | Kim et al. | |
| 2010/0195562 A1 | 8/2010 | Ishizu et al. | |
| 2010/0197298 A1* | 8/2010 | So | H04W 24/10 455/424 |
| 2010/0197309 A1* | 8/2010 | Fang | H04W 36/04 455/436 |
| 2010/0234023 A1* | 9/2010 | Bae | H04W 76/12 455/434 |
| 2010/0265867 A1 | 10/2010 | Becker et al. | |
| 2010/0322146 A1 | 12/2010 | Liu et al. | |
| 2010/0323745 A1 | 12/2010 | Chen et al. | |
| 2011/0003597 A1 | 1/2011 | Budic et al. | |
| 2011/0019634 A1 | 1/2011 | Fujii et al. | |
| 2011/0044244 A1 | 2/2011 | Etemad | |
| 2011/0075557 A1 | 3/2011 | Chowdhury et al. | |
| 2011/0075675 A1 | 3/2011 | Koodli et al. | |
| 2011/0076985 A1 | 3/2011 | Chami et al. | |
| 2011/0103337 A1* | 5/2011 | Bryant | G04G 7/02 370/329 |
| 2011/0158171 A1* | 6/2011 | Centonza | H04L 12/2856 370/328 |
| 2011/0170517 A1* | 7/2011 | Bakker | H04W 36/0033 370/331 |
| 2011/0171949 A1* | 7/2011 | Liao | H04W 56/0045 455/422.1 |
| 2011/0188481 A1* | 8/2011 | Damnjanovic | H04W 72/04 370/336 |
| 2011/0237231 A1 | 9/2011 | Horneman et al. | |
| 2011/0250892 A1* | 10/2011 | Gupta | H04W 36/0011 455/437 |
| 2011/0300872 A1 | 12/2011 | Lim et al. | |
| 2012/0015660 A1* | 1/2012 | Kawaguchi | H04W 36/0061 455/438 |
| 2012/0183141 A1 | 7/2012 | Hapsari et al. | |
| 2012/0207105 A1* | 8/2012 | Geirhofer | H04L 5/0032 370/329 |
| 2012/0236977 A1* | 9/2012 | Zou | H04W 56/0015 375/354 |
| 2012/0282864 A1* | 11/2012 | Dimou | H04W 36/22 455/67.14 |
| 2012/0309394 A1* | 12/2012 | Radulescu | H04W 28/18 455/436 |
| 2013/0188604 A1* | 7/2013 | Chin | H04W 36/08 370/331 |
| 2014/0079026 A1 | 3/2014 | Dimou et al. | |
| 2014/0161055 A1 | 6/2014 | Chitrapu et al. | |
| 2014/0198655 A1* | 7/2014 | Ishii | H04W 28/0289 370/235 |
| 2014/0349659 A1* | 11/2014 | Ishii | H04W 76/10 455/444 |
| 2015/0017993 A1* | 1/2015 | Ishii | H04W 36/0011 455/444 |

FOREIGN PATENT DOCUMENTS

| | | |
|---|---|---|
| JP | H08-307934 A | 11/1996 |
| JP | 20047279 A | 1/2004 |
| JP | 2006-094388 A | 4/2006 |
| JP | 2007-096862 A | 4/2007 |
| JP | 2010258600 A | 11/2010 |
| JP | 2011015317 A | 1/2011 |
| JP | 2011-523329 A | 8/2011 |
| KR | 1020100102339 | 9/2010 |
| KR | 1020110039480 | 4/2011 |
| WO | 2010002100 A2 | 1/2010 |
| WO | 2010/013150 A2 | 2/2010 |
| WO | 2010/027308 A1 | 3/2010 |
| WO | 2011/041623 A1 | 4/2011 |
| WO | 2012/134567 A1 | 10/2012 |
| WO | 2012/166975 A1 | 12/2012 |
| WO | 2013/055430 A2 | 4/2013 |

OTHER PUBLICATIONS

Office Action issued in the counterpart Japanese Patent Application No. 2017-015417, dated Feb. 13, 2018 (17 pages).
3GPP TSG-RAN WG4 Meeting #58, R4-111298, Taipei, Taiwan, Feb. 21-25, 2011, "Handling of 3.4-3.6 GHz FDD Duplex GAP," 4 pages.
International Search Report issued in PCT/US2012/054856, dated Feb. 11, 2013 (4 pages).
Written Opinion issued in PCT/US2012/054856, dated Feb. 11, 2013 (8 pages).
Extended European Search Report issued in corresponding EP Application No. 12831801.1, dated Jun. 17, 2015 (8 pages).
3GPP TR 23.829 V10.0.0, Mar. 2011, "Local IP Access and Selected IP Traffic Offload," 43 pages.
International Search Report issued in PCT/US2012/054912, dated Jan. 11, 2013 (3 pages).

(56) References Cited

OTHER PUBLICATIONS

Written Opinion issued in corresponding Application No. PCT/US2012/054912, dated Jan. 11, 2013 (11 pages).
Extended European Search Report issued in corresponding EP Application No. 12831966.2, dated Jun. 15, 2015 (9 pages).
International Search Report issued in corresponding Application No. PCT/US2012/040279, dated Aug. 27, 2012 (2 pages).
Written Opinion issued in corresponding Application No. PCT/US2012/040279, dated Aug. 27, 2012 (12 pages).
Extended European Search Report in counterpart European Application No. 12794051.8 dated Apr. 22, 2015 (9 pages).
International Search Report for corresponding International Application No. PCT/US2012/040288, dated Sep. 7, 2012 (2 pages).
Written Opinion for corresponding International Application No. PCT/US2012/040288, dated Sep. 7, 2012 (6 pages).
Extended European Search Report in counterpart European Application No. 12 79 2917 dated Apr. 29, 2015 (9 pages).
LG Electronics Inc.; "Measurement Restriction for Macro-Pico Scenario"; 3GPP TSG-RAN2 Meeting #72, R2-106579; Jacksonville, Florida; Nov. 5-19, 2010 (3 pages).
3GPP TS 36.331 V10.1.0, Mar. 2011, "Protocol specification," (290 pages).
3GPP TS 36.101 V10.2.0, Mar. 2011, "User Equipment (UE) radio transmission and reception," (225 pages).
3GPP TS 36.211 V10.1.0, Mar. 2011, "Physical Channels and Modulation," (103 pages).
3GPP TS 36.213 V11.1.0, Dec. 2012, "Physical layer procedures," (160 pages).
Extended European Search Report in counterpart European Application No. 12 83 1966.2 dated Oct. 12, 2015 (24 pages).
3GPP TS 25.331 V10.4.0; "3rd Generation Partnership Project; Technical Specification Group Radio Access Network; Radio Resource Control (RRC); Protocol specification (Release 10)"; Jun. 2011 (1879 pages).
Office Action in counterpart Japanese Patent Application No. 2014-513711 dated Mar. 8, 2016 (6 pages).
Final Office Action issued in related U.S. Appl. No. 14/344,492, dated Jan. 22, 2016 (25 pages).
First Office Action issued in corresponding Chinese Application No. 201280038695.1, dated Nov. 18, 2016 (37 pages).
Notification of Reasons for Refusal issued in corresponding Japanese Application No. 2014-530752, dated Aug. 9, 2016 (9 pages).
Final Office Action issued in related U.S. Appl. No. 14/118,473, dated Feb. 1, 2016 (63 pages).
Office Action in counterpart Japanese Patent Application No. 2014-513714 dated Apr. 19, 2016 (18 pages).
Office Action dated Apr. 18, 2017, in corresponding European Patent Application No. 12792917.2 (5 pages).
Office Action issued in the counterpart Chinese Patent Application No. 201280038695.1, dated Jan. 17, 2018 (52 pages).

* cited by examiner

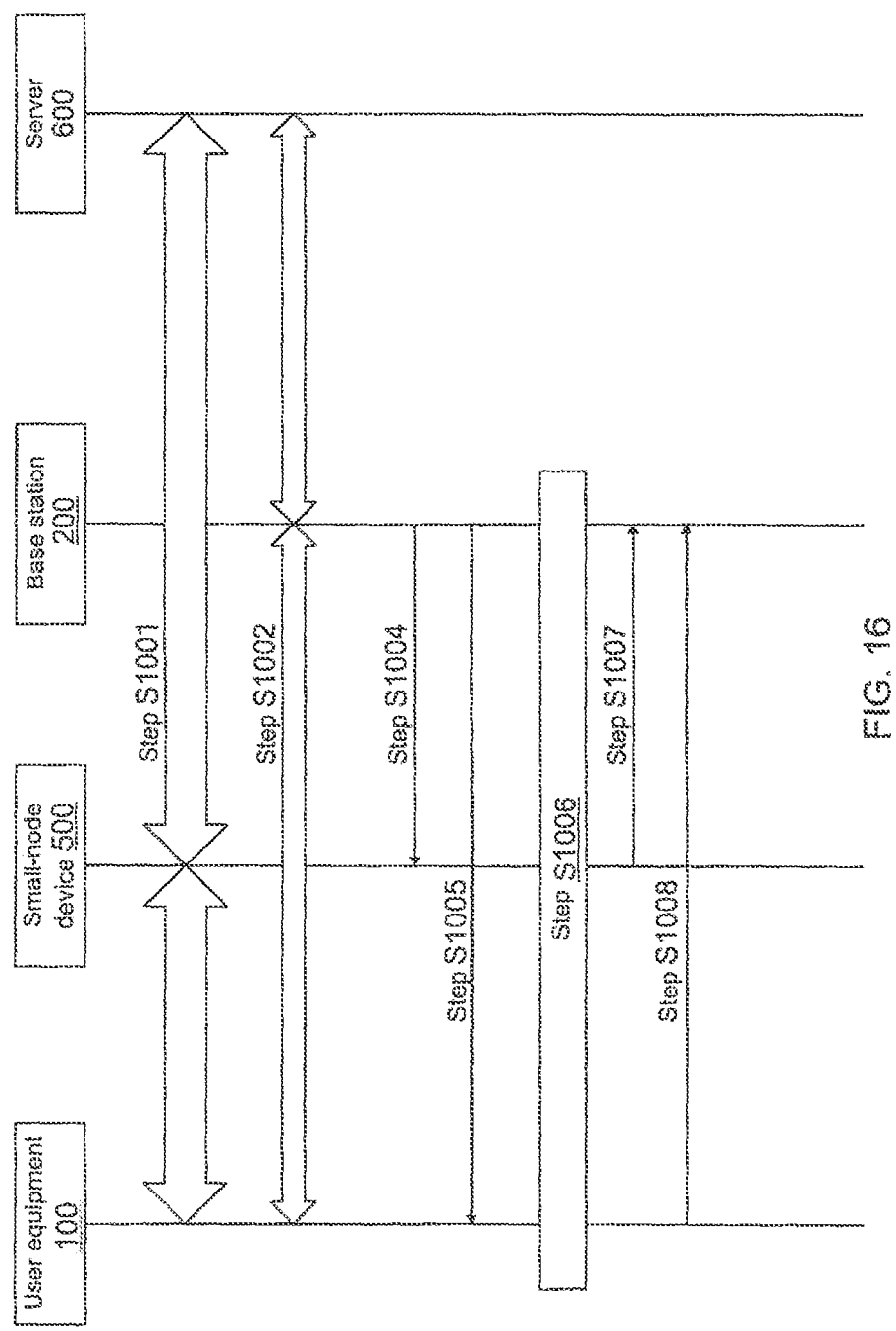

| Index | Measurement item | Note |
|---|---|---|
| #0 | Number of D2UE connections | |
| #1 | Amount of radio resource in D2UE connections | |
| #2 | Data rate in D2UE connections | |
| #3 | Success rate of D2UE connection establishment | |
| #4 | Success rate of handover in D2UE connections | |
| #5 | Success rate of connection re-establishment in D2UE connections | |
| #6 | Number of Handover in D2UE connections | |
| #7 | Number of radio link failures | |
| #8 | Number of connection re-establishment | |

FIG. 27A

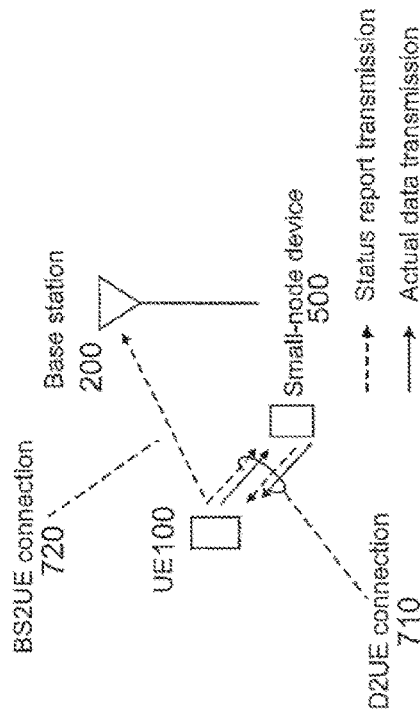

FIG. 27B

| Index | Measurement item | Note |
|---|---|---|
| #A0 | Usage rate of CPU (Central processing unit) | |
| #A1 | Usage rate of memory | |
| #A2 | Usage rate of buffer | |
| #A3 | Usage rate of base band processing | |
| #A4 | Amount of radio resource in D2UE connections | |
| #A5 | Usage rate of backhaul link | |
| #A6 | Data rate in D2UE connections | |
| #A7 | Time duration for communications | Time duration in which there is traffic data to be transferred |
| #A8 | Time duration for no communications | Time duration in which there is no traffic data to be transferred |
| #A9 | Path loss for the D2UE connections | |
| #A10 | Radio link quality for the D2UE connections | Radio link quality corresponds to SINR or CQI for example |
| #A11 | Block error rate for the D2UE connections | |
| #A12 | Received signal power for the D2UE connections | |
| #A13 | Transmitted signal power for the D2UE connections | |
| #A14 | Interference power for the D2UE connections | |
| #A15 | Location information | |
| #A16 | Number of user equipment for which data to be transmitted is present in transmission buffer | |
| #A17 | Number of user equipment whose data rate is lower than a threshold | |
| #A18 | Number of inactive user equipment | |

FIG. 28

ENHANCED LOCAL ACCESS IN MOBILE COMMUNICATIONS USING SMALL NODE DEVICES

TECHNICAL FIELD

This application is directed to the operation of the Physical and Link Layer in mobile communication protocols.

BACKGROUND

One option to increase capacity in a wireless network is to increase the density (number of devices per unit area) of deployed base stations or remote antenna units. If the density of the deployed base stations or remote antenna units increases, cell capacity increases due to frequency reuse effects. However, there are some difficulties that come with increasing the deployment density, especially if such deployed units must be able to operate as conventional base stations on their own. These difficulties include:

1) As the deployment density increases, the number of handovers increases because the user equipment changes its serving unit (base station) quite frequently. As a result, quality of connectivity/mobility is expected to be degraded. Thus, the deployed unit for increasing cellular capacity should have high-quality interworking with the macro base station.
2) The conventional macro base stations transmit some required signals, such as pilot signals, synchronization signals, broadcast signals, paging signals, and so on, all of which have the potential to cause interference problems. Such interference limits the number of deployed base stations and thus lowers cellular capacity.
3) Furthermore, radio resources for the required conventional macro base station signals are typically static. Thus, dynamic and efficient interference coordination through dynamic allocation of the radio resources is difficult, which also limits the number of the deployed base stations and associated cellular capacity.
4) Network operators need to assign cell ID or other cell-specific parameter to each cell. For example, the root sequences for random access channels in LTE uplink (UL) are an example of such cell-specific parameters. Such cell planning for the cell ID, the root sequences and the like is cumbersome, which also limits the number of the deployed base stations and associated cellular density.
5) The required cell capacity is region-specific. For example, a significantly large capacity is required in urban areas whereas a relatively small enhancement of cell capacity may be sufficient in suburban or rural areas. To efficiently satisfy such divergent density needs, the deployed unit should be easily installed with low cost/complexity.
6) If the cost of each deployed unit is high, the total system cost is quite high as the deployment density increases. Thus, the deployed unit cost should be relatively low to feasibly increase cell capacity.

Various architectures have thus been proposed to increase wireless network capacity. For example, distributed base stations using the Remote Radio Head (RRH) technology communicate with a base station server using optical fiber. Because the base station server performs the baseband processing, each RRH distributed base station thus acts as a power amplifier with regard to its base station server. As the density of the RRH distributed base stations is increased, the baseband processing complexity is increased at the base station server. Thus, the number of RRH cells corresponding to each distributed RRH base stations is limited due to this baseband complexity.

Another alternative for increasing wireless network capacity involves the use of picocells or femtocells. Unlike the RRH approach, baseband processing is distributed across the pico/femtocells. But there is no high-quality interworking between picocells/femto cells and macrocell base stations. Thus, connectivity and mobility may not be sufficient because conventional intra-frequency or inter-frequency handover between picocells/femtocells and macrocell base stations is required. Furthermore, the picocells/femtocells are indeed base stations and thus they transmit the signals mentioned above such as pilot signals, synchronization signals, broadcast signals, paging signals, and so on. As a result, as the deployment density for pico/femtocells is increased, interference problems, difficulties in dynamic and efficient interference coordination, cell planning problems, and related issues cannot be solved.

Yet another alternative for increasing wireless network capacity is the use of conventional WiFi. But there is no interworking between WiFi nodes and macrocell base stations. Thus, connectivity and mobility is limited for a dual macrocell and WiFi user.

Moreover, the use of WiFi in macrocell networks introduces the complications of multiple IP addresses being assigned to a single user.

Accordingly, there is a need in the art for improved architectures and techniques for increasing wireless network capacity.

SUMMARY

The invention focuses on the Physical (PHY) and Link Layer design of systems such as 3GPP's Long Term. Evolution (LTE). The design uses a Device to UE (D2UE) and Macro to UE (BS2UE) architecture wherein some functions are maintained by the BS2UE link and others are supported by the D2UE link. Therefore, according to the invention, it is possible to provide a radio communication system for enabling high capacity, high connectivity, low costs and low planning complexity.

In accordance with a first aspect of the disclosure, a small-node device for offloading data traffic in a cellular telecommunications system is provided that includes: a-macro-base-station-to-the-small-node-device (BS2D) communication section configured to receive a first control-plane message from a base station over a BS2D communication link; a user-equipment-to-the-small-node-device (D2UE) communication section configured to transmit user-plane data to a user equipment over a wireless D2UE communication link established responsive to the first control-plane message; and a backhaul communication section configured to receive the user-plane traffic data from a network server over a backhaul link.

In accordance with a second aspect of the disclosure, a mobile station (user equipment) configured to receive offloaded data from an small-node device in a cellular telecommunication system is provided that includes: a macro-base-station-to-the-user-equipment (BS2UE) communication section configured to receive both control-plane data and first user-plane data from the base station over a wireless BS2UE communication link; and a small-node-device-to-the-user-equipment (D2UE) communication section configured to receive second user-plane data from a server through the small-node device using a wireless D2UE communication link established responsive to the first control-plane message.

In accordance with a third aspect of the disclosure, a macro base station for controlling a user equipment (UE) and a small-node device in a cellular telecommunications network is provided that includes: a macro-base-station-to-the-UE (BS2UE) communication section configured to exchange user-plane and control-plane data with the UE using a wireless BS2UE communication link; a macro-base-station-to-the-small-node-device (BS2D) communication section configured to exchange control-plane data with the small-node device using a BS2D communication link; and a D2UE control unit configured to control an establishment of a small-node-device-to-the-UE (D2UE) communication link using a first control message transmitted to at least one of the UE and the small-node device using a respective one of the BS2UE and BS2D communication links.

BRIEF DESCRIPTION OF THE DRAWINGS

FIG. 16 is a flow diagram for the reconfiguration of a D2UE link.

FIG. 27A is a table of D2UE measurement items

FIG. 27B illustrates the status report transmission in a small-node device network.

FIG. 28 is a table of traffic measurement items.

DETAILED DESCRIPTION

Figure 1:
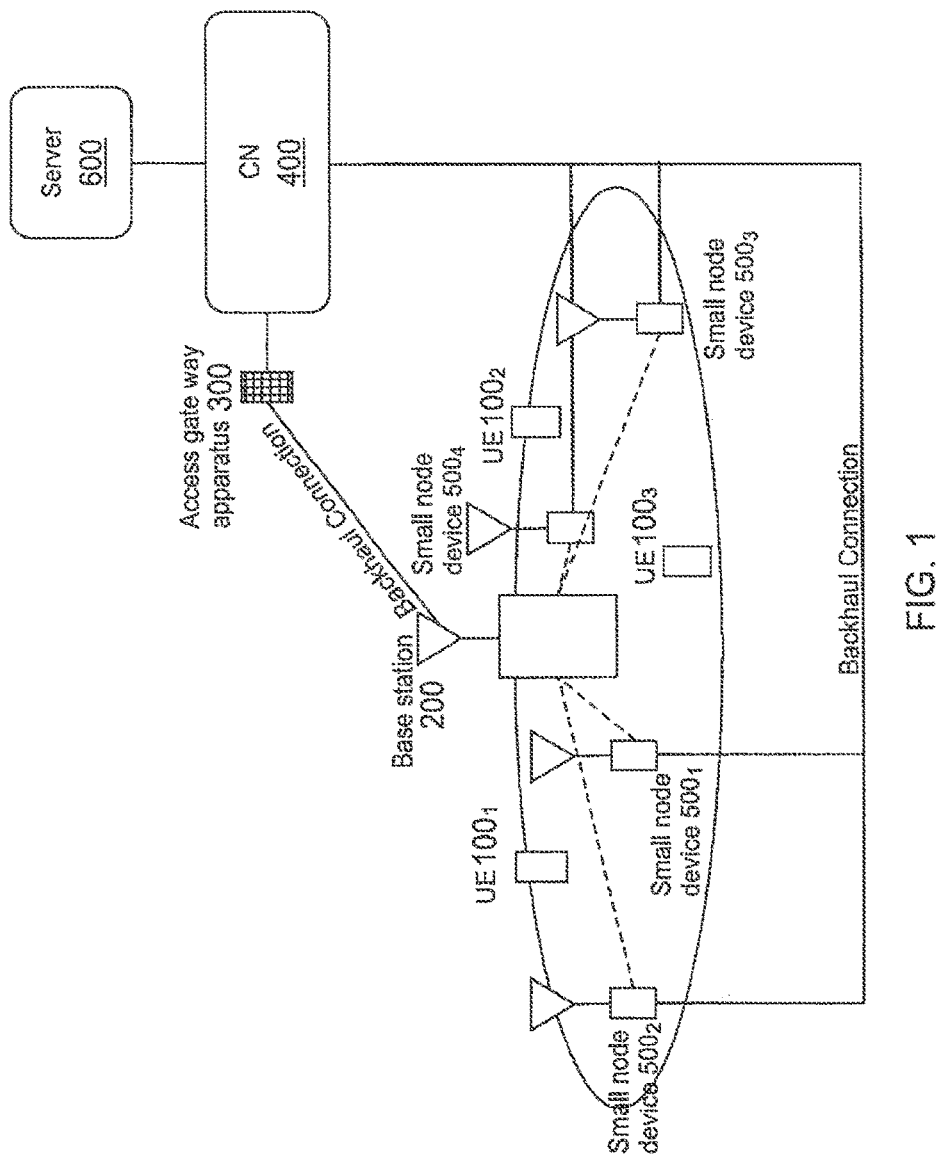
FIG. 1 is an example architecture for an enhanced local area radio access system using small-node devices.

A cellular network device is disclosed that enables a user to offload traffic from a macrocell base station without the drawbacks discussed earlier. The cellular network devices opportunistically offload traffic from the macro base stations and are denoted as small-node devices hereinafter. The small-node devices allow offloading of data traffic that would ordinarily have to be carried by the link between the macrocell base station and the UE (which may be denoted as a Macro2UE link). When a small-node device is deployed, the offloaded data may then be carried over a small-node device to UE link (which may be denoted as a D2UE link). The small-node device is analogous to a femto or pico base station in that the small-node device may control the radio resource allocation and transport format selection for the D2UE link. However, a mobile station receives both user-plane and control-plane signaling from a femto/pico base station, which conducts RRC procedures for a link between the mobile station and the femto/pico base station. In that regard, a femto/pico base station is indeed acting as a conventional base station to the user equipment. Thus, a mobile station needs to make conventional handover from a femto/pico base station to another femto/pico base station or from a macro base station to a femto/pico base station and vice versa. If there are numerous such handovers, the quality of connectivity/mobility is degraded. This is because it is impossible for the user equipment to communicate with a femto/pico base station simultaneously with the macro base station, and conventional intra-frequency or inter-frequency handover is needed. In other words, it is because conventional carrier aggregation operations cannot be conducted between two different nodes, such as a macro base station and a femto/pico base station. In contrast, a mobile station can transfer data with the small-node device disclosed herein while simultaneously transferring data with a macro base station. A macro-base-station-to-mobile-station connection is maintained while the data offloading is conducted in a small-node-device-to-mobile station connection. As a result, high quality connectivity/mobility can be maintained even if the density of deployment is increased.

Furthermore, a femto/pico base station must transmit a cell-specific reference signal (CRS), a primary synchronization signal (PSS), a secondary synchronization signal (SSS), and broadcast signals. The transmission of the CRS/PSS/SSS/broadcast signals is problematic as density of deployment is increased due to the resulting inter-cell interference. In contrast, the small-node device disclosed herein need not transmit CRS/PSS/SSS/broadcast signals because the mobile station gets its control-plane signaling from the macro base station. The small-node device is thus exchanging user-plane data with the mobile station and does not suffer from inter-cell interference as density of deployment is increased.

To perform this offloading of data traffic, the small-node devices have a backhaul link, which is connected to the Internet or the core network so as to communicate with a server in the Internet or the core network. The backhaul link to the small-node device is not limited to a wired connection to the Internet, but may be a wireless connection to the Internet, such as a WiFi or cellular connection. The server transfers some of data to the user equipment (which would otherwise be transferred using the base station) utilizing the backhaul link and the D2UE connections. The D2UE connections are controlled by the macro base station (which will be referred to merely as a "base station" hereinafter). More specifically, basic radio resource control, such as connection establishment, handover, connection release, call admission control and the like, for the D2UE connections is controlled by the base station. Furthermore, the BS2UE connections between UE and the base station are maintained while the D2UE connections are configured. As a result, high quality interworking between base-station-to-UE (BS2UE) and D2UE connections is readily achieved. Moreover, a number of functions that are essential in conventional base stations may be omitted in the small-node devices. For example, the small-node devices need only support functions for D2UE, connections. Therefore the cost and complexity of the small-node devices can be kept low. For example, the operation of complicated functions such as the Radio Resource Control (RRC) connection state control and Non-Access Stratum (NAS) control is performed by the base station. Thus, some or most of the functions for conventional Macro2UE links such as transmitting broadcast channels, transmitting pilot and synchronization signals, controlling connections and the like, may be omitted in the D2UE connection.

A small-node device is configured to support small-node-device-to-user-equipment (D2UE) transfer of data. The small-node device supports a base-station-to-small-node-device link (a BS2D link) and the D2UE link is controlled by the base station via the BS2D link. A UE as disclosed herein also supports a base-station-to-user-equipment link (a BS2UE link) and a D2EU link. Its D2UE link is controlled by the base station via the BS2UE link as well. Control signaling for the D2UE connections can be transmitted to the UE via the BS2UE connection. In an analogous fashion, control signaling for the D2UE connections can be transmitted to the small-node device via the BS2D connection. In some embodiments, a D2UE connection may be similar to a D2D (UE-to-UE or small-node-device-to-small-node-device) connection.

To achieve high quality connectivity, more important functions such as the RRC connection state control and also NAS control are maintained by the base station using the BS2UE association. More specifically, control for the radio interface in the D2UE connections is conducted by the BS2D and the macrocell-base-station-to-user device (BS2UE) associations. The control includes at least one of connection establishment, connection management, connection reconfiguration, handover, connection release, radio resource selection management, power control, link adaptation, call admission control, radio bearer assignment, traffic measurement, radio measurement control, bearer management, security association and so on.

In some embodiments, D2UE connections are maintained by a time domain duplex (TDD) physical layer design. In such embodiments, in the band(s) used for D2UE transmissions, the user equipment and the small-node device time-share the use of radio resources on the band(s). In alternative embodiments, D2UE connections may be maintained by a frequency domain duplex (FDD) physical layer resource sharing instead of TDD. D2UE and BS2UE transmissions can operate in different bands exploiting Carrier Aggregation Functions. The carrier aggregation functions correspond to functions, in which the transmitter can transmit signals and the receiver can receive signals in more than one carrier simultaneously. In this fashion, D2UE transmissions can operate in one band, and BS2UE transmissions can operate in another band, simultaneously in time.

Alternatively, D2UE and BS2UE transmissions can operate in different bands exploiting time division multiplexing functions, wherein the D2UE transmission occur only at selected times and the BS2UE transmissions occur at the remaining time.

The System Architecture

Various small-node device embodiments will now be discussed in further detail. Turning now to the drawings, FIG. 1 shows a plurality of small-node devices or units $500_1$ through $500_3$ within a cellular communication system. This system also includes a base station 200 as well as user equipment (UE) $100_1$, $100_2$, and $100_3$. As used herein, components having the same base element number (e.g., $100_1$ and $100_2$) have the same configuration, function, and state unless otherwise specified. Evolved Universal Terrestrial Radio Access (E-UTRA)/Universal Terrestrial Radio Access Network (UTRAN) (also denoted as Long Term Evolution (LTE)) is applied in the system of FIG. 1 but it will be appreciated that a wide variety of other wireless protocols such as WiMAX, WiFi, or LTE Advanced may also be implemented in the system.

Base station 200 is connected to a higher layer station, for example, an access gateway apparatus 300. In turn, access gateway 300 is connected to a core network (CN) 400. Access gateway 300 may also be referred to as MME/SGW (Mobility Management Entity/Serving Gateway). A server 600 may also be connected to the core network 400.

User equipment 100 communicates with small-node devices 500 by a device-to-user-equipment (D2UE) communication. The D2UE communication between user equipment 100 and small-node devices 500 may be provided in a Time Division Multiplexing manner (TDD). Alternatively, the D2UE communication between the user equipment and the small-node devices 500 may be provided in a Frequency Division Multiplexing (FDD) manner. The D2UE link may be an LTE link or a simplified LTE link. However, it will be appreciated that other protocols besides LTE such as LTE Advanced, WiMax, WiFi, or other suitable protocols may be used to implement the D2UE links.

Figure 2:
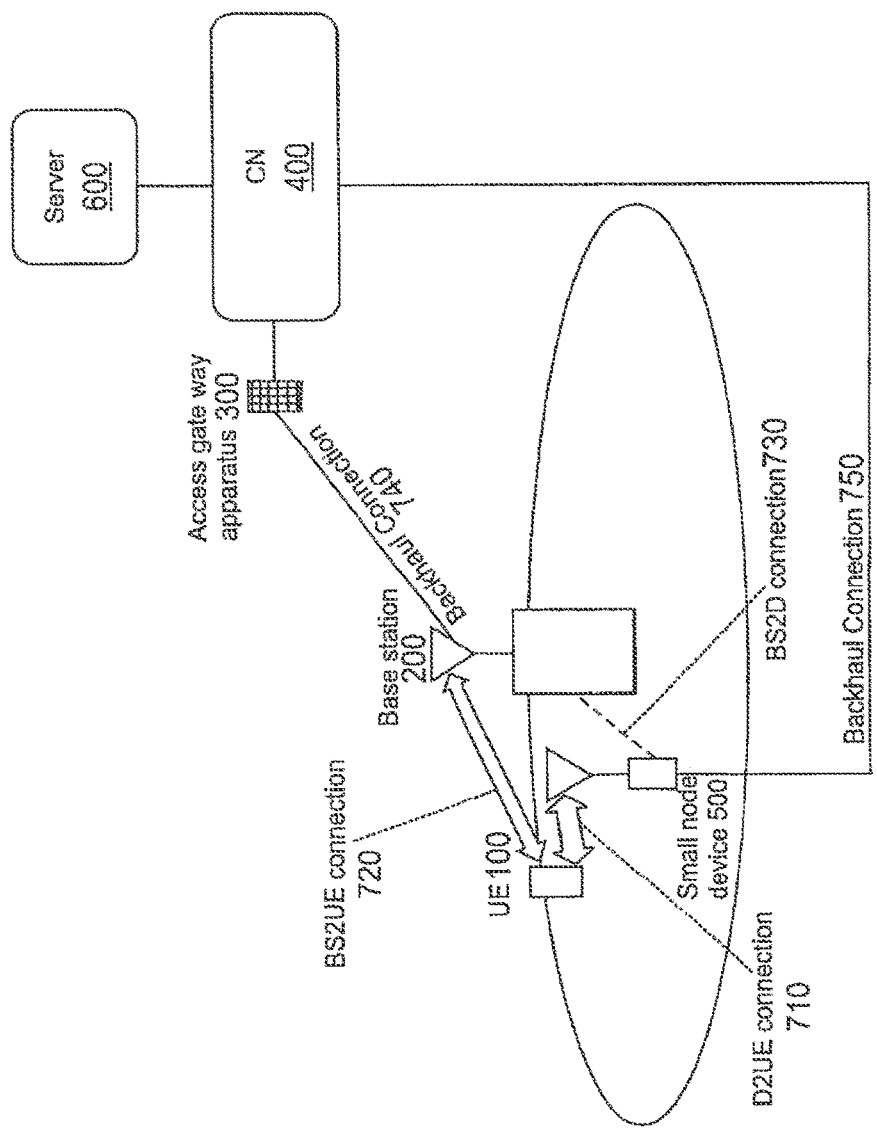
FIG. 2 annotates the data paths in the system of FIG. 1 for a given one of the small-node devices.

Small-node devices 500 communicate with base station 200 using a base-station-to-small-node-device (BS2D) link. For example, the BS2D link may comprise a wired X2 interface link. Alternatively, the BS2D link may be a wired or wireless link that is different from an X2 link. Alternatively, the BS2D link may be an enhancement of an X2 interface. The enhancement of the X2 interface link accommodates a master-slave relationship between the base station 200 and small-node device 500. To provide greater capacity, small-node devices 500 are connected to the core network 400 through backhaul links in some embodiments. Each of these backhaul links may be an Ethernet link, a WiFi link, a cellular network link, and may be wired or wireless. Data plane traffic can thus flow between core network 400 and small-node device 500 without burdening base station 200. In this fashion, the user equipment can access data from server 600 without the data passing through base station 200. In other words, small-node device 500 communicates with the user equipment 100 utilizing the D2UE communication for data off load purposes. In other embodiments, small-node devices 500 may be connected to base station 200, instead of the core network 400. In this case, data plane traffic flows in base station 200, but data processing in the base station 200 can be minimized, because data processing in lower layers such as physical layer or MAC layer is handled by small-node device 500. In contrast, control plane information as well as data plane traffic (e.g., real time data such as VoIP) can continue to flow to UE 100 via base station 200, access gateway 300, core network 400, and server 600. FIG. 2 is an annotated version of the system of FIG. 1 to show a BS2UE connection or link 720, a D2UE connection 710, a backhaul connection 750, a BS2D connection 730, and a backhaul connection 740.

Figure 3:
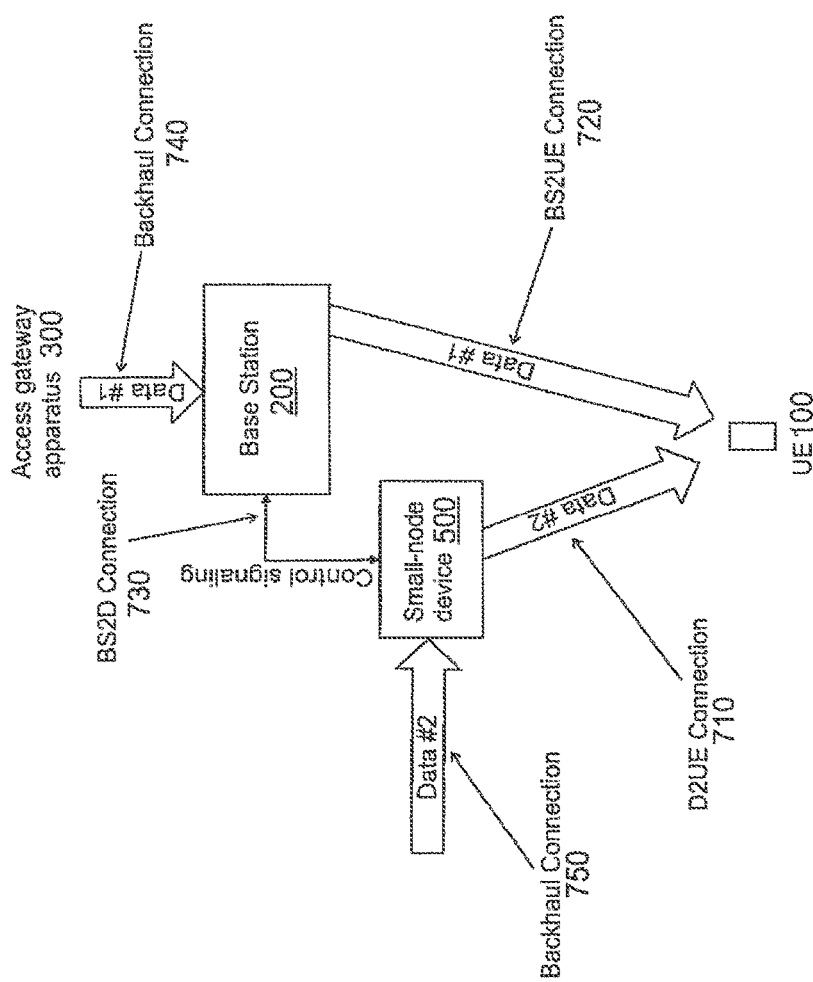
FIG. 3 illustrates the control-plane and user-plane data flows for small-node device of FIG. 2.

FIG. 3 illustrates data flow in the communication system of FIG. 1. In that regard, there must be an entity that decides what data will be offloaded through the small-node devices as opposed to a conventional exchange between the user equipment and the base station. Because the base station receives radio link quality reports from the user equipment and/or the small-node devices, the base station is a natural choice for the data partition decision (i.e., deciding what data should be offloaded). However, other network nodes can also make this decision. With regard to FIG. 3, a decision has been made to offload some data but also have other data not be offloaded. The non-offloaded data is designated as Data #1, which is transferred from the access gateway apparatus 300 to the base station 200 in backhaul connection 740 and then transmitted to user equipment 100 in BS2UE connection 720 in downlink (DL), and vice versa in uplink (UL). This data flow is thus be transmitted in a conventional fashion. In addition to Data #1, offloaded Data #2 is transferred from core network 400 to small-node device 500 in backhaul connection 750 and then transmitted to user equipment 100 in D2UE connection 710 in DL, and vice versa in UL. Control-plane signaling is transmitted in BS2D connection 730 so that base station 200 can control communication in D2UE connection 710. Control signaling is transmitted also in BS2UE connection 720 so that base station 200 can control the communication in D2UE connection 710. The control signaling in BS2UE connection 720 may be radio resource control (RRC) signaling. More specifically, Data #1 may include RRC signaling, NAS signaling, voice packets and the like, and Data #2 may be best effort packets, FTP data, Web browsing packets and the like. That is, it may be determined by data bearers what kinds of data are transferred as Data #1 or Data #2. As a result, connectivity can be maintained by BS2UE connection 720, and U-plane data offload can be simultaneously achieved in D2UE connection 710.

Figure 4:
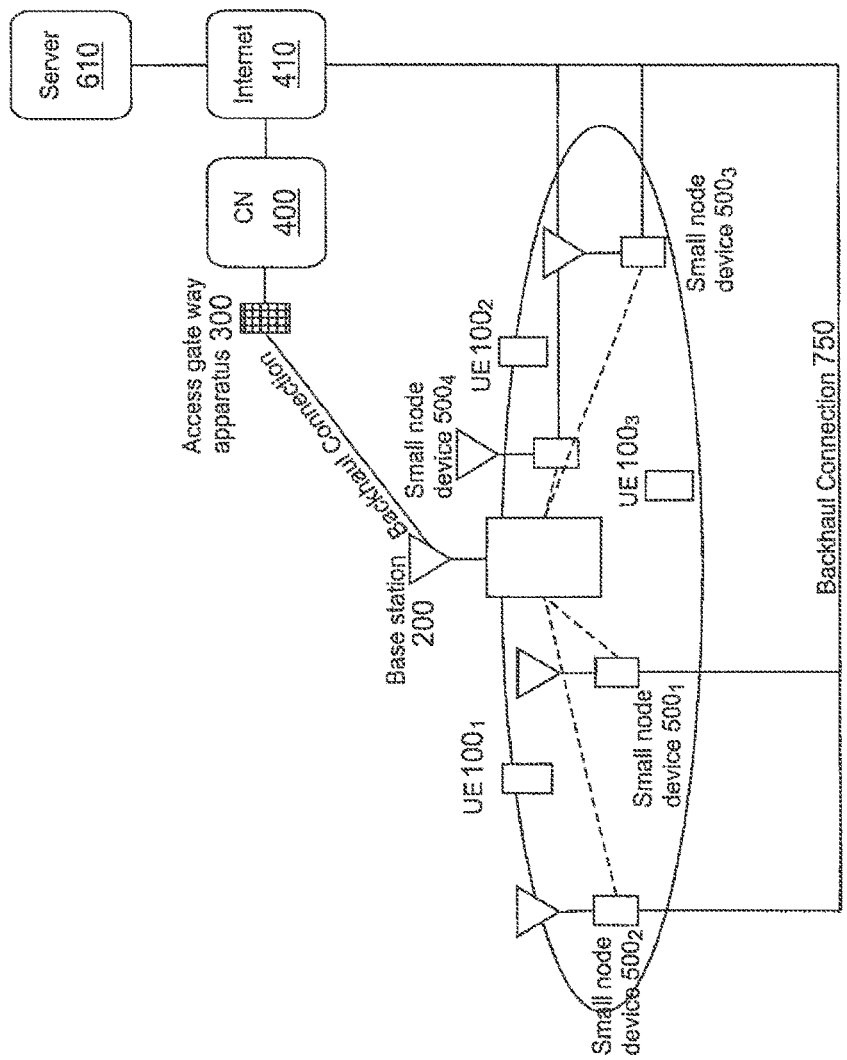
FIG. 4 illustrates a modification of the architecture of FIG. 2 in which the backhaul links from the small-node devices route through the Internet.

FIG. 4 illustrates an alternative embodiment in which small-node devices 500 may be connected to a server 610 via Internet 410. In this case, core network 400 may be regarded as a network controlled by a network operator. Core network 400 may include MME, S/P-GW, a node for billing system, HLS (database for customers) and the like.

Figure 5:
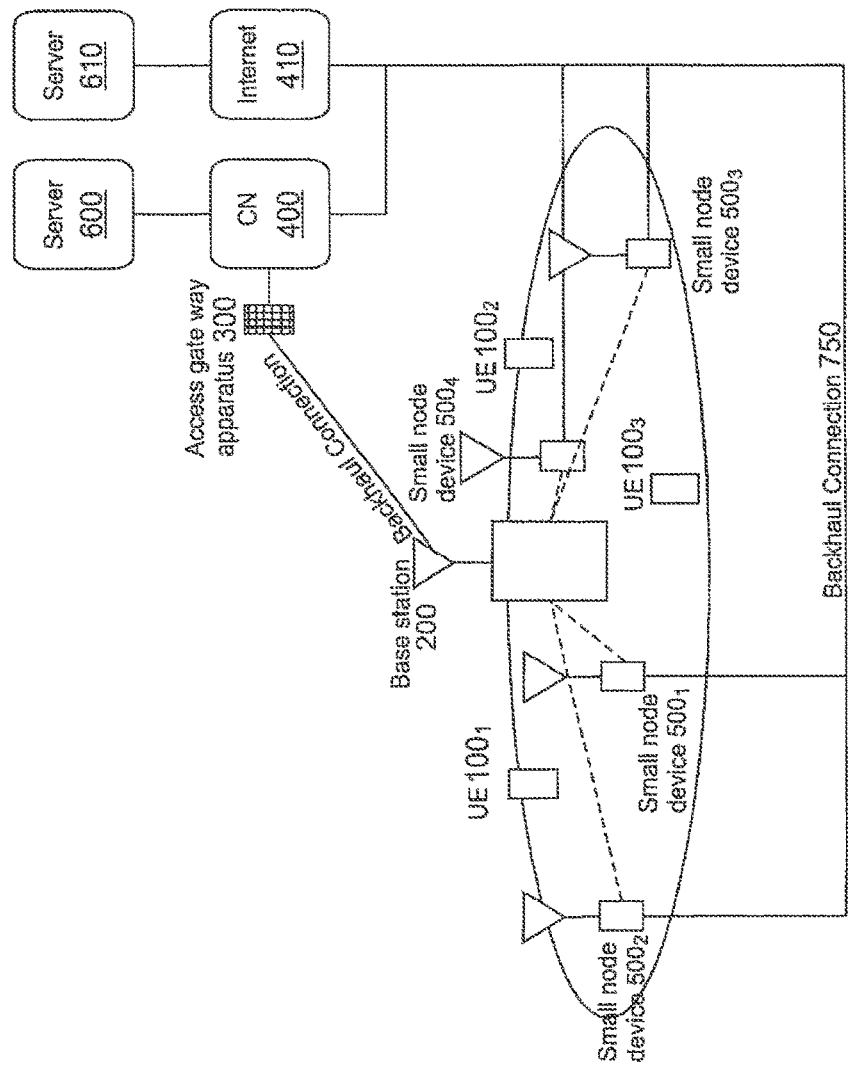
FIG. 5 illustrates an architecture that combines the features shown for the embodiments in FIGS. 1 and 4.
Figure 6:
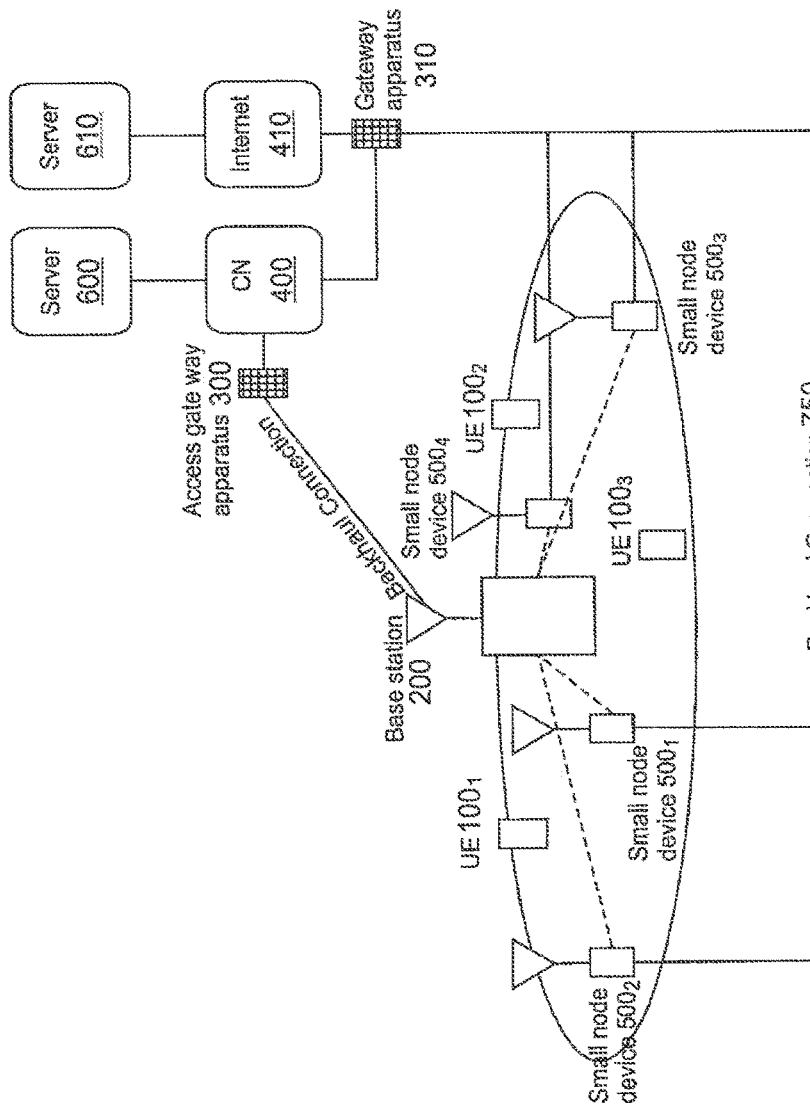
FIG. 6 illustrates a modification of the architecture of FIG. 5 to include a gateway between the small-node devices and the core network/Internet.

FIG. 5 illustrates another alternative embodiment that may be considered as a mixture of the FIG. 1 and FIG. 4 embodiments. In this embodiment, small-node devices 500 may be connected to server 600 via core network 400 or server 610 via the Internet. Small-node device 500 may be connected to network equipment, which in turn is connected to server 600 via core network 400 or server 610 via the internet. The network equipment may be an S-GW or a P-GW or other nodes in the core network. Alternatively, the network equipment may be a node in the internet. In another alternative embodiment, a gateway 310 is provided between core network 400/Internet 410 and small-node devices 500 as shown in FIG. 6.

Figure 7:
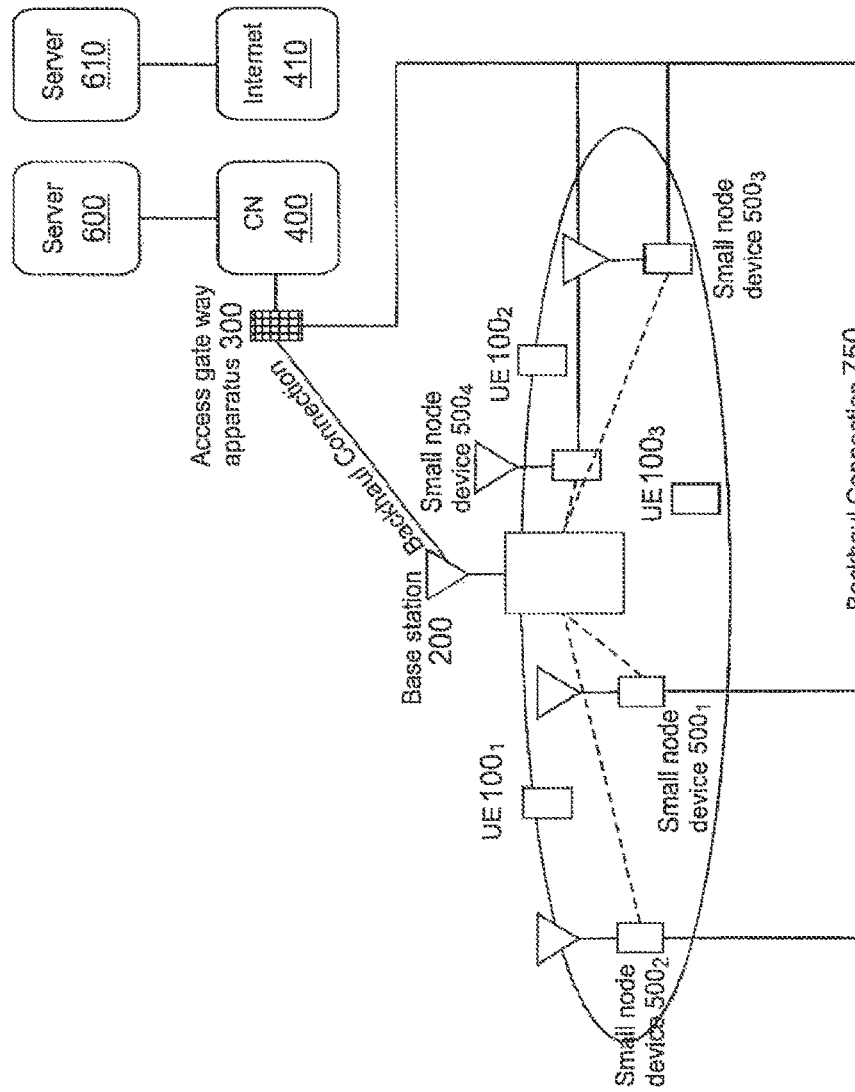
FIG. 7 illustrates a modification of the architecture of FIG. 5 in which the backhaul links from the small-node devices route through a network access gateway.
Figure 8:
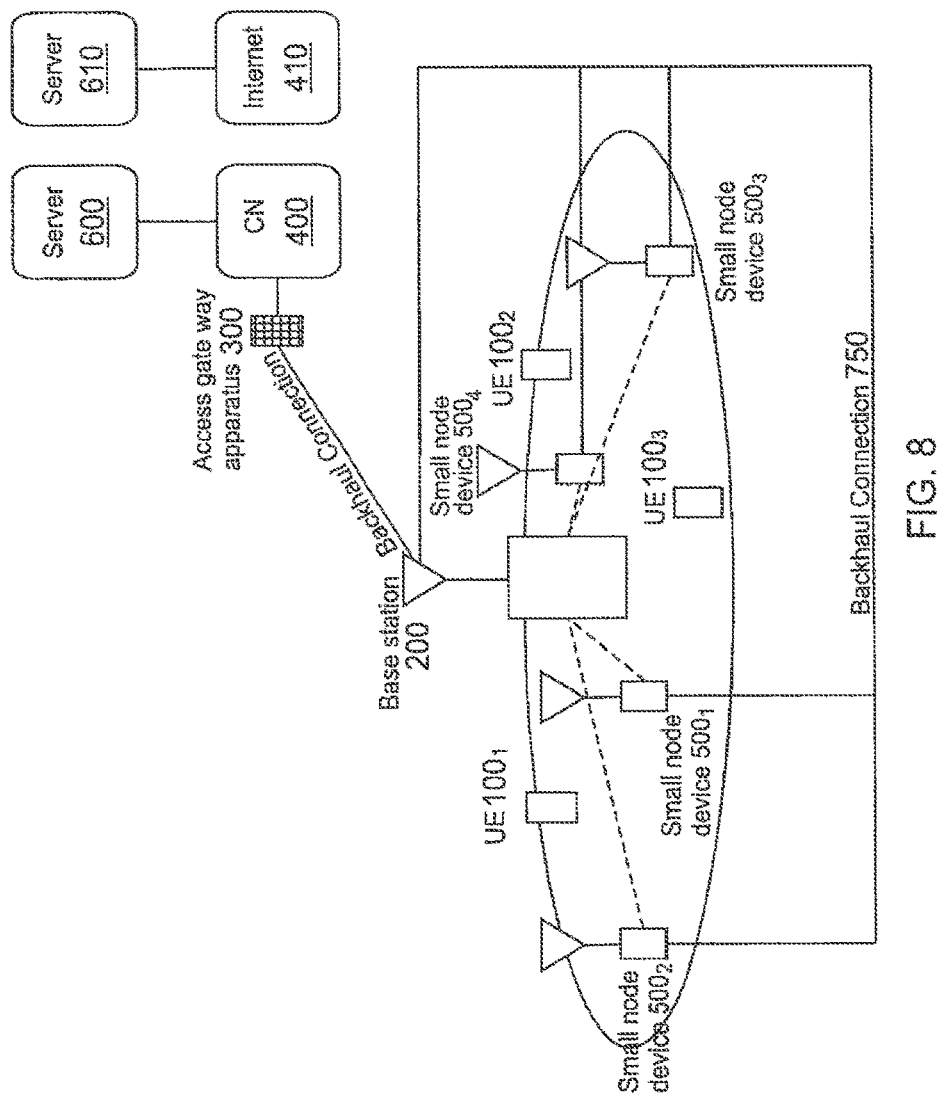
FIG. 8 illustrates a modification of the architecture of FIG. 5 in which the backhaul links from the small-node devices route through the base station.
Figure 9:
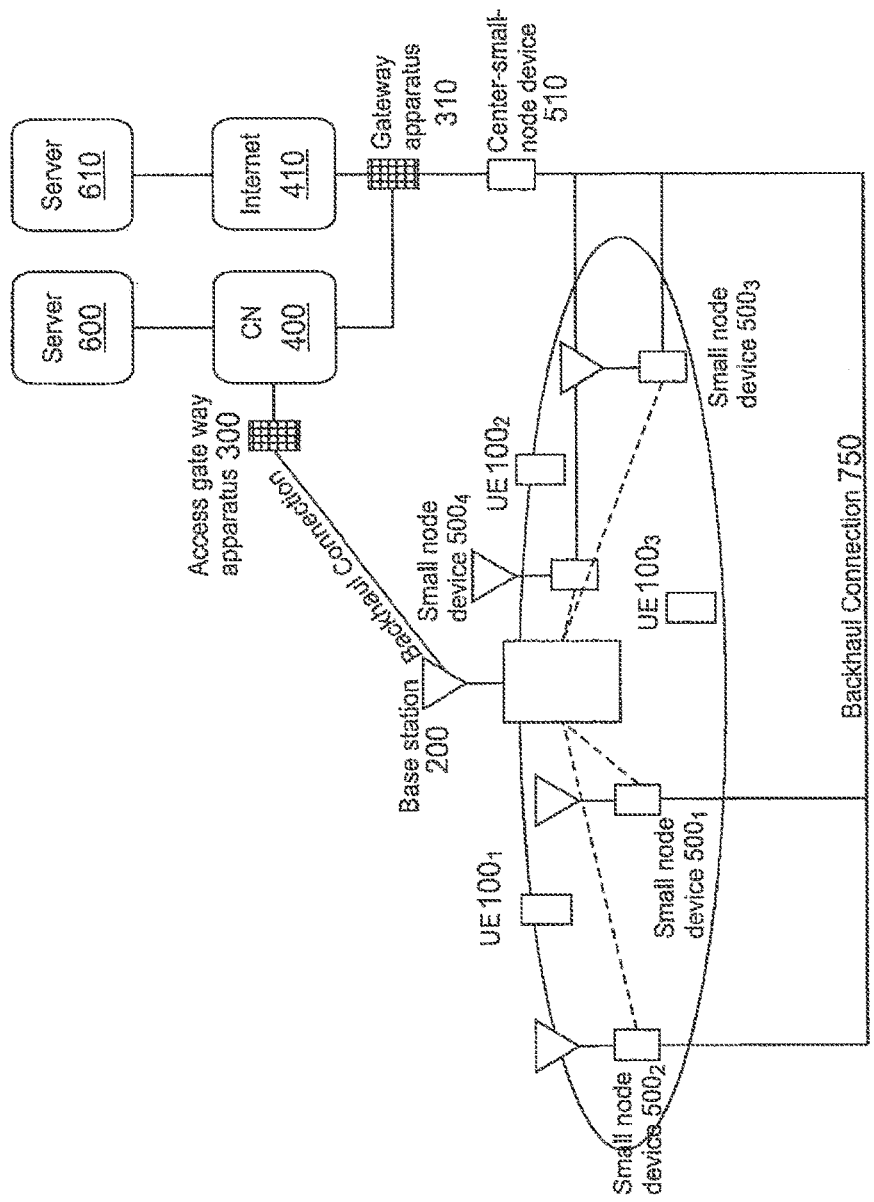
FIG. 9 illustrates a modification of the architecture of FIG. 6 in which the backhaul links from the small-node devices route through a center small-node device.

Backhaul connection 750 may be varied as shown in FIG. 7 such that it couples between access gateway 300 and small-node devices 500. Alternatively, backhaul connection 750 may couple between base station 200 and small-node devices 500 as shown in FIG. 8. In yet another alternative embodiment, backhaul connection 750 may couple between a center-node small-node device 510 and small-node devices 500 as shown in FIG. 9. Center-node small-node device 510 in turn couples to Internet 410 and core network 400 through a gateway 310 (which is optional) or directly to these networks. Should center node small-node device 510 be included, a layer sharing protocol may be implemented in which center node small-node device 510 implements the RLC/PDCP layer whereas the remaining small-node devices handle the Physical/MAC layers. Other layer sharing methods may be implemented. For example, center node small-node device 510 may implement the PDCP layer whereas the remaining small-node devices implement the Physical/MAC/RLC layers. It may be determined by data bearers whether data should be offloaded through the small-node devices. It may also be determined by data bearers whether data should flow via the small-node devices and the Internet 410, or via the small-node devices and core network 400, or via the small-node devices and base station 200. Data bearers may be logical channels or logical channel types.

The carrier frequency in D2UE connection 710 may be different from that in BS2UE connection 720. Alternatively, the carrier frequency in D2UE connection 710 may be the same as that in BS2UE connection 720.

In the following examples, it is assumed without loss of generality that the carrier frequency in the D2UE connection is 3.5 GHz and that TDD is applied to the D2UE connection. Furthermore, it is also assumed that the carrier frequency in the BS2UE connection between base station 200 and user equipment 100 is 2 GHz, and that the carrier frequency in the BS2D connection between base station 200 and small-node device 500 is 2 GHz. To begin the configuration, user equipment 100 may transmit an RRC connection request to base station 200. In response, base station configures BS2UE connection 720. Alternatively, base station 200 may send a paging signal to user equipment 100 such that user equipment 100 sends an RRC connection request corresponding to the paging signal to base station 200. In response, base station 200 configures BS2UE connection 720 as well as a connection between user equipment 100 and server 600 via base station 200, access gateway 300, and core network 400.

Similarly, base station 200 configures BS2D connection 730 between base station 200 and small-node devices 500. This configuration can be permanent or established analogously to the BS2UE connection. In some embodiments, a small-node device 500 has the ability to power-down or enter a sleep state when not in use. In such embodiments base station 200 is configured to send small-node device 500 a wakeup signal using BS2D connection 730 as supported by an X2 or other suitable protocol. In some other embodiments, the protocol design may be LTE interface. Furthermore, the small-node device may be able to use power-saving modes, such as stand-by modes, equivalent to user equipment. In this case, exiting such power-saving modes may be done in the same fashion as the user equipment 100 and possibly in response to signals expected or sent by the base-station 200. The signals may be a paging signal or a control signaling such as MAC control signaling or physical layer signaling.

As discussed above, BS2D connection 730 may be always configured between base station 200 and small-node device 500. In such a permanently-configured embodiment, small-node device 500 may be in a discontinuous reception mode in BS2D connection 730 when D2UE connection 710 is not configured between small-node device 500 and user equipment 100. In this case, small-node device 100 may not transmit signals or may transmit signals extremely infrequently when D2 UE connection 710 is not configured between small-node device 500 and user equipment 100. For example, even when D2UE connection 710 is not configured between small-node device 500 and user equipment 100, small-node device 500 may transmit only pilot signals infrequently so that user equipment 100 can detect small-node device 500. The periodicity of the pilot signals may be for example 100 ms or 1 second or 10 seconds. Alternatively, even when D2UE connection 710 is not configured between small-node device 500 and user equipment 100, small-node device 500 may transmit pilot signals based on a request from base station 200 so that user equipment 100 can detect small-node device 500.

After establishment of links 720 and 730, base station 200 may use control signaling in BS2UE connection 720 to command user equipment 100 to configure D2UE connection 710. Furthermore, base station 200 may use control signaling in BS2D connection 730 to command small-node device 500 to configure D2UE connection 710. Configuring the D2UE connection 710 may also be denoted as establishing the D2UE connection 710.

Furthermore, base station 200 controls D2UE connection 710. For example, base station 200 may order for user equipment 100 and small-node device 500 to re-configure or re-establish D2UE connection 710. Similarly, base station 200 may command equipment 100 and small-node device 500 to release the D2UE connection 710. Moreover, base station 200 may command user equipment 100 to handover the D2UE connection to another small-node device. More specifically, base station 200 may command user equipment 100 to conduct the handover to another small-node device in a carrier in which communication in D2UE connection 710 is conducted. The base station 200 may control the above procedures utilizing RRC signaling in BS2UE connection 720 and/or in BS2D connection 730.

Base station 200 may maintain the connections between user equipment 100 and server 600 utilizing BS2UE connection 720 when D2UE connection is dropped.

Base station 200 may also control the radio resource for D2UE connection 710. The details of the radio resource control for D2UE connection 710 are discussed further below. Alternatively, small-node device 500 may control the radio resource for the D2UE link. In yet another alternative embodiment, both base station 200 and small-node device 500 may control the radio resource for the D2UE link. The following discussion will assume without loss of generality that base station 200 performs this radio resource management.

Base station 200 may also configures one or more radio bearers for the communications. Control signaling for configuring the radio bearers is transmitted to user equipment 100 in BS2UE connection 720. Similarly, control signaling for configuring the radio bearers is transmitted to small-node device 500 in BS2D connection 730.

The radio bearer may be denoted as a logical channel. Base station 200 also configures radio bearers for BS2UE connection 720 and radio bearers for D2UE connection 710. The radio bearers for BS2UE connection 720 may be the same as the ones for the D2UE connection 710. Alternatively, the radio bearers for the BS2UE connection 720 may be different from those used for D2UE connection 710. For example, radio bearers for packets of non-real-time services, such as web browsing, e-mail, and FTP, may be configured in D2UE connection 710. Conversely, radio bearers for packets of real-time services, such as VoIP and streaming, may be configured for BS2UE connection 720. Alternatively, the radio bearers for packets of non-real-time services are configured for both D2UE connection 710 and in BS2UE connection 720 such that packets of non-real-time services may be transmitted preferentially in D2UE connection 710. In yet another alternative, the radio bearers for the packets of real-time services are configured both in D2UE connection 710 and in BS2UE connection 720 such that the real-time services packets may be transmitted preferentially in BS2UE connection 720. Such prioritization or priority for the packets may be configured by base station 200. In that regard, base station 200 may configure which connection: D2UE connection 710 or BS2UE connection 720 that should be preferentially utilized in the communications for each radio bearer.

Control plane (C-plane) signaling, such as Non Access Stratum (NAS) signaling and Radio Resource Control (RRC) signaling, may be transmitted in BS2UE connection 720. For example, RRC signaling includes signaling messages for RRC connection establishment, initial security activation, RRC connection reconfiguration, RRC connection release, RRC connection re-establishment, radio resource configuration, measurement reports, handover command, and so on. A radio bearer for C-plane signaling may be denoted as a signaling radio bearer, C-plane signaling may be transmitted also in the D2UE connection 710. Alternatively, one part of a radio bearer data may be transmitted in the D2UE connection 710 and the other part of the radio bearer data may be transmitted in the BS2UE connection 720.

The small-node device may transmit common channels/signals, such as Primary Synchronization signals (PSS), Secondary Synchronization signals (SSS), Common Reference Signals, and Broadcast channels in D2UE connection 710. Alternatively, small-node device 500 may not transmit any common channels/signals or may transmit common channels/signals extremely infrequently. For example, small-node device 500 may transmit pilot signals infrequently so that user equipment 100 can detect the small-node device. The periodicity of the pilot signals may be for example 1 second or 10 seconds. Alternatively, small-node device 500 may transmit pilot signals based on a request from base station 200 so that user equipment 100 can detect small-node device 500.

Figure 10:
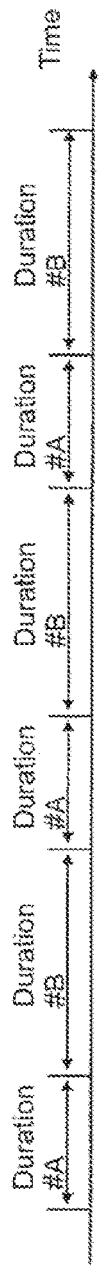
FIG. 10 illustrates time slots for the D2UE link and the user equipment's BS2UE link.

User equipment 100 conducts communication in D2UE connection 710 and communication in BS2UE connection 720 simultaneously. In one embodiment, user equipment 100 communicates over D2UE connection 710 and over BS2UE connection 720 simultaneously utilizing carrier aggregation functions. In that regard, user equipment 100 may have two radio frequency (RF) interfaces to conduct communication in D2UE connection 710 and communication in BS2UE connection 720 simultaneously. Alternatively, user equipment 100 may conduct communication in D2UE connection 710 and communication in BS2UE connection 720 in a time division multiplexing manner as shown in FIG. 10. Two sets of time slots, Duration #A and Duration #B, are shown in FIG. 10. User equipment 100 may communicate in BS2UE connection 720 in the time slots corresponding to Duration #A and may communicate in D2UE connection 710 in the time slots corresponding to Duration #B.

The time duration for the D2UE connection may be larger than the one for the BS2UE connection so that the data offload effects can be increased. For example, the length of Duration #A may be 8 msec whereas the length of Duration #B may be 1.28 sec. The time duration for BS2UE connection 720 (Duration #A in FIG. 8) may correspond to an on-duration in a DRX control over BS2UE connection 720. The time duration for D2UE connection 710 may correspond to an off-duration in the DRX control over BS2UE connection 720. The off-duration means a sleep mode in DRX control, in which user equipment 100 does not have to monitor physical control channels transmitted from base station 200 over BS2UE connection 720. In case that user equipment 100 uses time division multiplexing with regard to connections 710 and 720, it does not have to support a capability of simultaneously communicating over these connections, i.e. user equipment 100 can switch the RF interface from BS2UE connection 720 to that for D2UE connection 710 and vice versa. As a result, cost/complexity of user equipment 100 can be reduced.

Base station 200 may control the radio resource for D2UE connection 710. The radio resource may be configured selectively in the time domain, frequency domain, and code domain resource. For example, base station 200 may configure D2UE connection 710 to use a non-overlapping spectrum with regard to any other D2UE connections such as by controlling a carrier center frequency. As a result, interference problems caused by other D2UE connections can be mitigated. Similarly, base station 200 may configure the time resource in D2UE connection 710 so that it does not overlap with the time resource utilized in other D2UE connections. Alternatively, base station 200 may configure the code resource in D2UE connection 710 so that it does not overlap with the code resource utilized in other D2UE connections. As a result, interference problems caused by other D2UE connections can be mitigated.

In an alternative embodiment, some parameters of the radio resource for D2UE connection 710 may be configured by base station 200 and the other parameters may be configured by small-node device 500. For example, the frequency domain resource for D2UE connection 710 may be configured by base station 200 and the time domain resource for D2UE connection 710 may be configured by small-node device 500. Alternatively, the center carrier frequency for the D2UE connection 710 may be configured by base station 200 and the other frequency domain resource (such as an identification number of resource blocks or the number of resource blocks) and the time domain resource for D2UE connection 710 may be configured by small-node device 500.

Alternatively, base station 200 may configure several sets of the radio resource for D2UE connection 710, and small-node device 500 may configure one out of the several sets of the radio resource for D2UE connection 710.

The base station 200 transmits control signaling to user equipment 100 in BS2UE connection 720 so that it configures the radio resource for D2UE connection 710 as described above. Furthermore, base station 200 transmits control signaling to small-node device 500 in BS2D connection 730 so that it configures the radio resource for the D2UE connection 710 as described above.

Base station 200 controls transmission power for DL in D2UE connection 710. More specifically, base station 200 may configure the maximum transmission power for DL in D2UE connection 710. Furthermore, base station 200 controls transmission power for UL in D2UE connection 710. More specifically, base station 200 may configure the maximum transmission power for UL in D2UE connection 710.

Base station 200 may set the maximum transmission power for DL or UL in D2UE connection 710 based on the number of the user equipment in the cell where the small-node device provide radio communication service. For example, the base station sets the maximum transmission power to be higher in case that the number of the user equipment in the cell is relatively small. Conversely, the base station will set the maximum transmission power to be lower if the number of the user equipment in the cell is large. As a result, an interference level in the carrier used in D2UE connection 710 can be reduced by making the maximum transmission power low in a high density deployment. In case that there is not a lot of user equipment, coverage area of D2UE connection 710 can be increased by making the maximum transmission power high.

Alternatively, base station 200 may set the maximum transmission power in D2UE connection 710 based on the frequency in which communications in the D2UE connection are conducted. More specifically, in case that the frequency in which the communications in the D2UE connection are conducted is relatively close to a frequency utilized by another system, interference level with the other system can be reduced by making the maximum transmission power low. Conversely, should the other system not be relatively close in the frequency domain, coverage area of the D2UE connection can be increased by making the maximum transmission power high.

User equipment 100 has a capability of making measurements and detecting the nearest small-node device so that the data throughput in the D2UE connection can be maximized and the interference caused by the D2UE connection can be minimized. Furthermore, the user equipment has a capability of reporting results of the measurements and the detected nearest small-node device to the base station. In turn, the base station controls the D2UE connection based on the results and the detected nearest small-node device as reported by the user equipment. For example, when the identity of the nearest small-node device changes, the base station may order for the user equipment to stop communications with the currently serving small-node device and start new communication with the newly-detected nearest small-node device.

Figure 11A:
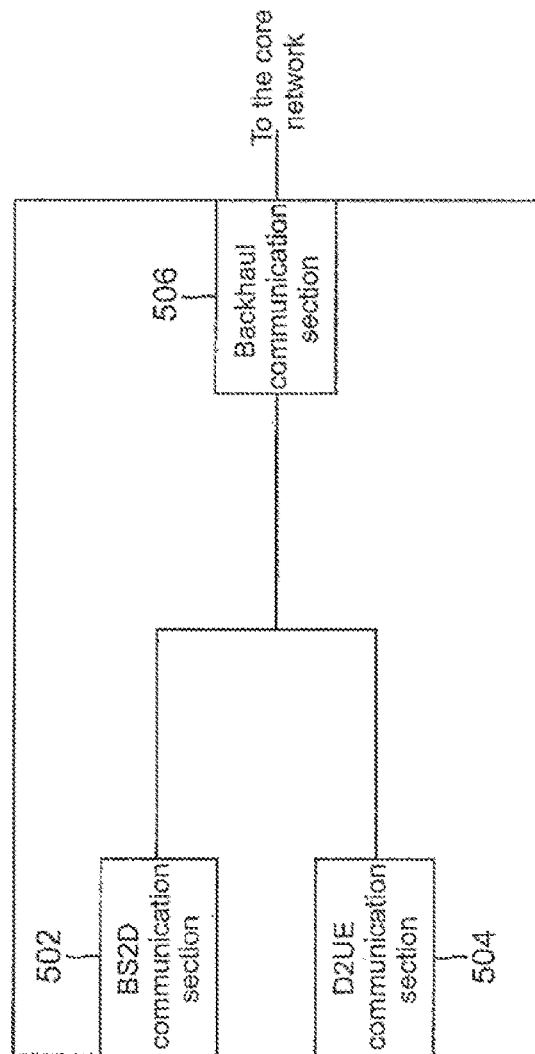
FIG. 11A is a block diagram for an example small-node device.

A block diagram of an small-node device 500 is shown in FIG. 11A. In this embodiment, small-node device 500 includes a BS2D communication section 502, a D2UE communication section 504, and a backhaul communication section 506. BS2D communication section 502, D2UE communication section 504, and backhaul communication section 506 are all connected to each other.

BS2D communication section 502 communicates with base station 200 utilizing BS2D connection 730. More specifically, BS2D communication section 502 receives control signaling for D2UE connection 710 from base station 200 and transmits control signaling for D2UE connection 710 to base station 200. The control signaling includes signaling for establishing/configuring/re-configuring/re-establishing/and releasing D2UE connection 710. Signaling for D2UE connection handover may also be included in the control signaling. In some embodiments, the control signaling may be an RRC layer signaling in LTE. The control signaling is transmitted to the D2UE communication section 504. The control signaling may include parameters for at least one of physical layer, MAC layer, RLC layer, PDCP layer, or RRC layer for D2UE connection 710. The control signaling may include information for the radio bearers.

Furthermore, the control signaling may include radio resource control information for D2UE connection 710. As described above, the radio resource control information for D2UE connection 710 may include radio resource information that can be utilized by D2UE connection 710 or may include radio resource information that cannot be utilized by the D2UE connection. The radio resource may include at least one of a time domain resource, a frequency domain resource, and a code domain resource. The radio resource control information may also be transmitted to the D2UE connection.

Furthermore, the control signaling may include link adaptation information for the D2UE connection. More specifically, the link adaptation may be one of power control and adaptive modulation and coding. The power control information may include information on the maximum transmission output power in the D2UE connection.

In some embodiments, the control signaling may include measurement results for D2UE connection 710. More specifically, BS2D communication section 502 may transmit measurement results, which are obtained by D2UE communication section 504. The measurement results include radio link quality in UL for the D2UE link such as path loss between the small-node device and the user equipment, received signal-to-interference ratio (SIR) in UL for the D2UE link, UL inference power, and so on. The measurements for user equipment may concern the currently-connected user equipment over the D2UE connection or may concern a user equipment that is not currently connected to the small-node device using the D2UE connection. Alternatively, the measurement results include a radio link quality between the reporting small-node device and other small-node devices.

D2UE communication section 504 communicates with user equipment 100 utilizing D2UE connection 710. More specifically; D2UE communication section 504 establishes/configures/re-configures/re-establishes/and releases D2UE connection 710 between small-node device 500 and user equipment 100. This management of D2UE connection 710 may be based on the control signaling transmitted by base station 200.

D2UE communication section 504 may conduct a link adaptation for D2UE connection 710, such as power control and adaptive modulation and coding. Furthermore, D2UE communication section 504 transmits data to user equipment 100 and receives data from user equipment 100 utilizing the D2UE connection 710. As described above, data for some of the radio bearers may be transmitted in D2UE connection 710.

Hereinafter, data transferred from the user equipment 100 to server 600 (or server 610) is called "uplink data" and data transferred from the server 600 (or server 610) to user equipment 100 is called "downlink data," D2UE communication section 504 transmits the downlink data to user equipment 100 using D2UE connection 710. The downlink data is transferred from server 600 via core network 400 and backhaul communication section 506. D2UE communication section 504 receives the uplink data from user equipment 100 over D2UE connection 710. The uplink data is then transferred to server 600 via backhaul communication section 506 and core network 400. D2UE communication section 504 also conducts measurements for D2UE connection 710. More specifically, D2UE communication section 504 make measurements of the radio link quality for D2UE connection 710 between small-node device 500 and user equipment 100. The radio link quality may be at least one of pilot signal received power, path loss, signal-to-interference ratio, channel state information, channel quality indicator, and received signal strength indicator for UL in D2UE connection 710. The radio link quality may be calculated using the pilot signal transmitted by the currently-connected user equipment. The path loss is between small-node device 500 and the user equipment. The measurements may include the interference power level in the frequency band over which the D2UE communication operates. In some embodiments, D2UE communication section 504 may make measurements of the radio link quality between small-node device 500 and other small-node devices. D2UE communication section 504 reports the measurement results to base station 200 via BS2D communication section 502 and BS2D connection 730.

Backhaul communication section 506 is connected to core network 400 via a backhaul link. The backhaul link may be a wired connection or a wireless connection or a mixture of a wired connection and a wireless connection. The wireless connection may be a connection provided by a WiFi (Wireless LAN) or cellular system.

Backhaul communication section 506 transmits to D2UE communication section 504 the downlink data, which is transferred via the backhaul link from core network 400. Backhaul communication section 506 transmits to the core network the uplink data (which is transferred from the D2UE communication section 504) via the backhaul link.

Figure 11B:
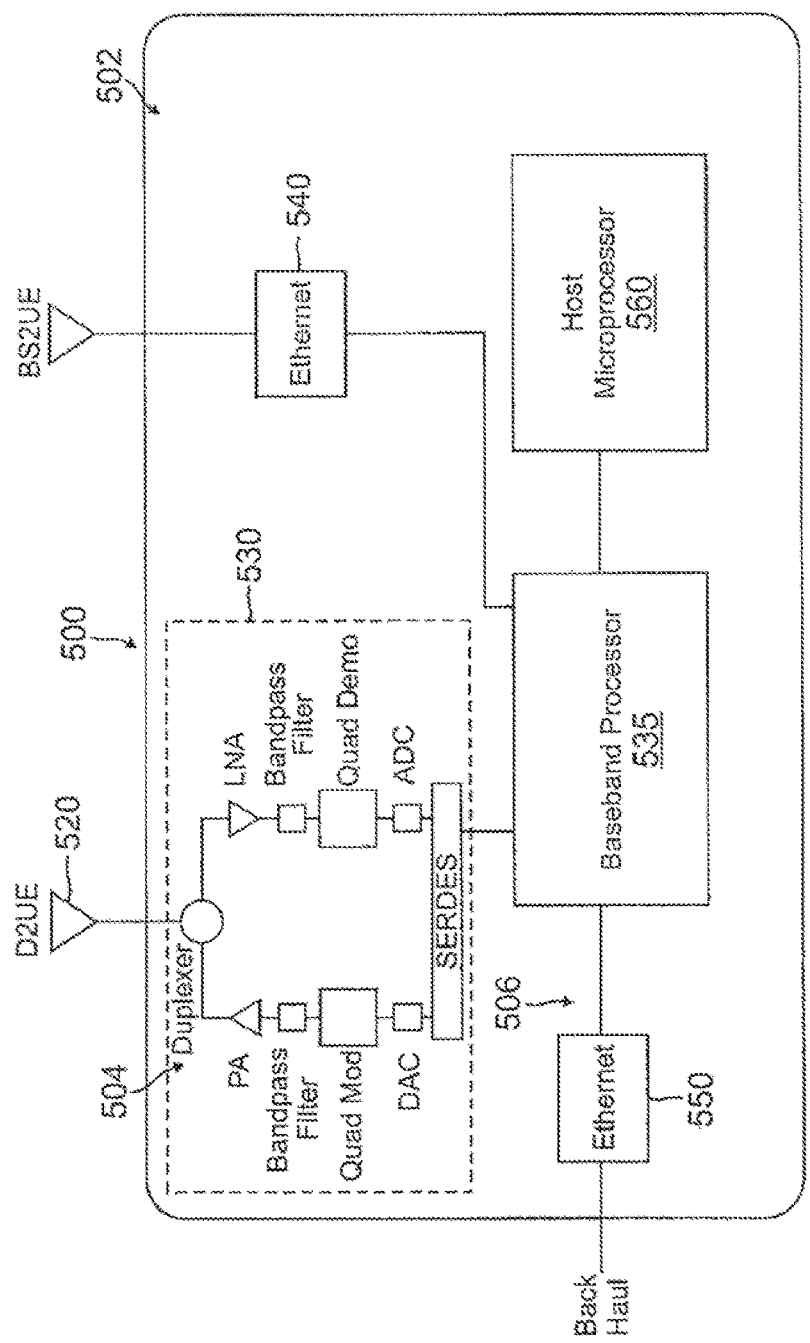
FIG. 11B is a more-detailed block diagram for a small-node device embodiment shown in FIG. 11A.

One of ordinary skill in the art will readily appreciate that the functional blocks shown in FIG. 11A would comprise appropriate hardware and software. For example, FIG. 11B shows an example instantiation of these blocks. As seen in FIG. 11B, small-node device 500 includes an RF interface 530 for the D2UE link. Data from the UE would be received over the D2UE link at an antenna 520 that couples to RF interface 530. RF interface 530 includes a duplexer to enable both receive and transmit functionality at antenna 520. Baseband data to be transmitted to the UE is received at RF interface 530 from a baseband processor 535. A SERDES serializes the baseband data followed by a conversion to analog form in a digital-to-analog converter (DAC). The resulting analog signal is then processed by a quadrature modulator to modulate the desired carrier frequency. After passing through a bandpass filter and a power amplifier (PA), the resulting RF signal is then ready for transmission to the UE. Reception of data from the UE is similar except that the PA is replaced by a low noise amplifier (LNA) and the quadrature modulator is replaced by a quadrature demodulator. The resulting analog baseband data is then converted to digital form in an analog-to-digital converter (ADC) before being de-serialized in the SERDES.

In embodiments in which the BS2D link is a wireless link, small-node device 500 may include another RF interface analogous to RE interface 530 to service the BS2D The embodiment of FIG. 11B, however, uses a wired BS2D link. To service such a link, small-node device 500 includes a suitable interface card or circuit such as an Ethernet interface 540. Control signaling exchanged between the small-node device and the base station passes couples through Ethernet interface 540 to baseband processor 535.

In FIG. 11B, the backhaul link is also a wired Ethernet link that is received by an Ethernet interface 550. Downlink data from the backhaul link thus passes from the Ethernet interface to the baseband processor, which in turn is controlled by a host microprocessor 560. Backhaul communication section 506 of FIG. 11A thus maps to Ethernet interface 550 as well as the supporting functions carried out by baseband processor 535 and host microprocessor 560. Similarly, BS2D communication section 502 maps to Ethernet interface 540 and the supporting functions performed by baseband processor 535 and host microprocessor 560. Finally, D2UE communication section 505 maps to antenna 520, RF interface 530, and the supporting functions performed by baseband processor 535 and host microprocessor 560.

Figure 12:
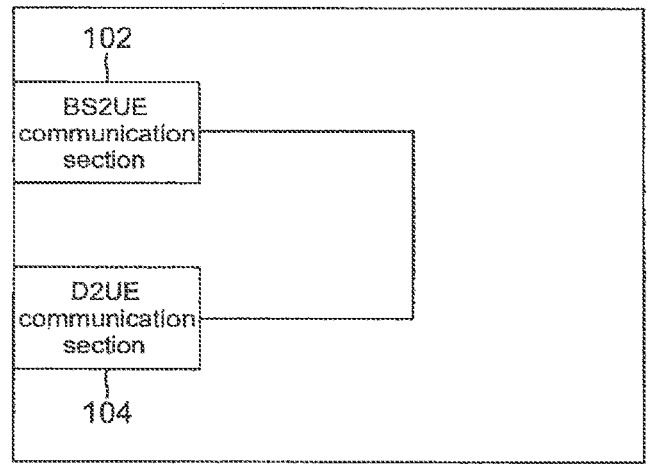
FIG. 12 is a block diagram for an example user equipment.

A block diagram for an example user equipment 100 embodiment is shown in FIG. 12. User equipment 100 includes a BS2UE communication section 102 and a D2UE communication section 104, which are connected to each other. BS2UE communication section 102 communicates with base station 200 utilizing BS2UE connection 720. As described above, data for some of radio bearers may be transmitted in BS2UE connection 720. For example, control signaling such as RRC signaling, NAS signaling, and MAC layer signaling may be transmitted in BS2UE connection 720. Furthermore, packets for Voice over IP (VoIP) may also be transmitted in BS2UE connection 720. BS2UE communication section 102 may transmit/receive data for all radio bearers to and from the base station 200 if D2UE connection 710 is dropped or not available. Furthermore, BS2UE communication section 102 receives control signaling for D2UE connection 710 from base station 200 and transmits control signaling for D2UE connection 710 to base station 200. Such control signaling is the same or analogous to that described above for small-node device 500 of FIG. 11A.

The control signaling is analogous because it includes signaling for establishing/configuring/re-configuring/re-establishing/and releasing D2UE connection 710. Signaling for D2UE connection handover may also be included in the control signaling. The control signaling may be an RRC layer signaling in LTE. Alternatively, the control signaling may be a MAC layer signaling in LTE. In yet another alternative embodiment, some of the control signaling may be an RRC signaling and others may be a MAC layer signaling. The control signaling is transmitted to D2UE communication section 104. The control signaling may include parameters for at least one of physical layer, MAC layer, RLC layer, PDCP layer, or RRC layer for D2UE connection 710. The control signaling may include information for the radio bearers.

In addition, the control signaling may include radio resource control information for D2UE connection 710. As described above, the radio resource control information for D2UE connection 710 may include radio resource information that can be utilized by D2UE connection 710 or may include radio resource information that cannot be utilized by the D2UE connection. The radio resource may include at least one of a time domain resource, a frequency domain resource, and a code domain resource. The radio resource control information may also be transmitted to the D2UE connection.

Furthermore, the control signaling may include link adaptation information for the D2UE connection. More specifically, the link adaptation may be one of power control and adaptive modulation and coding. The power control information may include information on the maximum transmission output power in the D2UE connection.

Finally, the control signaling may include measurement results for D2UE connection 710. More specifically, BS2UE communication section 102 may transmit measurement results, which are obtained by D2UE communication section 104. The measurement results include radio link quality in DL for the D2UE link such as path loss between the small-node device and the user equipment, received signal-to-interference ratio (SIR) in DL for the D2UE link, DL interference power, and so on. The measurements for small-node device may concern the currently-connected small-node device or may concern neighbor small-node devices. The currently-connected small-node device may be denoted as a serving small-node device. Details of the radio link quality in DL will be described further below.

D2UE communication section 104 communicates with small-node device 500 over D2UE connection 710. More specifically, D2UE communication section 104 establishes/configures/re-configures/re-establishes/releases D2UE connection 710 between small-node device 500 and user equipment 100. The management of D2UE connection 710 may be based on the control signaling transmitted by base station 200. D2UE communication section 104 may conduct a link adaptation for D2UE connection 710, such as power control and adaptive modulation and coding. Furthermore, D2UE communication section 104 transmits data to small-node device 500 in UL and receives data from the small-node device in DL utilizing D2UE connection 710. As described above, data for some of the radio bearers may be transmitted in D2UE connection 710.

D2UE communication section 104 also conducts measurements for D2UE connection 710. More specifically, D2UE communication section 104 makes measurements of the DL radio link quality for the D2UE connection between user equipment 100 and the currently-connected small-node device or a neighbor small-node device. The DL radio link quality may be at least one of pilot signal received power, path loss, signal-to-interference ratio, channel state information, channel quality indicator, and received signal strength indicator. The radio link quality may be calculated by the pilot signal transmitted by the serving small-node device or a neighbor small node device. The path loss is the one between user equipment 100 and the serving small-node device or a neighbor small node device. D2UE communication section 104 reports the measurement results to base station 200 via BS2UE communication section 102 and BS2UE connection 720.

Figure 13:
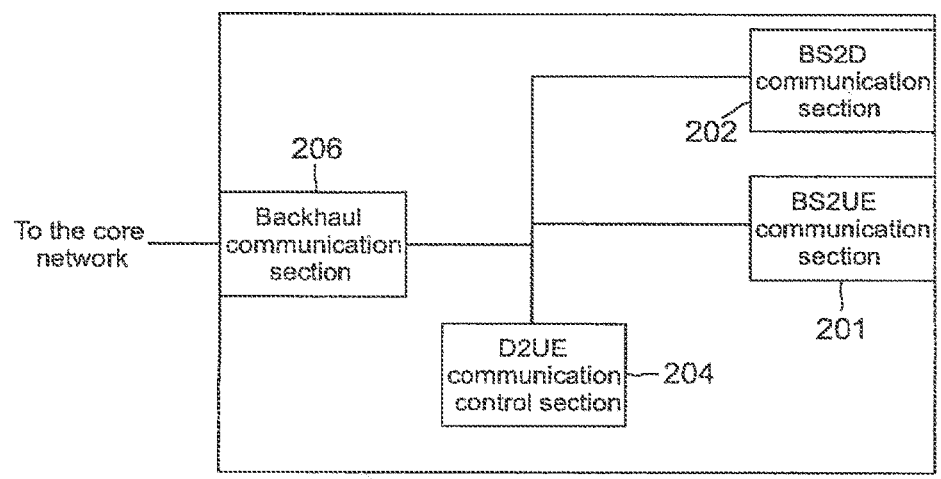
FIG. 13 is a block diagram for an example base station.

A block diagram for an example base station 200 is shown in FIG. 13. Base station 200 includes a BS2UE communication section 201, a BS2D communication section 202, a D2UE communication control section 204, and a backhaul communication section 206, which are all connected to each other.

BS2UE communication section 201 communicates with the user equipment utilizing BS2UE connection 720. As described above, data for some of radio bearers are transmitted in BS2UE connection 720. For example, control signaling such as RRC signaling and NAS signaling and MAC layer signaling may be transmitted in BS2UE connection 720. Furthermore, packets for Voice over IP (VoIP) may also be transmitted in BS2UE connection 720. Data for some other data bearers may also be transmitted in the BS2UE connection 720.

As also described above, BS2UE communication section 201 may transmit/receive data for all radio bearers to and from user equipment 100, when D2UE connection 710 is dropped or not available. Some parts of data, such as U-plane data, transmitted from user equipment 100 are transferred to core network 400 via BS2UE communication section 201 and backhaul communication section 206. Some parts of data, such as U-plane data, transmitted from server 400 are transferred to user equipment 100 via backhaul communication section 206 and the BS2UE communication section 201.

Furthermore, BS2UE communication section 201 receives control signaling for D2UE connection 710 from user equipment 100 and transmits control signaling for D2UE connection 710 to user equipment 100. This control signaling is the same as that for user equipment 100 and thus its description will not be repeated.

BS2D communication section 202 communicates with small-node device 500 utilizing BS2D connection 730. BS2D communication section 202 receives control signaling for D2UE connection 710 from small-node device 500 and transmits control signaling for D2UE connection 710 to small-node device 500. This control signaling is the same as that for small-node device 500 and thus its description will not be repeated.

The control signaling for D2UE connection 710 is produced by the D2UE communication control section 204 as described below and is transferred to the user equipment 100 via the BS2UE communication section 201. The control signaling is also transmitted to the small-node device via the BS2D communication section 202.

D2UE communication control section 204 conducts radio link connection control for D2UE connection 710. The radio link connection control includes at least one of establishing/configuring/re-configuring/re-configuring/re-establishing/re-leasing D2UE connection 710. The parameters for the radio link connection control are transmitted to user equipment 100 via BS2UE communication section 201 and to small-node device 500 via BS2D communication section 202. These parameters may include at least one of physical layer, MAC layer, RLC layer, PDCP layer, and RRC layer parameters. The parameters may include the information for the radio bearers. The radio link connection control may be denoted herein as radio resource control.

More specifically, D2UE communication control section 204 may determine that D2UE connection 710 should be released when the path loss between user equipment 100 and small-node device 500 is larger than a threshold. For example, D2UE communication control section 204 may send control signaling to release D2UE connection 710. The D2UE communication control section may conduct such determination based on the measurement reports which are transmitted by at least one of user equipment 100 and small-node device 500. More specifically, at least one of user equipment 100 and small-node device 500 may detect whether or not the path loss is larger than the threshold and send the measurement reports in case that the path loss is larger than the threshold. D2UE communication control section 204 may send the control signaling to at least one of the user equipment 100 and the small-node device 500 after it receives the measurement reports. In the above examples, DL transmission power or UL transmission power in D2UE connection 710 may be utilized instead of the path loss.

D2UE communication control section 204 also controls handover of the D2UE connection between the user equipment 100 and small-node device 500. More specifically, D2UE communication control section 204 receives the measurement reports from user equipment 100 and determines whether or not user equipment 100 should hand over to a closer neighboring small-node device. Here, the designation of a "serving small-node device" refers to the small-node device that currently has the D2UE connection with the user equipment.

In addition, D2UE communication control section 204 may control the radio resource for the D2UE connections. More specifically, D2UE communication control section 204 may assign the radio resource for a D2UE connection so that it will not interfere with other D2UE connection and vice versa. In this fashion the radio resource of one D2UE connection will not overlap with remaining D2UE connections. The radio resource may be indicated to the user equipment and the small-node device by radio resource control parameters. The parameters may include at least one of ID of the frequency domain resource, ID of the time domain resource, and ID of the code domain resource. The radio resource, which is assigned to the D2UE connection, may be determined based on the number of user equipment in the cell having the serving small-node device or based on an interference level in the frequency band in which the D2UE communication operates.

Furthermore, D2UE communication control section 204 may control the link adaptation for D2UE connection 710. More specifically, the link adaptation may be one of power control and adaptive modulation and coding. The power control information may include information on the maximum transmission output power for DL or UL in the D2UE connection 710.

The control signaling, which is determined based on the above-described control in D2UE communication control section 204, is transmitted to the user equipment via BS2UE communication section 201. The control signaling is transmitted to the small-node device via BS2D communication section 202.

Backhaul communication section 206 provides the downlink data received from core network 400 to BS2UE communication section 201. Similarly, BS2UE communication section 201 provides uplink data to backhaul communication section 206, which then transmits the uplink data to core network 400.

One of ordinary skill will readily appreciate that the functional blocks shown in FIGS. 12 and 13 for user equipment 100 and base station 200, respectively, would map to analogous components as discussed with regard to user equipment 500. For example, the user equipment would require two analogous RF interfaces for Macro2D communication section 102 and D2D communication section 104.

These RF interfaces would cooperate with appropriate processor such as a baseband processor and a host microprocessor.

Figure 14A:
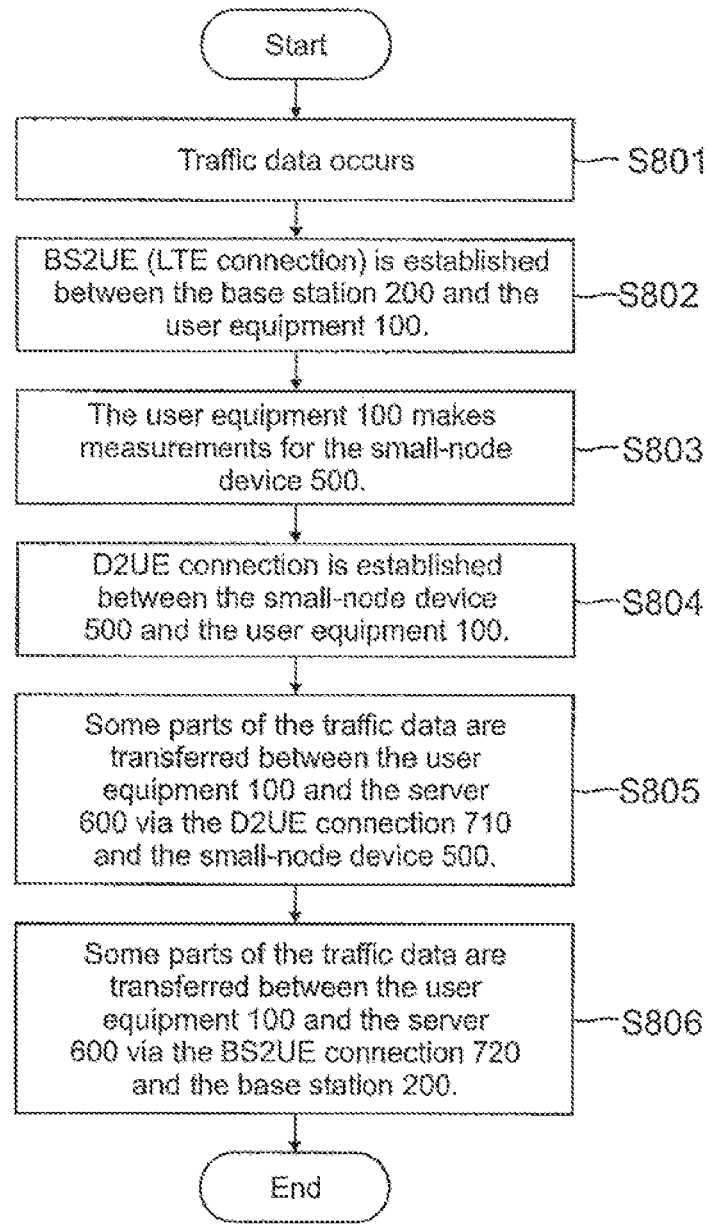
FIG. 14A is a flowchart for a D2UE connection establishment method.
Figure 14B:
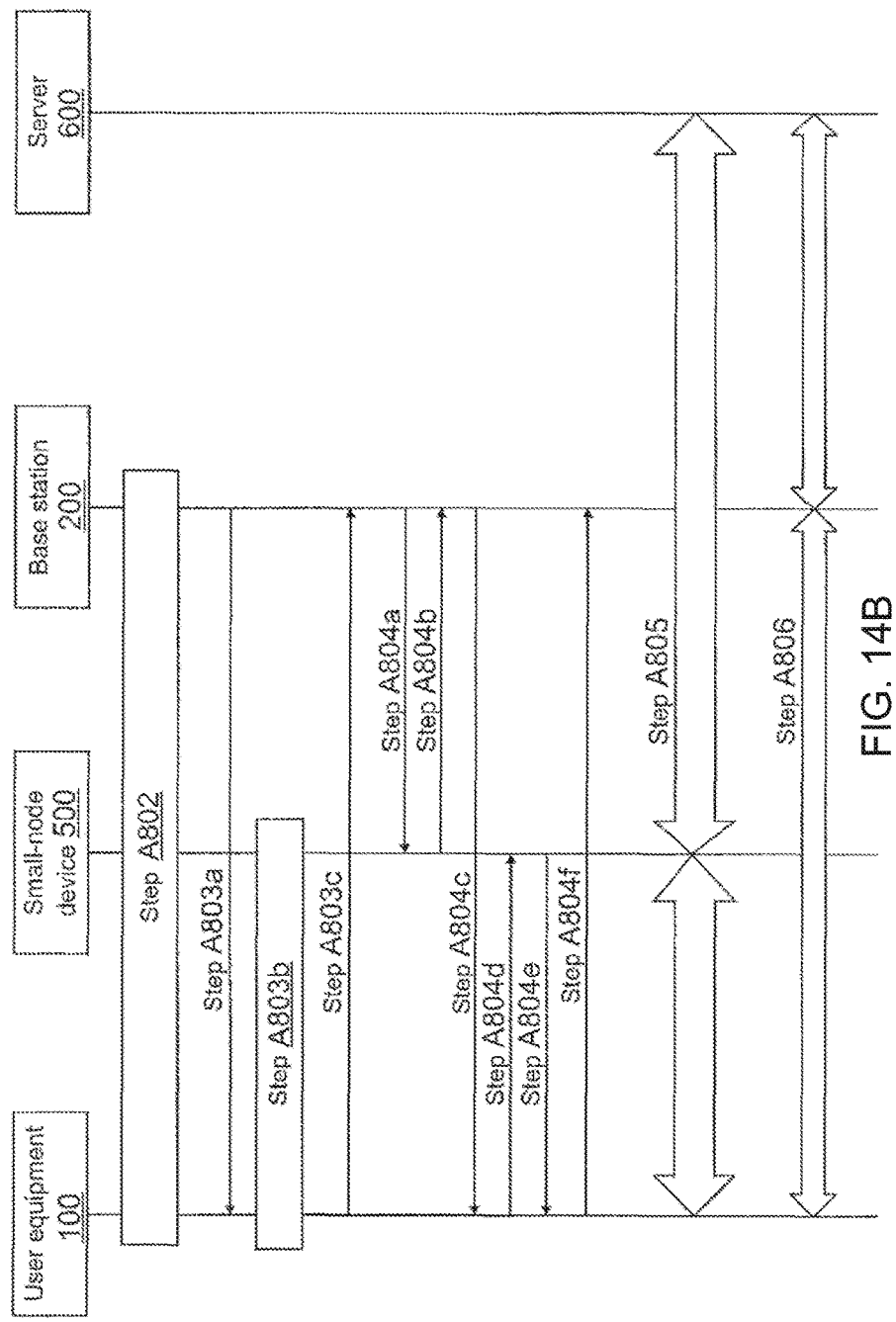
FIG. 14B is a flow diagram for the steps shown in FIG. 14A.

Operation of the mobile communication system described herein may be better understood with reference to the flowchart shown in FIGS. 14A and 14B, which address the establishment of connections in response to the occurrence of traffic data to be transmitted. The flowchart begins with a step S801 with the occurrence of traffic data, either uplink and/or downlink data. For example, the traffic data may correspond to sending/receiving e-mails, browsing web sites, downloading files, or uploading files.

In a step S802, an LTE connection (BS2UE connection 720) between base station 200 and user equipment 100 is established. If the connection is triggered by the user equipment, the user equipment may initiate the connection by random access procedures. If the connection is triggered by server 600, the base station may send a paging message to initiate the connection. Step S802 corresponds to Step A802 in FIG. 14B.

In the embodiments of FIGS. 14A and 14B, it is assumed that BS2D connection 730 is always configured between base station 200 and small-node device 500. In some other embodiments, however, a connection between base station 200 and small-node device 500 (the BS2D connection 730) is established in step S802 or just after step S802. The establishment may be triggered by base station 200 using control signaling. Furthermore, small-node device 500 may start transmitting pilot signals for D2UE connection 710 after it is requested by base station 200 in the above establishment procedures. As a result, it may not cause significant interference with other communications in the frequency band when it does not transmit the pilot signals.

In a step S803, user equipment 100 makes measurements for the D2UE connection. In particular, user equipment 100 makes measurements for the DL radio link quality in the D2UE connection. More specifically, user equipment 100 transmits to the base station a measurement report, which notifies the base station of an identification number for the small-node device having the best DL radio link quality.

In one embodiment, the measurements for the D2UE connection may be conducted as illustrated in the steps A803a, A803b and A803c in FIG. 14B. In a step A803a, the base station transmits control signaling to the user equipment in BS2UE connection 720 and orders for the user equipment to make measurements for the D2UE connection so that the user equipment detects the small-node device with the best radio link quality.

The control signaling may include information for the measurements. For example, the control signaling may include at least one of carrier frequency for the D2UE connection, bandwidth of the D2UE connection, an identification number for the small-node device, information on measurement quantity, information on the pilot signals transmitted by the small-node device and so on. The information on the measurement quantity may be an indicator of RSRP or RSRQ. The information on the pilot signals may concern the radio resource of the pilot signals. More specifically, the pilot signal information may be at least one of the transmission periodicity of the pilot signals, the frequency-domain resource information of the pilot signals, the time-domain resource information of the pilot signals, and the like. As discussed further, a time offset between the D2UE connection and the BS2UE connection may also be included in the information on the pilot signals. Furthermore, transmission power of the pilot signals may be include in the information on the pilot signals.

Furthermore, rules for sending measurement reports to the base station 200 may also be included in the information for the measurements. The rules may include criteria, which are similar to the ones for LTE, such as Event A1, A2, A3, A4, A5 and the like, which is specified in TS 36.331. Threshold value or Layer-3 filtering coefficient, Time-to-trigger may also be included in the information for the measurements. In addition, control signaling for cell selection/reselection may also be included in the information for the measurements. For example, control signaling for idle-mode measurements may also be included in the information for the measurements.

The control signaling may be transmitted in the dedicated control signaling or in the broadcast information.

The control signaling in the step S803 may include an indicator whether or not the D2UE connection is available in the cell wherein base station 200 provides the radio communication system for user equipment 100. The control signaling may be transmitted in the step A802, instead of the step A803a.

In a step A803b, user equipment 100 makes measurements for the DL radio link quality in the D2UE connection.

In a step A803c, user equipment 100 transmits to base station 200 a measurement report in BS2UE connection 720, which notifies base station 200 of an identification number of the small-node device having the best DL radio link quality.

In a step S804, the D2UE connection between the user equipment and the small-node device (D2UE connection 710) is established. The base station orders for the user equipment and the small-node device to configure D2UE connection 710. The parameters for D2UE connection 710 are transmitted from base station 200 to user equipment 100 and small-node device 500 in BS2UE connection 720 and in BS2D connection 730, respectively. Furthermore, the establishment of D2UE connection 710 may be reported to base station 200 by user equipment 100 and/or the small-node device. Step S804 corresponds to steps A804a to A804f in FIG. 14B. In other words, the establishment of D2UE connection 710 may be conducted as illustrated in steps A804a, A804b, A804c, A804d, A804e, and A804f in FIG. 14B.

In a step A804a, base station 200 transmits control signaling to small-node device 500 in BS2D connection 730 and orders small-node device 500 to establish D2UE connection 710 with user equipment 100. In general, this small-node device is the one which has the best DL radio link quality based on the measurement report. In a step A804b, small-node device 500 may transmit acknowledgement of the received control signaling from step A804a. The control signaling may include at least one of an identification number of user equipment 100, capability information of user equipment 100, and the like.

In a step A804c, base station 200 transmits control signaling to user equipment 100 in BS2UE connection 720 and orders user equipment 100 to establish D2UE connection 710 with small-node device 500. For example, the control signaling of step A804c may include at least one of the following parameters:

Radio bearer information for D2UE connection 710
Carrier frequency information of D2UE connection 710
Frequency band indicator of D2UE connection 710
System bandwidth (Channel bandwidth) of D2UE connection 710
Cell barred information on D2UE connection 710
Identification number of small-node device 500

UL Maximum transmission power in D2UE connection 710

Information of DL and UL slots in D2UE connection 710 (in case of TDD)

Information of random access channel for D2UE connection 710

Information of uplink physical control channels, such as PUCCH for D2UE connection 710

Information of downlink physical control channels, such as PDCCH, PHICH for D2UE connection 710

Information of uplink physical shared channel for D2UE connection 710

Information of downlink physical shared channel for D2UE connection 710

Information of uplink sounding reference signal for D2UE connection 710

Information of uplink power control information for D2UE connection 710

Information of downlink or uplink cyclic prefix information for D2UE connection 710

Information of time alignment control in uplink for D2UE connection 710

Information of RLC or PDCP configuration for each radio bearer for D2UE connection 710

Information of MAC configuration for D2UE connection 710

Information of security for D2UE connection 710

Part or all of the information in step A804*c* may be transmitted to the small-node device 500 in step A804*a*.

The radio bearer information may indicate what kind of radio bearers should be configured for D2UE connection 710 or what kind of priority should be specified for each radio bearer. Since the parameters for D2UE connection 710 can be transmitted in step A804*c*, small-node device 500 may not have to transmit broadcast channels, which reduces small-node device complexity.

In a step A804*d*, user equipment 100 transmits control signaling to establish a connection between user equipment 100 and small-node device 500 (the D2UE connection 710). The control signaling may be a random access signaling. Alternatively, the control signaling may be a pre-assigned access signaling. Radio resource information of the pre-assigned access signaling may be transmitted to user equipment 100 by base station 200 in step A804*c*.

The radio resource information of the pre-assigned access signaling may be configured by base station 200. In this case, base station 200 may notify small-node device 500 of the radio resource information in step A804*a*. Alternatively, the radio resource information of the pre-assigned access signaling may be configured by small-node device 500. In such an embodiment, small-node device 500 may notify the base station 200 of the radio resource information in step A804*b*.

In a step A804*e*, small-node device 500 transmits acknowledgement of the control signaling transmitted in step A804*d*. As a result, D2UE connection 710 can be established.

In a step A804*f*, user equipment 100 transmits control signaling to base station 200 and notifies base station 200 that D2UE connection 710 has been successfully established.

In a step S805, some parts (for example, Data #2 in FIG. 3) of the traffic data are transferred between user equipment 100 and server 600 via D2UE connection 710 and small-node device 500 as discussed above with regard to FIG. 3. The data transmitted in D2UE connection 710 may be data for some parts of radio bearers, which are configured for the communication between user equipment 100 and server 600. More specifically, the data transferred via D2UE connection 710 may be at least one of best effort packets, non-real time service packets, and real time service packets. The data transferred via D2UE connection 710 may be U-plane data. Step S805 corresponds to Step A805 in FIG. 14B.

In a step S806, some parts (e.g., Data #1 in FIG. 3) of the traffic data are transferred between user equipment 100 and server 600 via BS2UE connection 720 and base station 200 as also discussed above with regard to FIG. 3. C-plane data may also be transmitted in BS2UE connection 720 instead of D2UE connection 710. Step S806 corresponds to step A806 in FIG. 14B.

The operations shown in FIG. 14A may be described in terms of the operations in the small-node device 500 as follows. The operations of small-node device 500 comprise establishing D2UE connection 710 with user equipment 100 (step S804) and transferring some parts of data, which are transferred between user equipment 100 and server 600 using D2UE connection 710 (step S805).

The operations shown in FIG. 14A may be described in terms of the operations in user equipment 100 as follows. The operations of user equipment 100 comprise establishing the LTE connection (BS2UE connection 720) with base station 200 (step S802), making measurements for small-node device (step S803), establishing D2UE connection 710 with small-node device 500 (step S804), transferring some parts of data (which are transferred between user equipment 100 and server 600) via D2UE connection 710 and small-node device 500 (step S805), and transferring some parts of data (which are transferred between user equipment 100 and server 600) via BS2UE connection 720 and base station 200 (step S806).

The process shown in FIG. 14A may be described in terms of the operations in the base station 200 as follows. The operations of the base station 200 comprise establishing the LTE connection (BS2UE connection 720) with user equipment 100 (step S802), transmitting control signaling for establishing D2UE connection 710 (step S804), and transferring some parts of data (which are transferred between user equipment 100 and server 600) using BS2UE connection 720 (step S806). In D2UE connection 710, some parts of data (which are transferred between user equipment 100 and the server 600) are transferred via D2UE connection 710 and the small-node device 500.

Figure 15:
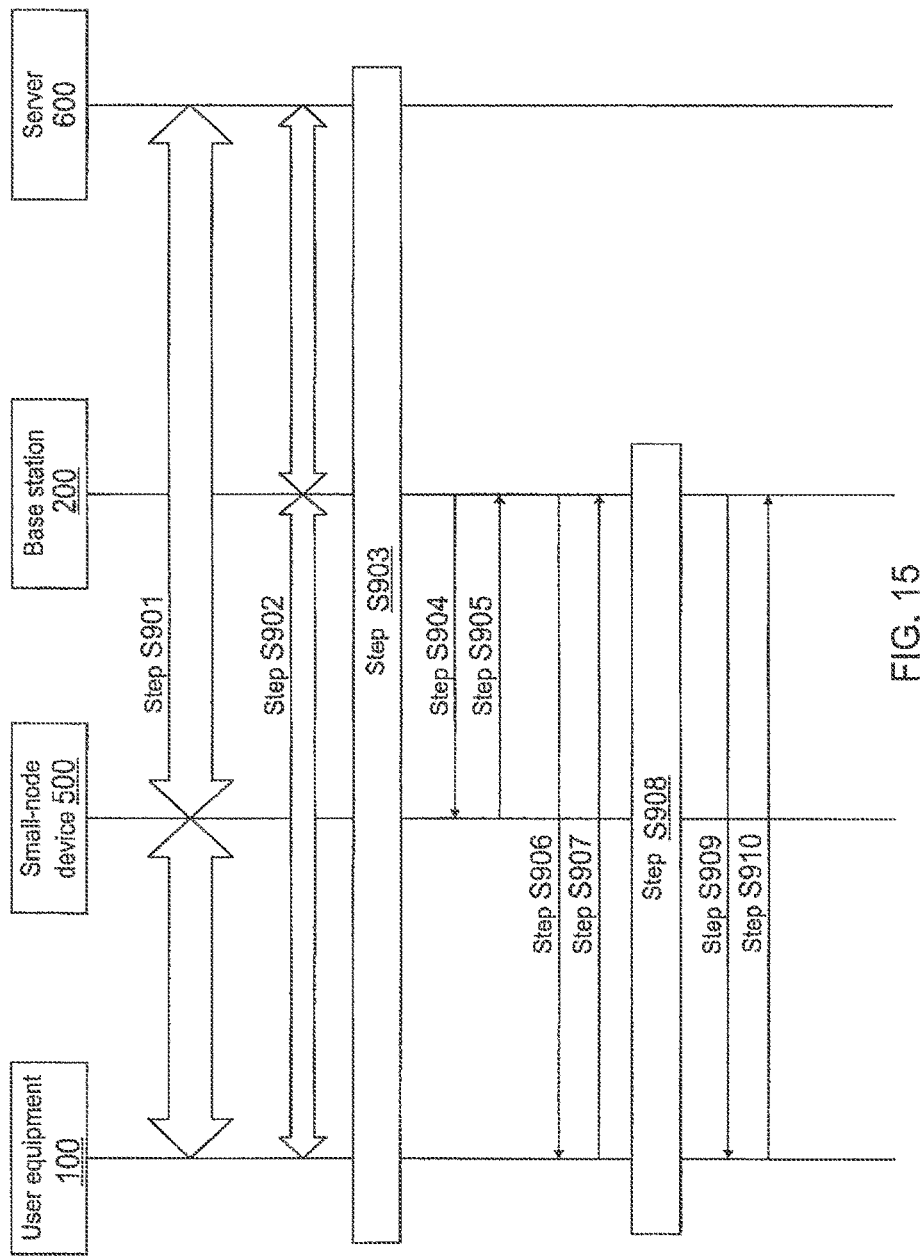
FIG. 15 is a flow diagram for the release of a D2UE connection.

Referring to FIG. 15, an operation of the mobile communication system according to an embodiment is described. In a step S901, some parts of the traffic data are transferred between user equipment 100 and server 600 via D2UE connection 710 and small-node device 500. In a step S902, some parts of the traffic data are transferred between user equipment 100 and server 600 via BS2UE connection 720 and base station 200. Steps S901 and S902 may be the same as steps S805 and S806, respectively, i.e. steps S901 and S902 may be a continuation of steps S805 and S806.

In a step S903, there is no more traffic data to be transferred between the user equipment 100 and the server 600. More specifically, step S903 may correspond to the end of sending/receiving e-mails, browsing web sites, downloading files, uploading files and the like.

In a step S904, base station 200 transmits control signaling to small-node device 500 and notifies small-node device 500 that D2UE connection 710 should be released. In a step S905, small-node device 500 transmits acknowledgement of the notification of step S904.

In a step S906, base station 200 transmits control signaling to user equipment 100 and notifies user equipment 100 that D2UE connection 710 should be released. In a step S907, user equipment 100 transmits acknowledgement of the notification of step S906. Steps S906 and S907 may be conducted before steps S904 and S905. Alternatively, steps S906 and S907 may be conducted simultaneously with steps S904 and S905.

Responsive to the control signaling in steps S904 and S906, D2UE connection 710 is released in a step S908. Steps S905 and S907 may be conducted after step S908 so that user equipment 100 or small-node device 500 can report that D2UE connection 710 is released.

In a step S909, base station 200 transmits control signaling to user equipment 100 and notifies user equipment 100 that BS2UE connection 720 is released. In a step S910, user equipment 100 transmits acknowledgement of the control signaling of step S909 to base station 200. Steps S909 and S910 correspond to normal procedures to release a LTE connection.

In the embodiment described in FIG. 15, base station 200 transmits control signaling to command a release of D2UE connection 710. However, in alternative embodiments, user equipment 100 or small-node device 500 may transmit the control signaling.

The process shown in FIG. 15 may be described in terms of the operations performed by small-node device 500 as follows. The operations of small-node device 500 comprise transferring some parts of data (which are transferred between user equipment 100 and server 600) using D2UE connection 710 (step S901), receiving the control signaling transmitted by base station 200 (step S904), transmitting the acknowledgement of the control signaling to base station 200 (step S905) and releasing D2UE connection 710 with user equipment 100 (step S908).

The process shown in FIG. 15 may be described in terms of the operations performed by user equipment 100 as follows. The operations of user equipment 100 comprise transferring some parts of data (which are transferred between user equipment 100 and server 600) via D2UE connection 710 and small-node device 500 (step S901), transferring some parts of data (which are transferred between user equipment 100 and server 600) via BS2UE connection 720 and base station 200 (step S902), receiving the control signaling transmitted by base station 200 (step S906), transmitting the acknowledgement of the control signaling to base station 200 (step S907), releasing the D2UE connection 710 with user equipment 100 (step S908), and releasing the LTE connection (BS2UE connection 720) in steps S909 and S910.

The process shown in FIG. 15 may be described in terms of the operations performed by base station 200 as follows. The operations of base station 200 comprise transmitting to small-node device 500 control signaling for releasing D2UE connection 710 (step S904), transmitting to user equipment 100 control signaling for releasing D2UE connection 710 (step S906), and releasing BS2UE connection 720 (steps S909 and S910).

Referring to FIG. 16, an operation of the mobile communication system according to another embodiment is illustrated. In a step S1001, some parts of the traffic data are transferred between user equipment 100 and server 600 via D2UE connection 710 and small-node device 500. In a step S1002, some parts of the traffic data are transferred between user equipment 100 and server 600 via BS2UE connection 720 and base station 200. Steps S1001 and S1002 may be the same as steps S805 and S806, respectively, i.e. steps S1001 and S1002 may be a continuation of steps S805 and S806.

In a step S1004, base station 200 transmits control signaling to small-node device 500 and notifies small-node device 500 that D2UE connection 710 should be reconfigured. In a step S1005, base station 200 transmits control signaling to user equipment 100 and notifies user equipment 100 that D2UE connection 710 should be reconfigured. More specifically, the parameters described for the A804*c* may be included in the control signaling for step 1004 or step S1005.

In a step S1006, D2UE connection 710 is re-configured. More specifically, some of the parameters for D2UE connection 710 are changed. The parameters may include at least one of parameters for a frequency domain resource, parameters for a time domain resource, parameters for a code domain resource, parameters for pilot signals for D2UE connection 710, parameters for initial access for D2UE connection 710, parameters for the radio bearers, and parameters for the power control for D2UE connection 710. The parameters for the power control include the information on the maximum transmission output power for DL or UL in D2UE connection 710.

In a step S1007, small-node device 500 transmits control signaling to base station 200 and notifies base station 200 that D2UE connection 710 has successfully been reconfigured. In a step S1008, user equipment 100 transmits control signaling to base station 200 and notifies base station 200 that D2UE connection 710 has successfully been reconfigured.

The process shown in FIG. 16 may be described in terms of the operations in small-node device 500 as follows. The operations of small-node device 500 comprise transferring some parts of data, which are transferred between user equipment 100 and server 600, using D2UE connection 710 (step S1001), receiving control signaling to reconfigure D2UE connection 710 (step S1004), reconfiguring D2UE connection 710 (step S1006), and transmitting control signaling to report that D2UE connection 710 has been reconfigured (step S1008).

The process shown in FIG. 16 may be described in terms of the operations in user equipment 100 as follows. The operations of user equipment 100 comprise transferring some parts of data, which are transferred between user equipment 100 and server 600, using D2UE connection 710 (step S1001), transferring some parts of data, which are transferred between user equipment 100 and server 600, using BS2UE connection 720 (step S1002), receiving control signaling to reconfigure D2UE connection 710 (step S1005), reconfiguring D2UE connection 710 (step S1006), and transmitting control signaling to report that D2UE connection 710 has been reconfigured (step S1008).

The process shown in FIG. 16 may be described in terms of the operations in base station 200 as follows. The operations of base station 200 comprise transferring some parts of data, which are transferred between user equipment 100 and server 600, using BS2UE connection 720 (step S1002), transmitting to small-node device 500 control signaling to reconfigure D2UE connection 710 (step S1003), transmitting to user equipment 100 control signaling to reconfigure D2UE connection 710 (step S1004), receiving control signaling to report that D2UE connection 710 has been reconfigured (step S1007), and receiving control signaling to report that D2UE connection 710 has been reconfigured (step S1008).

Figure 17A:
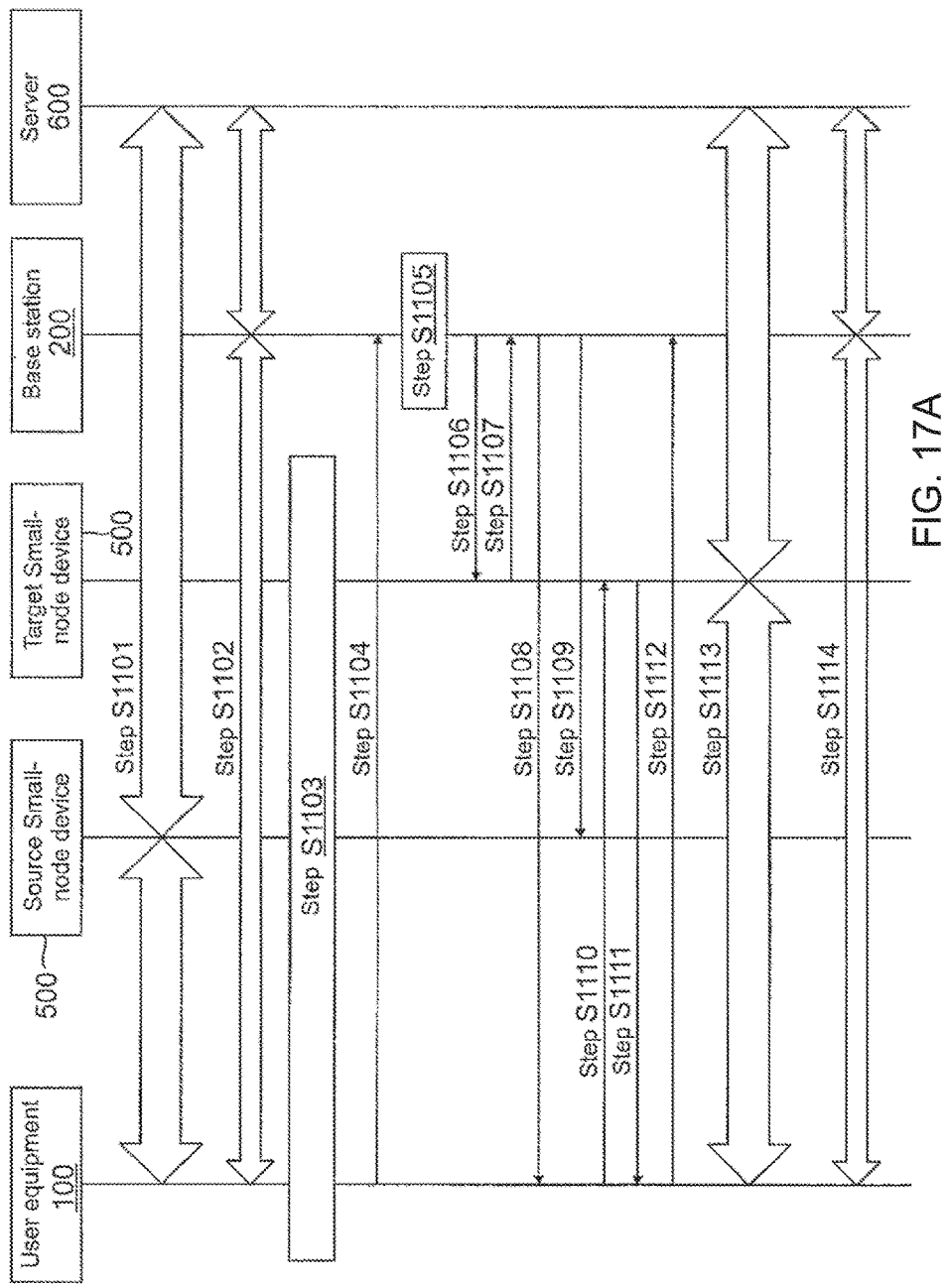
FIG. 17A is a flow diagram for a D2UE link handover.

Referring to FIG. 17A, an operation of the mobile communication system according to another embodiment is illustrated. In a step S1101, some parts of the traffic data are transferred between user equipment 100 and server 600 via D2UE connection 710 and source small-node device 500. In a step S1102, some parts of the traffic data are transferred between user equipment 100 and server 600 via BS2UE connection 720 and base station 200. Steps S1101 and S1102 may be the same as steps S805 and S806, respectively, i.e. steps S1101 and S1102 may be a continuation of steps S805 and S806.

In a step S1103, user equipment 100 makes measurements for the D2UE connection, as described below. That is, user equipment 100 makes measurements for the DL radio link quality of the serving small-node device and the neighbor small-node device. The DL radio link quality may be at least one of pilot signal received power, path loss, signal-to-interference ratio (SIR), channel state information, channel quality indicator, received signal strength indicator, and the like.

Figure 17B:
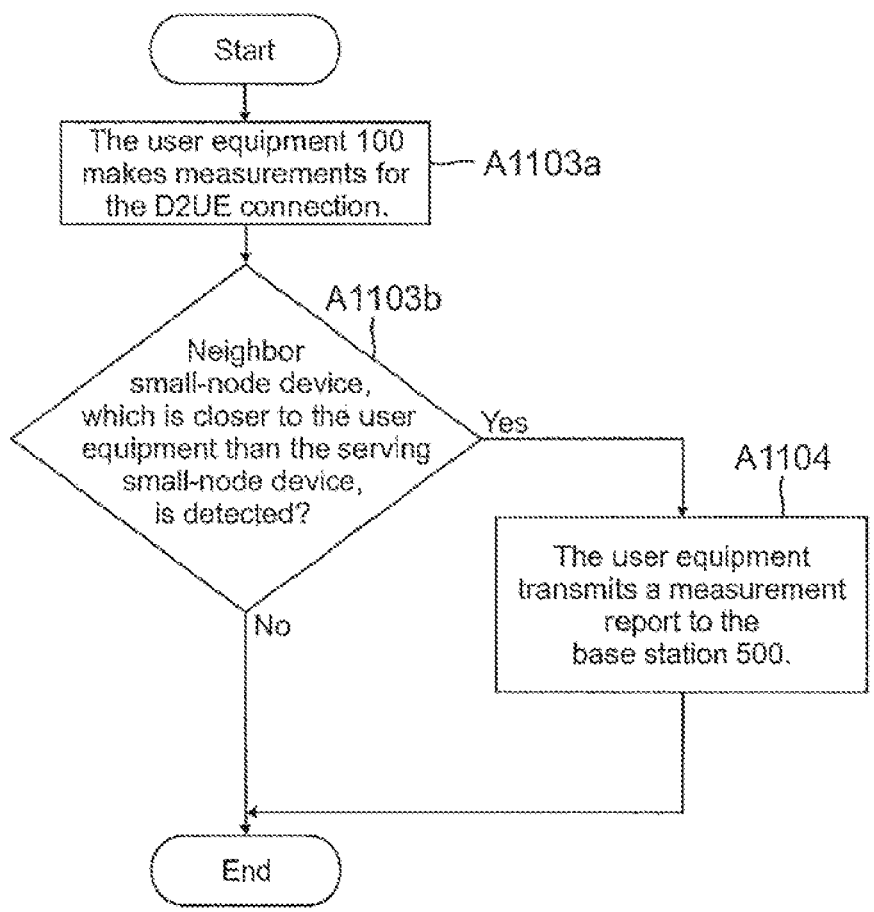
FIG. 17B is a flowchart for a user equipment measurement technique to detect the presence of closer neighbor small-node devices.

More specifically, user equipment 100 determines whether or not a neighbor small-node device, which is closer to the user equipment 100 than the serving small-node device, is detected and transmits to the base station a measurement report if the neighbor small-node device is detected as illustrated in FIG. 17B. User equipment 100 makes measurements for the D2UE connection in a step A1103a.

In a step A1103b, user equipment 100 determines whether or not a neighbor small-node device, which is closer to the user equipment than the serving small-node device, is detected. The serving small-node device means the small-node device (a source small-node device), which is currently communicating with the user equipment. More specifically, if the radio link quality of the neighbor small-node device is higher than that of the serving small-node device, it may be determined that the neighbor small-node device is closer to the user equipment than the serving small-node device.

If the neighbor small-node device is closer to the user equipment than the serving small-node device (step A1103b: YES), the user equipment transmits a measurement report to the base station so as to notify the base station that the neighbor small-node device is detected. Step A1103b corresponds to step S1104 in FIG. 17A.

If the neighbor small-node device is not closer to the user equipment than the serving small-node device (step A1103b: NO), the user equipment does not transmits the measurement report to the base station. Steps A1103a and A1103b of FIG. 17B correspond to step S1103 in FIG. 17B.

In a step S1104, the user equipment transmits a measurement report to the base station so as to notify it that a closer neighbor small-node device is detected. Hereinafter, the serving small-node device is denoted as a "Source small-node device" and the neighbor small-node device is denoted as a "Target small-node device."

The base station makes a decision that the user equipment should handover to the neighbor small-node device (the target small-node device) in a step S1105.

In a step S1106, the base station transmits control signaling to the target small-node device for handover preparation. The control signaling may be called "handover request for D2UE connection." More specifically, the base station notifies the target small-node device of parameters for it to establish the D2UE connection with the user equipment. The parameters described in step A804a may be included in the control signaling of step S1106.

In a step S1107, the target small-node device transmits acknowledgement of the control signaling of step S1106.

In step S1108, the base station 200 transmits control signaling to the user equipment and orders for the user equipment to make handover to the target small-node device. The control signaling may include connection information for D2UE connection 710. More specifically, the connection information may include at least one of information on measurement configuration for D2UE connection 710, information on mobility control for D2UE connection 710, radio resource control information for D2UE connection 710, and the like.

Furthermore, the radio resource control information for D2UE connection 710 may include at least one of radio bearer information for D2UE connection 710, information for PDCP layer configuration in D2UE connection 710, information for RLC layer configuration in D2UE connection 710, information for MAC layer configuration in D2UE connection 710, information for physical layer configuration in D2UE connection 710, and the like. More specifically, the parameters described for step A804c may be included in the radio resource control information for D2UE connection 710.

In a step S1109, base station 200 transmits control signaling to the source small-node device 500 and notifies it that user equipment 100 should make handover to the target small-node device. Source small-node device 500 ends the communications with user equipment 100 based on the control signaling, i.e. the source small-node device releases D2UE connection 710.

In a step S1110, the user equipment transmits control signaling to establish a connection between the user equipment and the target small-node device. The control signaling may be a random access signaling and may be the same as the one in step A804c.

In a step S1111, the target small-node device 500 transmits acknowledgement of the control signaling transmitted in step S1110. As a result, the D2UE connection can be established between user equipment 100 and the target small-node device.

In a step S1112, the user equipment transmits control signaling to the base station and notifies the base station that the handover to the target small-node device has been successfully conducted.

In the steps S1113, some parts of the traffic data are transferred between user equipment 100 and server 600 via D2UE connection 710 and target small-node device 500.

In a step S1114, some parts of the traffic data are transferred between user equipment 100 and server 600 via BS2UE connection 720 and base station 200. Step S1114 is the same as step S1102. That is, step (S1102 and S1114) may be continuously conducted during the procedures described in FIG. 17A.

The process shown in FIG. 17A may be described in terms of the operations in source small-node device 500 as follows. The operations of source small-node device 500 comprise transferring some parts of data, which are transferred between user equipment 100 and server 600, using D2UE connection 710 (step S1101), receiving control signaling to notify source small-node device 500 that the user equipment should make handover to the target small-node device, and ending D2UE connection 710 with user equipment 100 (step S1109).

The process shown in FIG. 17A may be described in terms of the operations in target source small-node device 500 as follows. The operations of target small-node device 500 comprise receiving control signaling for handover preparation, which is transmitted by the base station (step S1106), transmitting acknowledgement of the control signaling (step S1107), receiving control signaling to establish a connection between the user equipment and the target small-node device (step S1110), transmitting acknowledgement of the control signaling (step S1111), and transferring some parts of data, which are transferred between the user equipment and the server, using D2UE connection 710 (step S1113).

The process shown in FIG. 17A may be described in terms of the operations in user equipment 100 as follows. The operations of the user equipment comprise transferring some parts of data, which are transferred between the user equipment and server 600, using D2UE connection 710 with the source small-node device (step S1101), transferring some parts of data, which are transferred between the user equipment and server 600, using BS2UE connection 720 (step S1102), making measurements for the D2UE connection (step S1103), transmitting a measurement report to the base station (step S1104), receiving control signaling which orders the user equipment to make handover to the target small-node device (step S1108), transmitting control signaling to establish a connection between the user equipment and the target small-node device (step S1110), receiving acknowledgement of the control signaling (step S1111), transmitting control signaling to the base station to notify the base station that the handover to the target small-node device has been successfully conducted (step S1112), transferring some parts of data, which are transferred between the user equipment and server 600, using D2UE connection 710 with the target small-node device (step S1113), and transferring some parts of data, which are transferred between the user equipment and server 600, using BS2UE connection 720 (step S1114). It is noted that step S1102 is the same as step S1114, and this procedure may be continuously conducted during all the steps.

The process shown in FIG. 17A may be described in terms of the operations in base station 200 as follows. The operations of the base station comprise transferring some parts of data, which are transferred between the user equipment and server 600, using BS2UE connection 720 (step S1002), receiving a measurement report transmitted by the user equipment 100 (step S1104), making a decision that the user equipment should handover to the target small-node device (step S1105), transmitting control signaling to the target small-node device for handover preparation (step S1106), receiving acknowledgement of the control signaling (step S1107), transmitting control signaling to the user equipment to order for the user equipment to make handover to the target small-node device (step S1108), transmitting control signaling to the source small-node device to notify it that the user equipment should make handover to the target small-node device (step S1109), receiving control signaling to notify the base station that the handover to the target small-node device has been successfully conducted (step S1112), and transferring some parts of data, which are transferred between the user equipment and server 600, using BS2UE connection 720 (step S1114).

Figure 18:
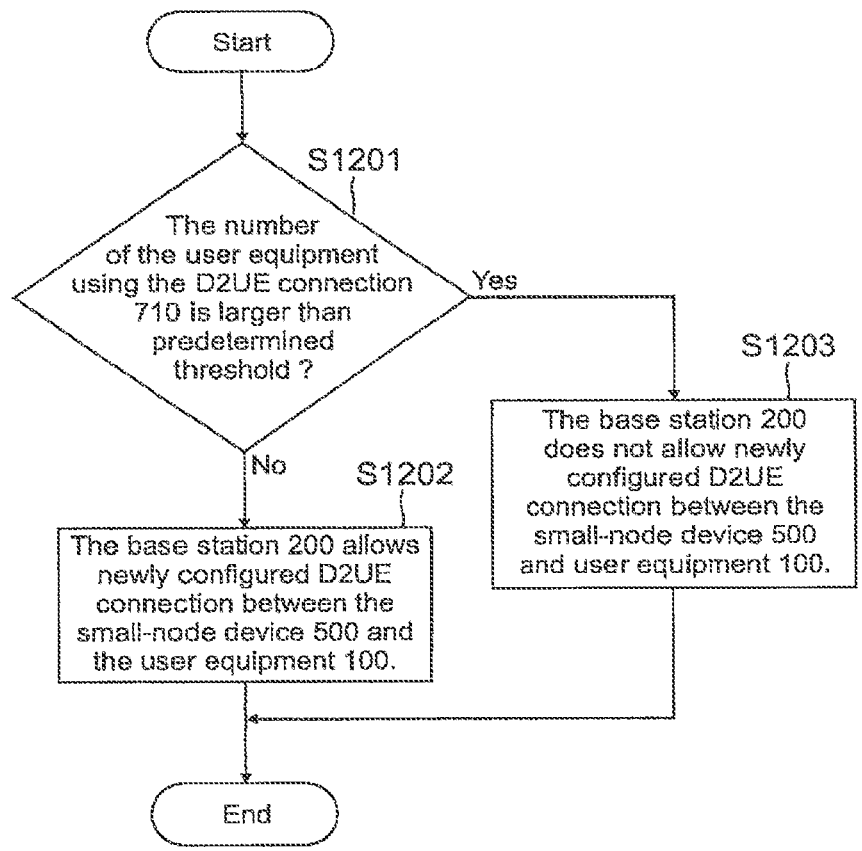
FIG. 18 is a flowchart for a call admission control method for the D2UE link.

Referring to FIG. 18, an operation of base station 200 according to an embodiment is illustrated. The control method shown in FIG. 18 is one example of the radio resource control or call admission control for D2UE connection 710. In a step S1201, the base station determines whether or not the number of the user equipment using D2UE connection 710 is larger than a predetermined threshold. Alternatively, the base station may define a congestion level, which may be determined based on at least one of the number of active user equipment, the number of the D2UE connections, amount of traffic data, interference level in the frequency band where the D2UE communications operate, and the like, and may determine whether or not the congestion level is higher than a predetermined threshold. In other words, the base station may determine whether or not the congestion level is high in the cell in step S1201.

If the number of the user equipment is not larger than the predetermined threshold (step S1201; NO), the base station allows a newly configuring D2UE connection between the small-node device and the user equipment in a step S1203. More specifically, when a traffic data occurs similarly to step S801 and the user equipment tries to configure a new BS2UE connection with the base station and a new D2UE connection with the small-node device, the base station allows a configuring of the new D2UE connection with the small-node device in addition to a configuring of the new BS2UE connection with the base station. Alternatively, when the user equipment tries to configure a new D2UE connection with the small-node device in a state wherein the user equipment has a BS2UE connection with the base station, the base station may allow the new D2UE connection with the small-node device.

If the number of the user equipment is larger than the predetermined threshold (step S1201: YES), the base station does not allow newly configuring D2UE connection between the small-node device and the user equipment in a step S1203. More specifically, when a traffic data occurs similarly to step S801 and the user equipment tries to configure a new BS2UE connection with the base station and a new D2UE connection with the small-node device, the base station does not allow configuring the new D2UE connection with the small-node device. Here, the base station may allow configuring the new BS2UE connection with the base station, but may not allow only the new D2UE connection with the small-node device. Alternatively, when the user equipment tries to configure a new D2UE connection with the small-node device in a state wherein the user equipment has a BS2UE connection with the base station, the base station may not allow the new D2UE connection with the small-node device.

In the above examples, the small-node device has one D2UE connection with one user equipment, but it may have more than one D2UE connections with more than one user equipment, similarly to a conventional base station. The radio resource for each D2UE connection may be shared by the multiple user equipment and may be controlled by the base station or the small-node device.

In the above examples, D2UE connection 710 and BS2UE connection 720 transmissions can operate in different frequency bands, but in other embodiments the D2UE connection may operate concurrently in the same frequency band as the BS2UE connection. In this scenario, some interference mitigation technique may be utilized in order to achieve co-existence between the D2UE and BS2UE transmission in the same frequency band.

For example, since the base station configures D2UE connection 710, the base station is aware that the user equipment will not respond to signaling by the base station in various frequency/time slots. In some such embodiments, D2UE connection 710 is configured so as to allow transmission slots where BS2UE communications (the base station to the user equipment) can be made in order to support continued connection and management by the base station. In other words, the user equipment can communicate with the base station in predetermined on-durations, and the user equipment can communicate with the small-node device in the other durations (off-durations).

Alternatively, in other embodiments where D2UE connection 710 transmissions occur concurrently in the same band as with transmissions of the base station, OFDM Resource Elements (RE) in various resource blocks (RBs)

are reserved for each link. In one embodiment REs used for control signaling are not used by the D2UE link and thus are left blank in any D2UE link transmission. D2UE link transmissions, including its own control signaling to the user equipment, are sent in other REs. In such an embodiment the user equipment is in fact able to receive REs, e.g. control REs, from the base station concurrently with communication from the small-node device. The base station may turn off transmissions or reduce transmission power in the BS2UE link in the radio resource in which transmissions in the D2UE link may occur. The radio resource may be a time domain resource or a frequency domain resource.

In the above embodiments, the D2UE link may be similar to normal BS2UE link, i.e. the small-node device may transmit common pilot signals, broadcast signals, synchronization signals, physical layer control signaling and the like. Alternatively, some parts of the signals and channels may be transmitted and others may not be transmitted in the D2UE link. For example, common pilot signals and physical layer control signaling may be transmitted in the D2UE link, and other channels and signals, such as broadcast channels/signals, synchronization signals and the like, may not be transmitted in the D2UE link. Alternatively, common pilot signals may be transmitted in the D2UE link, and other channels and signals, such as physical layer control signaling, broadcast channels/signals, synchronization signals and the like, may not be transmitted in the D2UE link. Alternatively, only infrequently-transmitted pilot or synchronization signals may be transmitted in the D2UE link, and other channels and signals, such as common pilot signals, physical layer control signaling, broadcast channels/signals, conventional synchronization signals and the like, may not be transmitted in the D2UE link.

Alternatively, the D2UE link may be a device-to-device (D2D) link. In such a scenario, most of the common signals/channels, such as common pilot signals, broadcast signals, synchronization signals, physical layer control signaling and the like, can be omitted in the D2UE link, and only channels transferring data may be transmitted in the D2UE link. Alternatively, some of channels/signals, such as infrequently-transmitted pilot or synchronization signals and physical layer control signaling and the like, may be transmitted in the D2UE link even in this scenario.

Irrespective of whether the D2UE link is similar to a normal BS2UE link or to a D2D link, the D2UE link may be based on an LTE-based radio interface, or may be based on other radio system-based interface. For example, the D2UE link may be based on WCDMA or CDMA2000 or WiFi or WiMAX or LTE advanced or TD-SCDMA or TD-LTE.

For example, D2UE connection 710 may be specified based on a WiFi-based radio interface. In this use case, a WiFi access point may be regarded as small-node device 500. In particular, D2UE communication section 504 in small-node device 500 communicates with user equipment 100 utilizing the WiFi radio interface whereas the radio resource control of the WiFi radio interface may be controlled by base station 200. The control signaling for the radio resource control may be transmitted in BS2UE connection 720 and BS2D connection 730.

In mobile communication systems, mobility procedures, such as cell identification, measurements, handover, cell selection/reselection and the like, are quite important, because mobile communication connectivity should be maintained even when a mobile station (user equipment) moves from one cell to other cells. Here it should be noted that if the mobile station tries to detect neighbor cells and make measurements for the detected neighbor cells very frequently, the connectivity is improved, but battery consumption of the mobile station increases, which degrades service quality in the mobile communication system. In such a case, the mobile station has to minimize the battery consumptions due to the mobility procedures, simultaneously with achieving good quality mobility performance.

Furthermore, the mobility procedures are quite important also in terms of interference in the mobile communication systems. That is, it is also quite important that the mobile station communicate with a base station with the highest radio link quality. The radio link quality is equivalent to at least one of path loss, pilot signal received power, signal-to-interference ration and the like. If the mobile station does not communicate with the base station with the highest link quality, i.e. it communicates with the second highest quality base station, it may interfere with other communications because its transmit power may be too high for other radio links, as illustrated in FIGS. 19A and 19B.

Figure 19A:
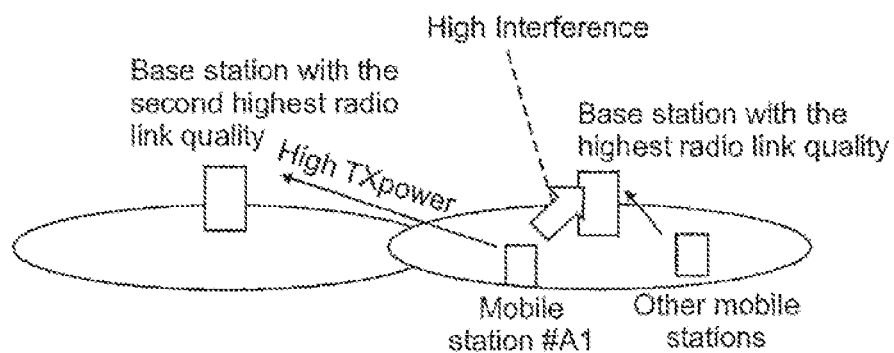
FIG. 19A illustrates a mobile station interfering with a neighboring base station.
Figure 19B:
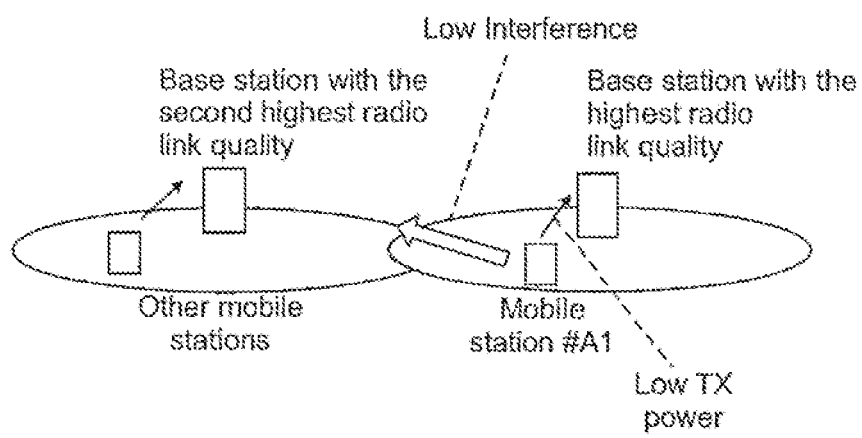
FIG. 19B illustrates a mobile station that is not interfering with a neighboring base station.

In FIG. 19A, the mobile station #A communicates with the base station with the second highest radio link quality, instead of the base station with the highest radio link quality. As a result, signals transmitted by the mobile station #A1 may interfere with the communication between the base station with the highest radio link quality and other mobile stations. In FIG. 19B, however, the mobile station #A communicates with the base station with the highest radio link quality, and therefore the signals transmitted by the mobile station #A1 may not interfere with other communications.

The interference may be intra-frequency interference, or may be inter-frequency interference. In the inter-frequency interference case, adjacent channel interference in the transmitter side or receiver blocking characteristics in the receiver side may degrade the quality in other communications. The interference issues may be handled by not only the mobility procedures, but also other radio resource management procedures. In sum, the mobility procedures and other radio resource management procedures should be appropriately conducted in the mobile communication systems in order to achieve good quality connectivity, long battery life in the mobile stations, less interference in the systems and the like.

Furthermore, pilot pollution problems may take place in addition to the abovementioned interference problems. If a pilot signal transmitted by one cell collides with the pilot signal transmitted by another cell, the colliding pilot signals interfere with each other if they are not orthogonal with each other. If the user equipment needs to make measurements for multiple cells for which received signal power is strong in the user equipment receiver, signal-to-interference ratio (SIR) for each cell is degraded due to the interference and cell search/measurement performance is deteriorated. It is noted that the cell search and measurements for low SIR cells need more power consumption than those for high SIR cells, because it needs more time for cell search and measurements.

In the above mentioned hybrid D2UE and BS2UE system, such mobility procedures and radio resource management procedures are conducted in the D2UE link, in addition to the BS2UE link. It is noted that since the cell size in the D2UE link is small, mobility performance can be more easily degraded and interference issues can happen more frequently. Therefore, the above mobility procedures and other radio resource management procedures are quite important for the D2UE link. More details of the mobility procedures and other radio resource management procedures in the D2UE link are explained below:

In the following examples, it is assumed that the carrier frequency in D2UE connection 710 is 3.5 GHz, and the carrier frequency in the BS2UE connection between the base station and the user equipment is 2 GHz, similarly to the above examples. It is noted that the frequency bands are just examples, and other frequency bands can be applicable in other embodiments.

Figure 20:
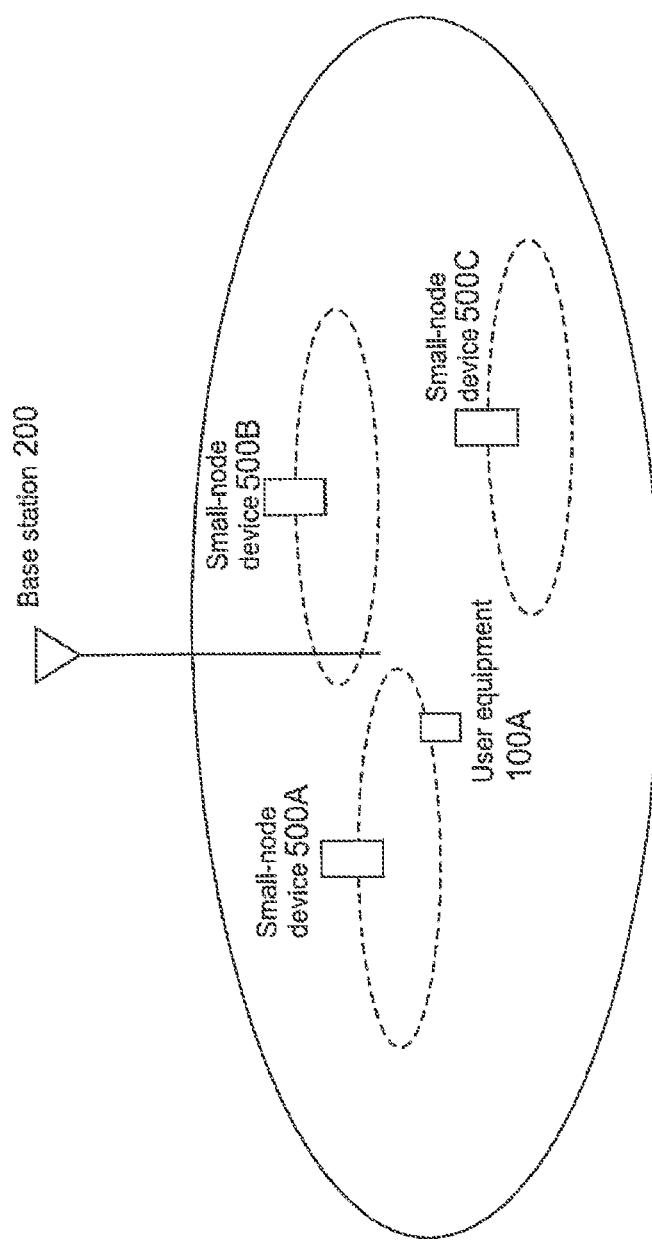
FIG. 20 illustrates a plurality of small-node device arrayed about a base station.

FIG. 20 illustrates the radio communication system in one embodiment. It is basically the same as FIG. 1, but is slightly modified compared to FIG. 1 so that the mobility procedures and radio resource managements for the radio communication system can be illustrated. In FIG. 20, three small-node devices (500A, 500B, 500C) are shown for illustrative purpose.

Figure 21:
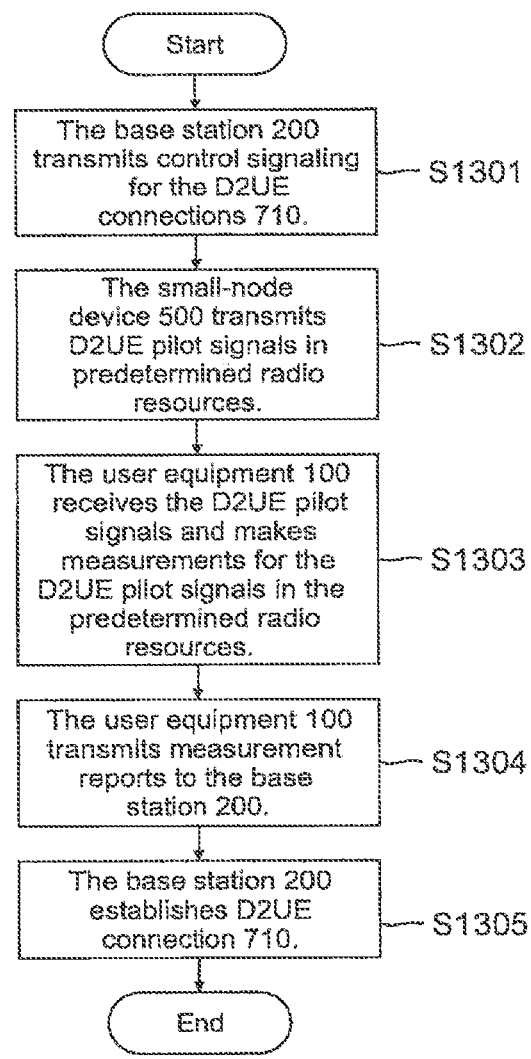
FIG. 21 is a flowchart for a D2UE connection establishment method.

Referring to FIG. 21, an operation of the mobile communication system according to the embodiment of the present invention is described. The operation is related to connection establishment in D2UE connection 710. The operation may correspond to details of steps S803 and S804 in FIG. 14B or steps A803a, A803b, A803c, A804a, A804b, A804c, A804d, A804e, and A804f in FIG. 14B.

In a step S1301, base station 200 transmits control signaling for D2UE connection 710 to user equipment 100. The control signaling may be transmitted in step A803a in FIG. 14B, instead of step S1301. Alternatively, the control signaling may be transmitted as parts of broadcast information to user equipment 100. The control signaling may include at least one of information on a frequency resource for D2UE pilot signals, information on a time resource for the D2UE pilot signals, and information on a code resource for the D2UE pilot signals. Some examples for the D2UE pilot signals are explained further below.

The control signaling may include information on transmission power for the D2UE pilot signals. That is, the transmission power for the D2UE pilot signals may be transmitted as one information element of the control signaling. Furthermore, the control signaling may include information on measurement behaviors in user equipment 100.

In a step S1302, the small-node device transmits the D2UE pilot signals in predetermined radio resources. More specifically, small-node device 500A, 500B, 500C transmits the D2UE pilot signals in the predetermined radio resources. The radio resources may consist of at least one of a time resource, a code resource and a frequency resource. The information on the predetermined radio resources may be signaled by the control signaling described for step S1301. In this sense, "predetermined radio resources" correspond to the radio resource indicated by the base station.

The D2UE Pilot Signals

Figure 22A:
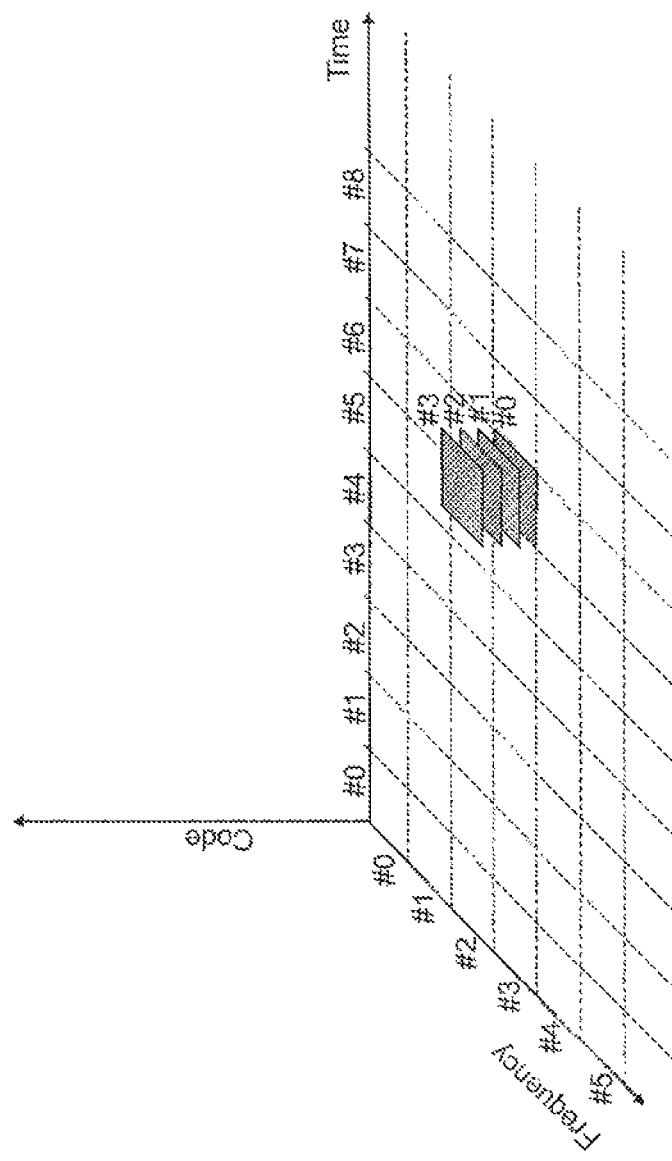
FIG. 22A illustrates the time, frequency, and code relationship for a plurality of D2UE pilot signals.

FIG. 22A illustrates one example of the radio resources for the D2UE pilot signals. In FIG. 22A, the frequency resource #3 is assigned as the frequency radio resource, and the time resource #6 is assigned as the time radio resource. Furthermore, each small-node device receives its own code resource. For example, code resources #0, #1, and #2 may be assigned to small-node device 500A, 500B, and 500C, respectively. The code resource may be combination of the CAZAC sequence (or Zadoff-Chu sequence) and cyclic shift, as shown below.

It is assumed that time synchronization is achieved for all the D2UE connections, i.e. time slots for all the D2UE connections are aligned with each other. For each small-node device 500, the time synchronization may be achieved by using GPS. Alternatively, the time synchronization may be achieved by the BS2D connections, that is, the timeframe synchronization of the D2UE connections is based on the signals transmitted by the base station such that the D2UE connections are synchronized with each other. Other time synchronization techniques may be utilized in order to synchronize the D2UE connections. In any case, the timeframe timing of the D2UE connections is specified so that the D2UE connections are time-synchronized with each other.

For user equipment 100, the time synchronization may be achieved by BS2UE connection 720 using signals transmitted by the base station 200 such that the timeframe timing of each D2UE connection is aligned with the remaining D2UE connections. Other time synchronization techniques may be utilized in order to achieve the time synchronization for the D2UE connections. As a result, the timeframe timing of each D2UE connection is time-synchronized with the remaining D2UE connections for both small-node device 500 and user equipment 100.

Figure 22B:
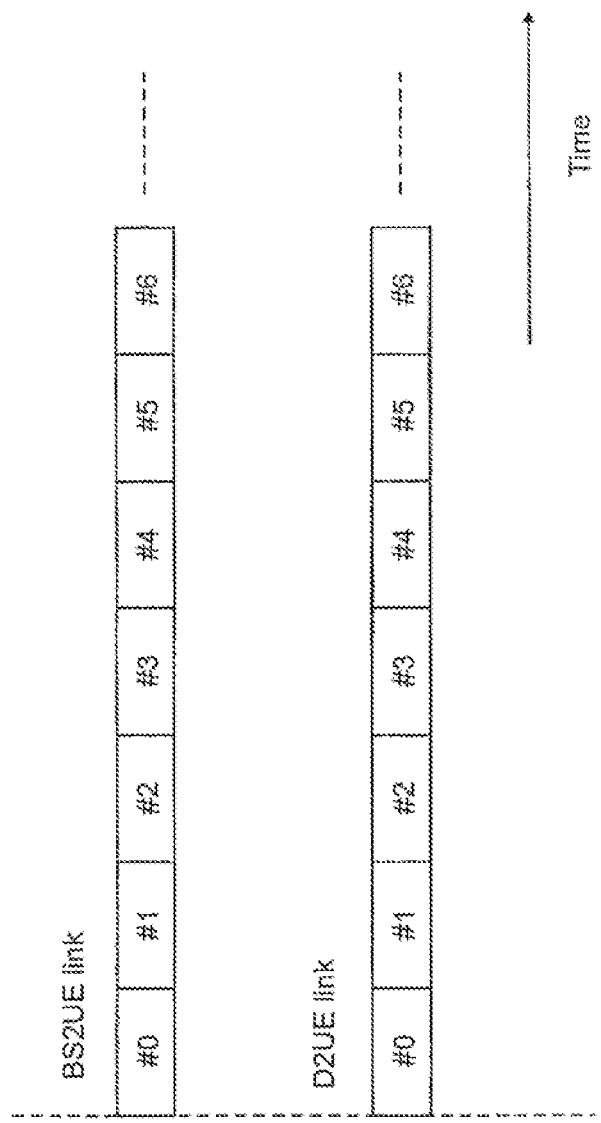
FIG. 22B shows a D2UE link that is synchronized with a BS2UE, link.
Figure 22C:
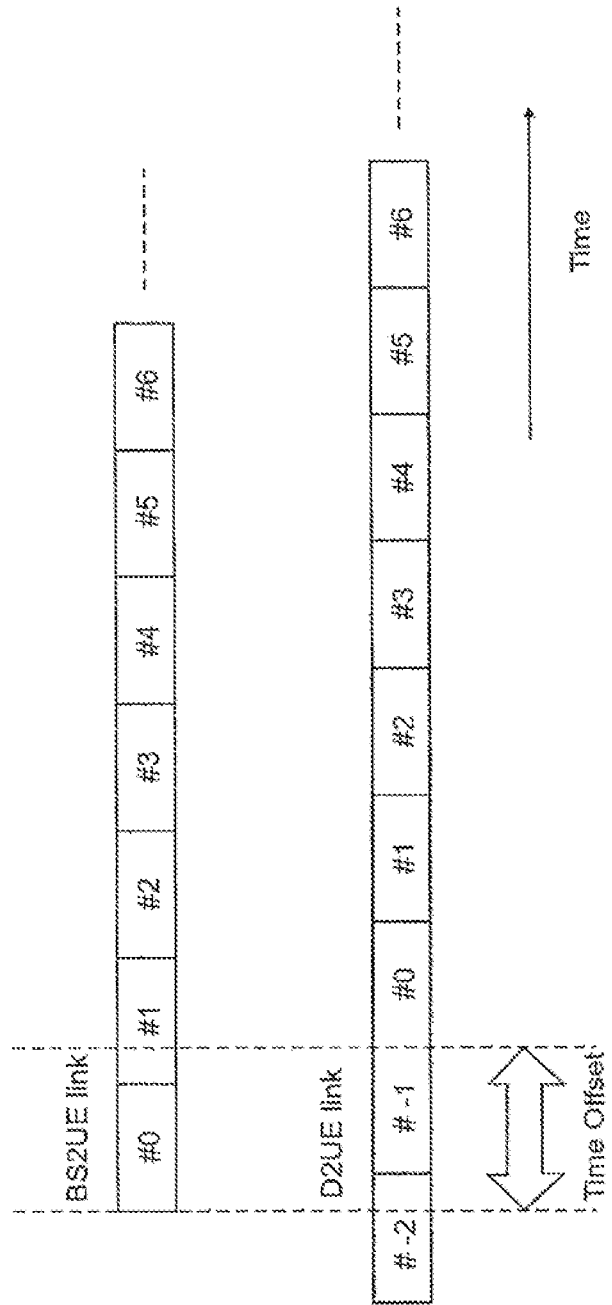
FIG. 22C shows a D2UE link that is offset in time with regard to the BS2UE link.

Time synchronization will be explained further below. For example, as illustrated in FIG. 22B, the time slots for the D2UE connections may be completely aligned with those for the BS2UE connections. Alternatively, as illustrated in FIG. 22C, there may be a time offset between the time slots for the D2UE connections and the time slots for the BS2UE connections.

Figure 22D:
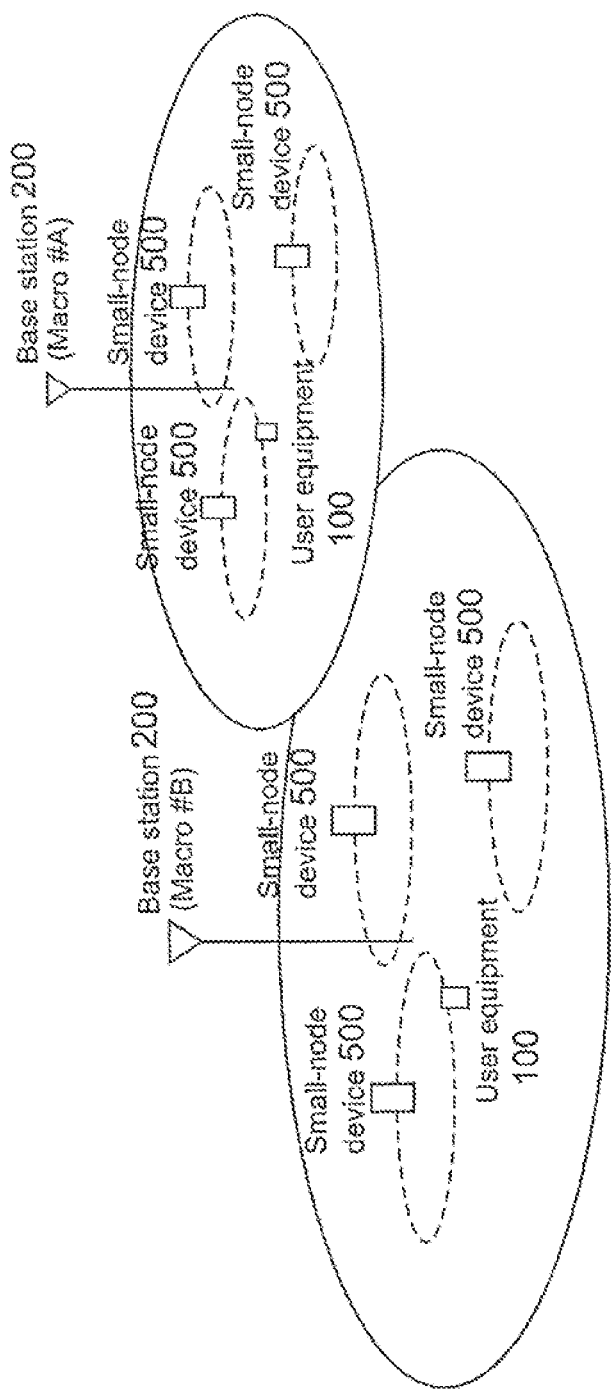
FIG. 22D illustrates multiple cells each having a plurality of small-node devices.
Figure 22E:
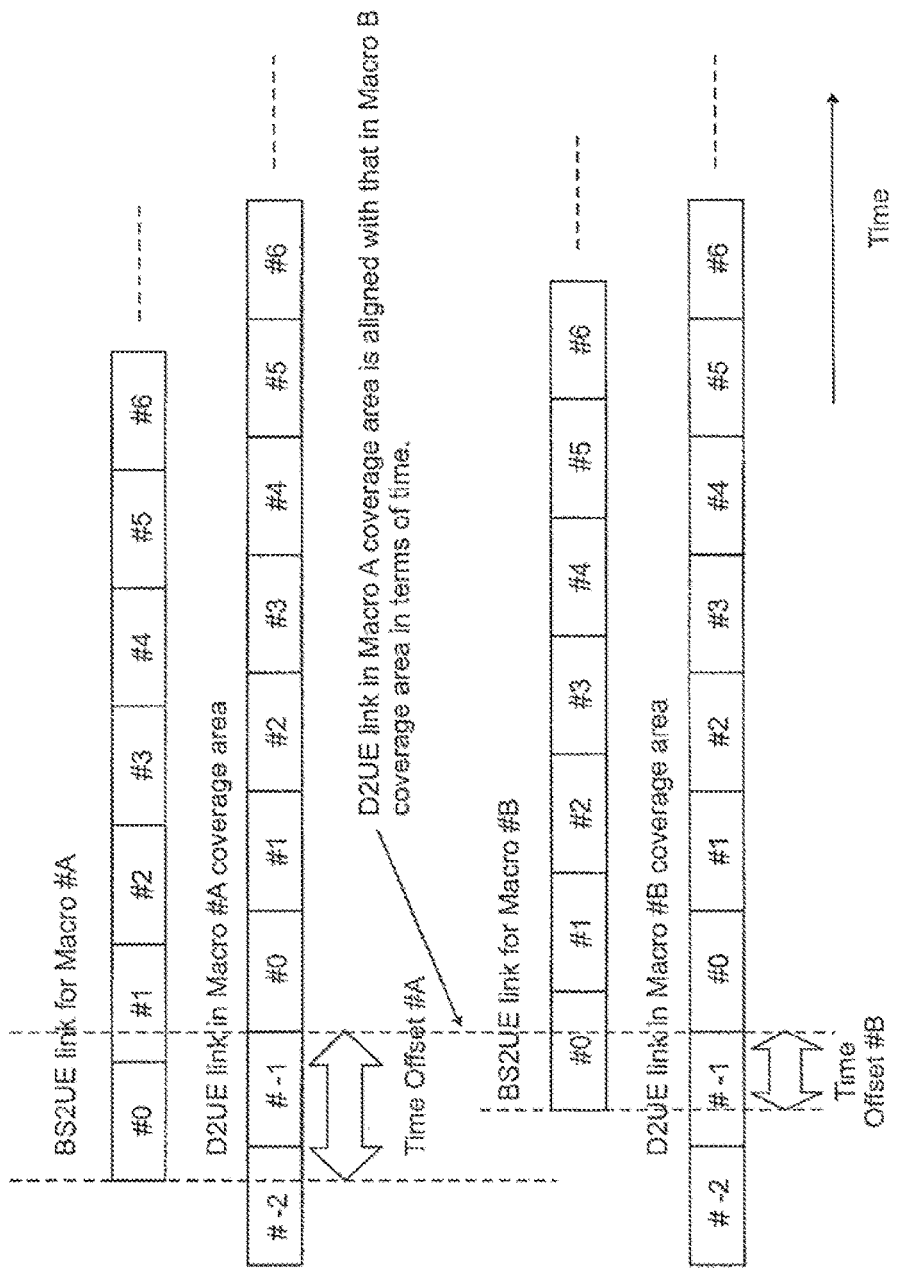
FIG. 22E illustrates a timing relationship between the D2UE links in a plurality of macrocell coverage areas and the corresponding BS2UE links.

More specifically, as illustrated in FIGS. 22D and 22E, each time offset between the time slots for the D2UE connections and the ones for the BS2UE connections may be respectively specified for each macro (base station) coverage area, which corresponds to the area supported by each base station 200. FIG. 22D illustrates two macro (base station) coverage areas #A and #B in which some small-node devices are deployed. FIG. 22E illustrates a time relationship for the BSUE connections and D2UE connections of FIG. 22D. In FIG. 22E, time offset #A is specified for the macro (base station) #A coverage area whereas time offset #B is specified for the macro (base station) #B coverage area. Each time offset can be specified so that all D2UE connections can be synchronized. The base station 200 may inform user equipment 100 of the time offset value (time offset #A or time offset #B in FIG. 22E) as part of the control signaling. Furthermore, base station 200 may inform small-node device 500 of the time offset value (time offset #A or time offset #B in FIG. 22E) as part of the control signaling. The time offset value may be included in the control signaling in step S1301 of FIG. 21. As a result, even if there is no time synchronization for the macro (base station) network, i.e. Macro #A is not aligned with Macro #B in terms of time, D2UE connections in the macro #A coverage area can be aligned with those in the macro #B coverage area as illustrated in FIG. 22E.

With regard to user equipment 100, the user equipment may decode the D2UE pilot signals transmitted by multiple small-node devices only in the predetermined radio resource (the frequency resource #3 and the time resource #6) so as to minimize power consumption. More detailed examples are shown below. User equipment 100 does not have to achieve battery-consumed time synchronization with multiple small-node devices (as analogously performed for conventional time synchronization in LTE using PSS/SSS), because it has already been achieved by the time synchronization with the BS2UE connections as mentioned above. In this fashion, complexity for the cell identification is reduced, which reduces the power consumption for the cell identification.

UE Behavior for Receiving the D2UE Pilot Signals

Figure 22F:
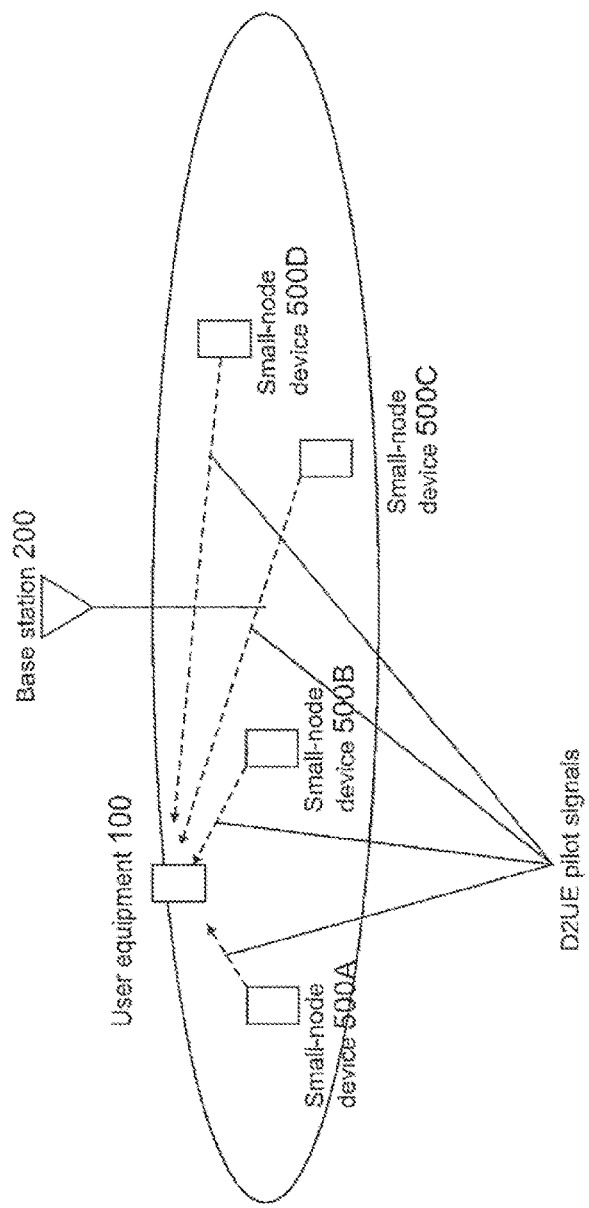
FIG. 22F shows the D2UE pilot signals from a plurality of small-node devices.

As illustrated in FIG. 22F, small-node devices 500A, 500B, 500C and 500D transmit the D2UE pilot signals to user equipment 100. As mentioned above, the D2UE pilot signals may have common time-domain and frequency-domain resources but each D2UE pilot signal has a unique code-domain resource. For example, code resources #0, #1, #2, and #3 may be assigned to small-node devices 500A, 500B, 500C and 500D, respectively. In one embodiment, CAZAC (Constant Amplitude Zero AutoCorrelation) sequence may be used for the code. More specifically, a Zadoff-Chu sequence may be used for the code. Alternatively, a Walsh sequence may be used for the code. In an orthogonal code embodiment, the code sequences from a given small-node device are orthogonal to the sequences used by neighboring small-node device. In addition, partially orthogonal code sequences may be used for the small-node device. In such an embodiment, some code sequence pairs may be orthogonal with each other, but others may not be orthogonal with each other.

Orthogonal code sequences do not interfere with each other. As a result, so-called pilot pollution problems can be avoided, even when the D2UE pilot signals transmitted by multiple small-node device collide with each other. Moreover, power consumptions for cell search and measurements can be reduced, because SIR for the D2UE pilot signals can be improved by avoiding the pilot pollution problems.

Figure 22G:
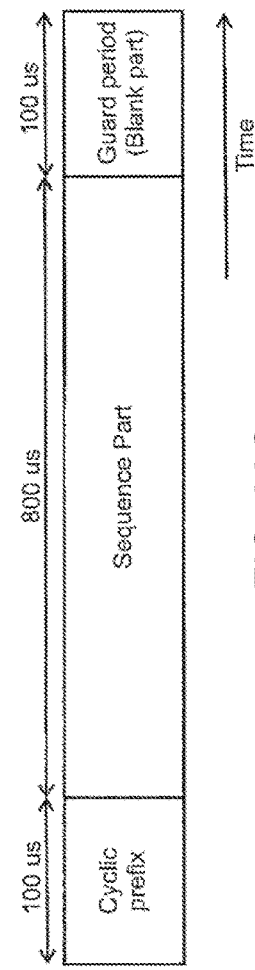
FIG. 22G illustrates a pilot signal physical layer format.
Figure 22H:
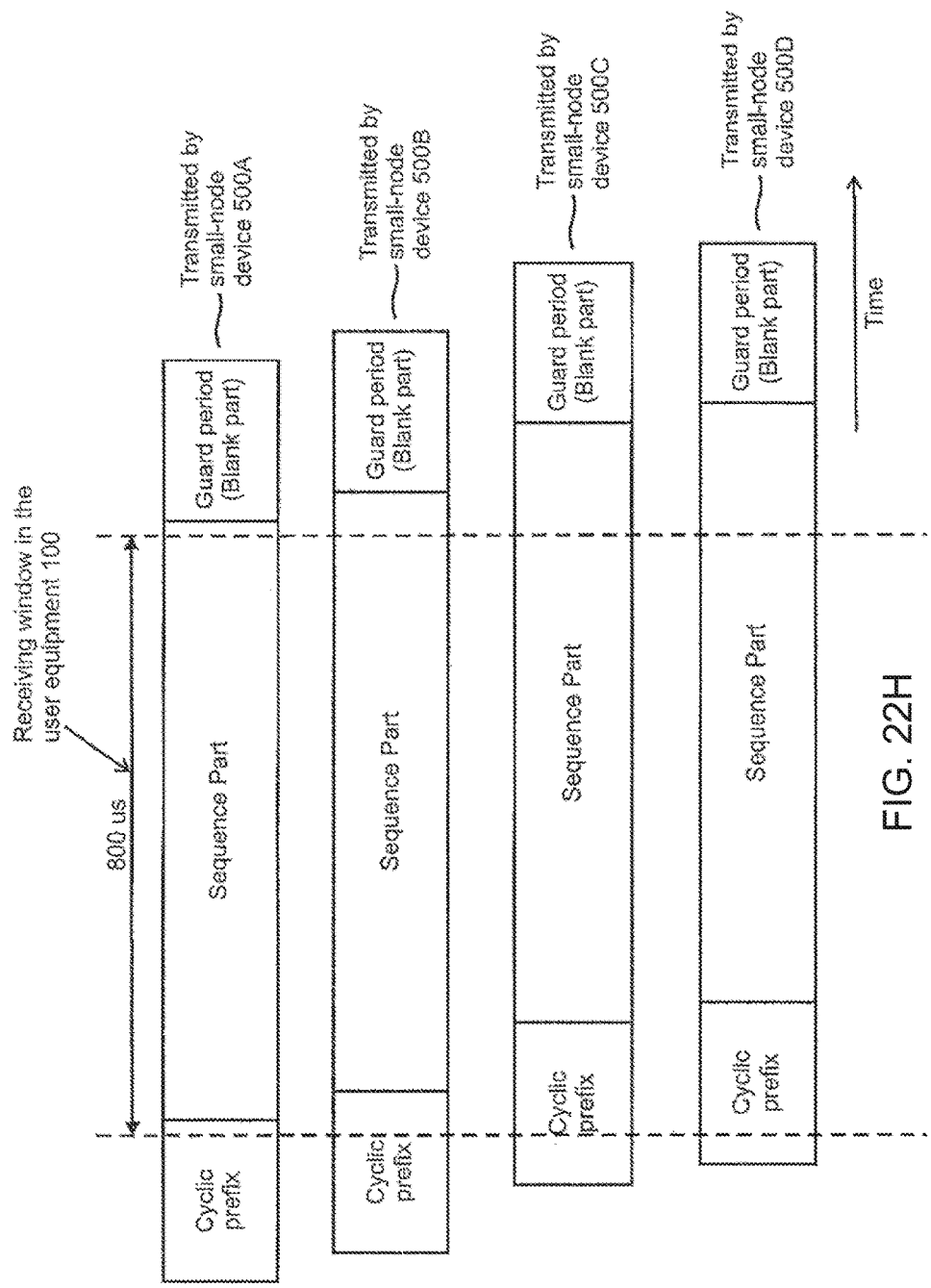
FIG. 22H illustrates a timing relationship between a plurality of pilot signals formatted as shown in FIG. 22G.
Figure 22I:
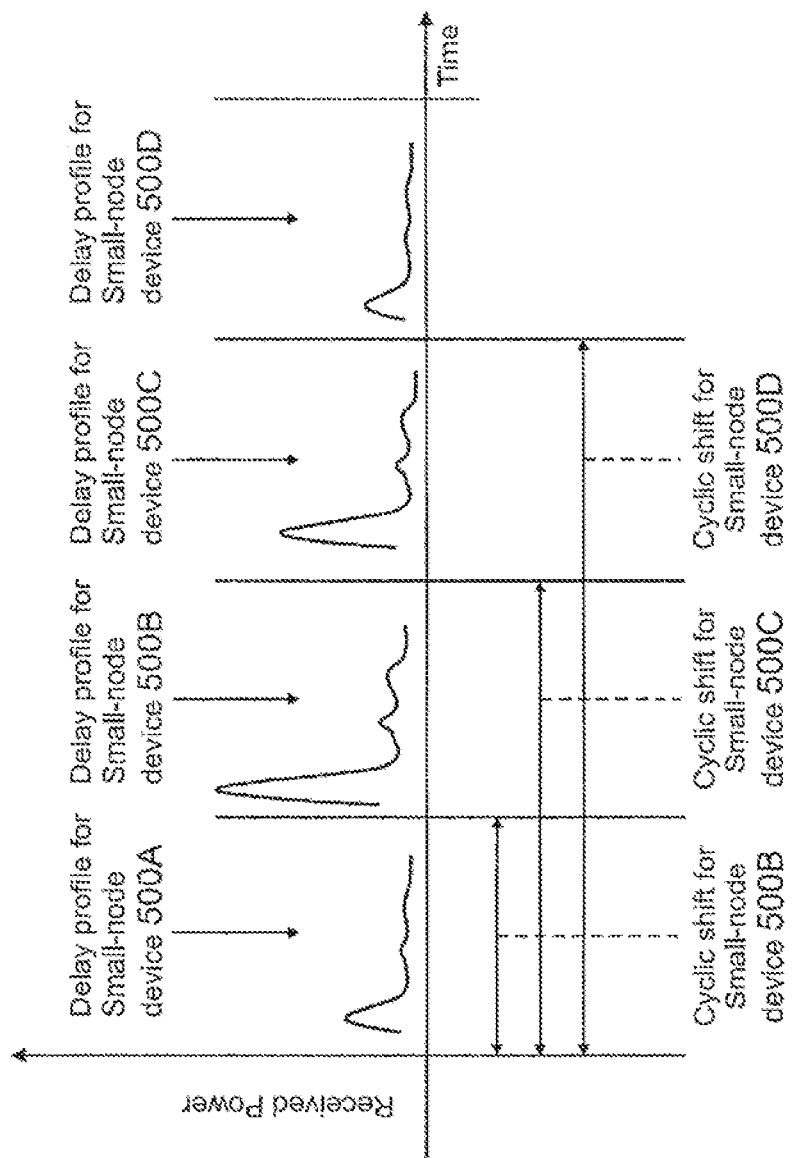
FIG. 22I is a graph of the received signal power for the pilot signals of FIG. 22H.

Each pilot signal may have a physical layer format as illustrated in FIG. 22G. This physical layer format may comprise a cyclic prefix, a sequence part, and a guard period. The guard period may be the same as a blank part. A CAZAC sequence may apply to the sequence part. In such an embodiment, user equipment 100 may have a receiving window as illustrated in FIG. 22H, and has only to decode each D2UE pilot signal transmitted by each small-node device in one or a few attempts. User equipment 100 may obtain delay profiles for each D2UE pilot signal as illustrated in FIG. 22I, which shows the delay profiles for each D2UE pilot signal being shifted due to the cyclic shift of the Zadoff-Chu sequence. It is noted that the cyclic shift for small-node device 500A is assumed to be zero in FIG. 22I. As a result, user equipment 100 can easily make measurements for delay and received power level of the D2UE pilot signal for each small-node device. In this fashion, UE complexity for cell search and measurements can be reduced.

The cyclic shift may be adjusted based on the cell range for each small-node device 500. Alternatively, the cyclic shift may be adjusted based on the cell range of base station 200. If the cell range is large, time difference among the D2UE pilot signals is also large such that a large cyclic shift is necessary. On the other hand, if the cell range is small the cyclic shift may also be small. Base station 200 may notify user equipment 100 of the cyclic shift setting for each small-node device using control signaling. More specifically, the information of the cyclic shift may be included in the control signaling in step S1301 of FIG. 21. Similarly, base station 200 may also notify the small-node device 500 of its cyclic shift setting using control signaling.

The physical random access channel (PRACH) or a physical channel similar to PRACH may be used for the D2UE pilot signals. PRACH is defined as an LTE physical channel in TS 36.211. In this fashion, each small-node device 500 transmits signals similar to a random-access-preamble in the predetermined radio resource. Base station 200 may assign each small-node device its own unique random-access preamble. The radio resource for the signals may be assigned by the base station 200.

The D2UE pilot signals may be transmitted infrequently as described above. For example, the D2UE pilot signals may be transmitted once per second. Since time synchronization is achieved by utilizing the BS2UE connections, the D2UE pilot signals do not have to be transmitted frequently. As a result, the user equipment has only to decode the D2UE pilot signals once per second, which minimizes power consumptions for the resulting pilot signal measurements. Furthermore, the D2UE pilot signals are transmitted much less frequently than the common reference signals or the synchronization signals in LTE such that interference from the D2UE pilot signals is not a problem as it would be if conventional LTE femto/pico base stations were used in place of the small-node devices. The periodicity of the D2UE pilot signals may be very large, e.g. 1 second or 2 seconds, or may be reasonably large, e.g. 100 milliseconds or 200 milliseconds. If the periodicity is very large, the power consumption for measurements and the interference issues can be reduced significantly but user equipment 100 may need more time to detect neighbor small-node devices and make measurements for them because it needs some measurement samples to achieve good accuracy. As a result, latency of mobility procedures may be increased. Conversely, if the periodicity is reasonably large, the power consumption for measurements and interference issues may be reduced to some extent, but the latency will be decreased. So, the periodicity of the D2UE pilot signals can be optimized based on the above aspects, such as power consumption for measurements, interference issues, latency of mobility procedures, and the like. The periodicity of the D2UE pilot signals may be network configurable such that base station 200 may inform user equipment 100 of the periodicity by utilizing a control signal. For example, the control signaling in step S1301 of FIG. 21 may be utilized in this fashion. Similarly, base station 200 may inform small-node device 500 of the periodicity by utilizing a control signal.

If the user equipment does not support multiple radio frequency components such that a first frequency carrier may be used for BS2UE connection 720 and a second frequency carrier may be used for D2UE connection 710 simultaneously, the user equipment may stop transmitting/receiving signals in BS2UE connection 720 during the time when the D2UE pilot signals are transmitted so that the user equipment can make measurements for D2UE connection 710. In this case, the base station may consider such behaviors of the user equipment in its scheduling for BS2UE connection 720, i.e. the base station may avoid assigning radio resource to the user equipment during times when the D2UE pilot signals are transmitted.

The D2UE pilot signal may be denoted as a D2UE sounding reference signal or a D2UE synchronization signal. The D2UE pilot signal may be distributed in the frequency domain to suppress signal strength fluctuation due to Rayleigh fading and achieve more accurate measurements for the radio link quality. The base station may notify the user equipment of D2UE pilot signal information for each small-node device. This information may be included in the control signaling in step S1301 of FIG. 21. Some examples of the pilot signal information include:

Code domain resource for the D2UE pilot signal
   For example, index of the Zadoff-Chu sequence
   Frequency domain resource for the D2UE pilot signal
   Time domain resource for the D2UE pilot signal
   Time offset between the D2UE connection and the BS2UE connection
   Transmission power of the D2UE pilot signal C
   yclic shift information of the D2UE pilot signal
   The above information may be specified for each small-node device, and therefore may be included in a neighbor small-node device list for each small-node device. The above information may be signaled by broadcast information in the BS2UE connection or by dedicated signaling in the BS2UE connection. In the above examples, a single time domain resource and a single frequency domain resource are specified as shown in FIG. 22A. But more than one time domain resource or frequency domain resource may be configured for the small-node devices. For example, if a cell includes a relatively large number of small-node device, the code-domain resource may not be sufficient and more than one time domain resource or frequency domain resource may be necessary.

Referring again to FIG. 21, in a step S1303, user equipment 100 receives the D2UE pilot signals and makes measurements for the D2UE pilot signals in the predetermined radio resources. The user equipment decodes the D2UE pilot signals transmitted by multiple small-node devices 500 and make measurements for the multiple small-node devices. More specifically, the user equipment obtains the radio link quality of the D2UE connections between itself and the multiple small-node devices. The radio link quality may be at least one of path loss, received power of the D2UE pilot signal, SIR of the D2UE pilot signal, received quality of the D2UE pilot signal, and the like. The user equipment may detect the small-node device which has the highest radio link quality based on the measurements. The path loss may be derived from the received power of the D2UE pilot signals and the transmission power of the D2UE pilot signals, which are included in the control signaling in step S1301. The received quality of the D2UE pilot signal may be the ratio of the receive power of the D2UE pilot signal to total received signal strength.

In a step S1304, the user equipment transmits measurement reports to the base station. The measurement reports include the measurement results obtained in step S1303. More specifically, the measurement reports may include the identity of the small-node device with the highest radio link quality. In other words, the user equipment 100 may identify the best small-node device in terms of the radio link quality of D2UE connections in step S1304. The small-node device information may thus include an identification number of the small-node device and the radio link quality of the small-node device.

Furthermore, the measurement report may include information on neighbor small-node devices that do not have the highest radio link quality, i.e. the measurement report may include information on the neighbor small-node device with the second or third highest radio link quality. In alternative embodiments, even lower radio link qualities may be in included in the small-node device information such as information on the neighbor small-node device with the fourth or more radio link quality may be included. The base station in step S1301 may indicate how many small-node devices should have information included in the measurement report. Alternatively the measurement reports may include all small-node devices for which the radio link quality is higher than a threshold. The base station may indicate the desired threshold in step S1301. In yet another alternative embodiment, the measurement reports may include information on all small-node devices for which the radio link quality is lower than a threshold (which can also be indicated by base station 200 in step S1301).

In a step S1305, the base station establishes D2UE connection 710. More specifically, the base station establishes the radio link between the user equipment and the small-node device with the highest radio link quality as reported in step S1304. In addition, the base station may assign the radio resource to D2UE connection 710 in step S1305. The radio resource may be at least one of the frequency domain resource, the time domain resource, the code domain resource, and the like. More specifically, the radio resource may be a carrier frequency for D2UE connection 710. For example, base station 200 may select the radio resource which is not used by the small-node device with the second or third highest radio link quality as reported in step S1304. As a result, interference with other D2UE connections in the neighbor small-node devices may be avoided. Alternatively, the base station may assign the radio resource, which is not used by other small-node device 500, which is located near the small-node device with the highest radio link quality. The base station may have location information for small-node device 500. According to the embodiment illustrated in FIG. 21, lower power consumption for the measurements can be achieved. Furthermore, interference mitigation can also be realized.

Figure 23:
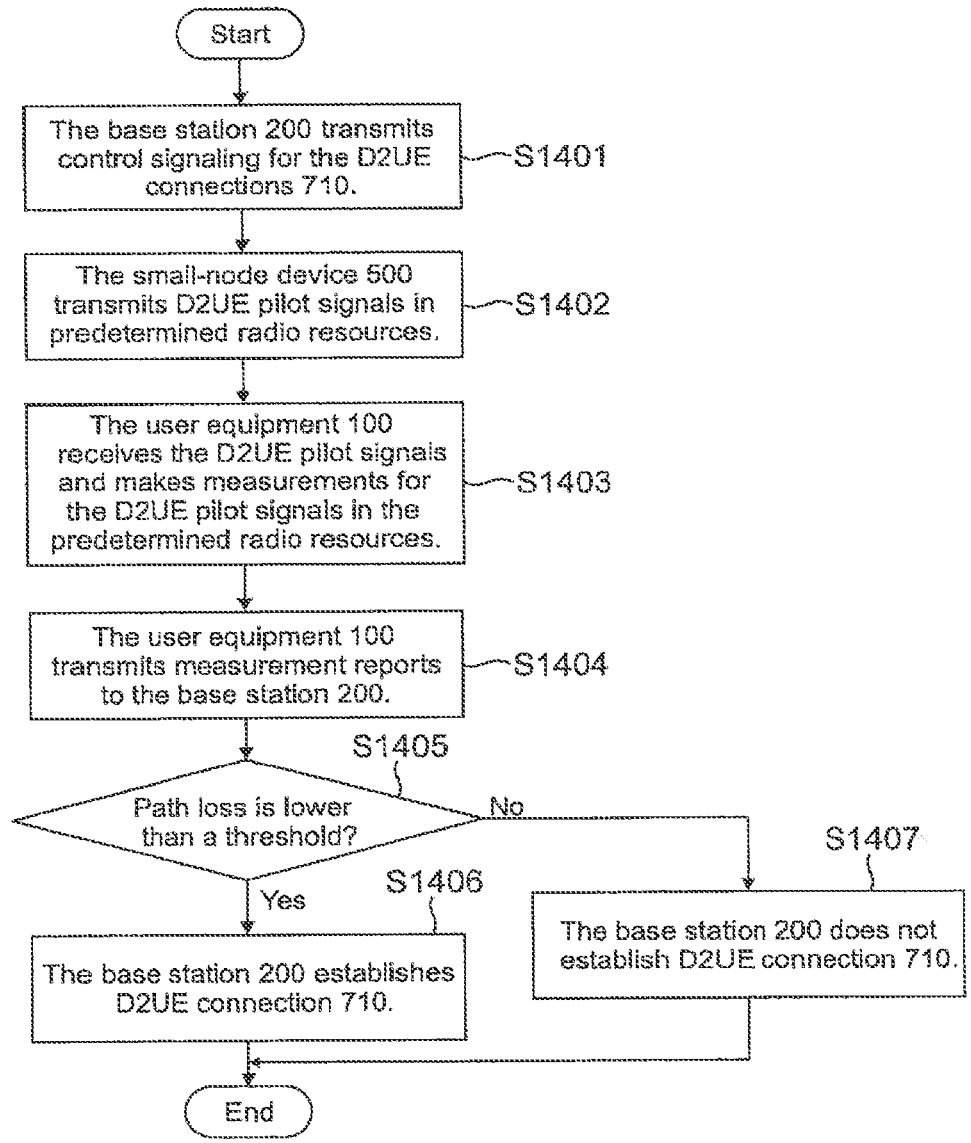
FIG. 23 is a flowchart for a D2UE establishment method that is responsive to path loss measurements.

Referring to FIG. 23, an operation of the mobile communication system according to an embodiment is illustrated. The operation is related to connection establishment in D2UE connection 710. The operation may correspond to step S804 in FIG. 14B or steps A803*a*, A803*b*, A803*c*, A804*a*, A804*b*, A804*c*, A804*d*, A804*e*, and A804*f* in FIG. 14B. Since steps S1401 to S1404 of FIG. 23 are the same as steps S1301 to S1304 in FIG. 21, further explanation of the steps S1401 to S1404 is omitted.

In a step S1405, the base station 200 determines whether or not the path loss is lower than a threshold. More specifically, base station 200 determines whether or not the path loss for the small-node device with the highest radio link quality is lower than the threshold. If the path loss for the small-node device with the highest radio link quality is lower than the threshold (Step S1405: YES), base station 200 establishes the D2UE connection 710 in a step S1406. In step S1406, the base station may assign the radio resource to D2UE connection 710, in addition to establishing the radio resource, similarly as discussed with regard to step S1305.

If the path loss for the base station with the highest radio link quality is not lower than the threshold (Step S1405: NO), base station 200 does not establish the D2UE connection 710 in a step S1407. In particular, base station 200 does not command the user equipment and the small-node device to establish D2UE connection 710 such that the user equipment communicates with server 600 only in the BS2UE connection. Since the path loss is high and required transmission power is high, the resulting D2UE connection may interfere with other D2UE connections or communications. Such interference issues can be mitigated by utilizing the control illustrated in FIG. 23.

In step S1405, the path loss is used for the determination but other indicia of radio link quality such as the received power of the D2UE pilot signal, the received quality of the D2UE pilot signal, the SIR of the D2UE pilot signal, and the like may be used. In this case, if the radio link quality is better than a threshold, the decision should be YES in step S1405. Otherwise the decision should be NO in step S1405.

In addition to relying on the path loss for the small-node device with the highest radio link quality, the determination in step S1405 may also rely on the path loss for the neighbor small-node device with the second or third highest radio link quality. More specifically, a difference between the highest radio link quality and the second highest radio link quality may be utilized in the determination in step S1405. If such a difference is higher than a threshold, base station 200 may establish D2UE connection 710 (step S1406). Conversely, if the difference is not higher than the threshold, base station 200 may not establish D2UE connection 710 (step S1407). If the difference is small, the D2UE connection may cause interference with other connections. Therefore, such interference issues may be mitigated by utilizing the above control. This control may apply to an embodiment in which the small-node device with the second or third highest radio link quality has D2UE connections with other user equipment in the radio resources.

Figure 24:
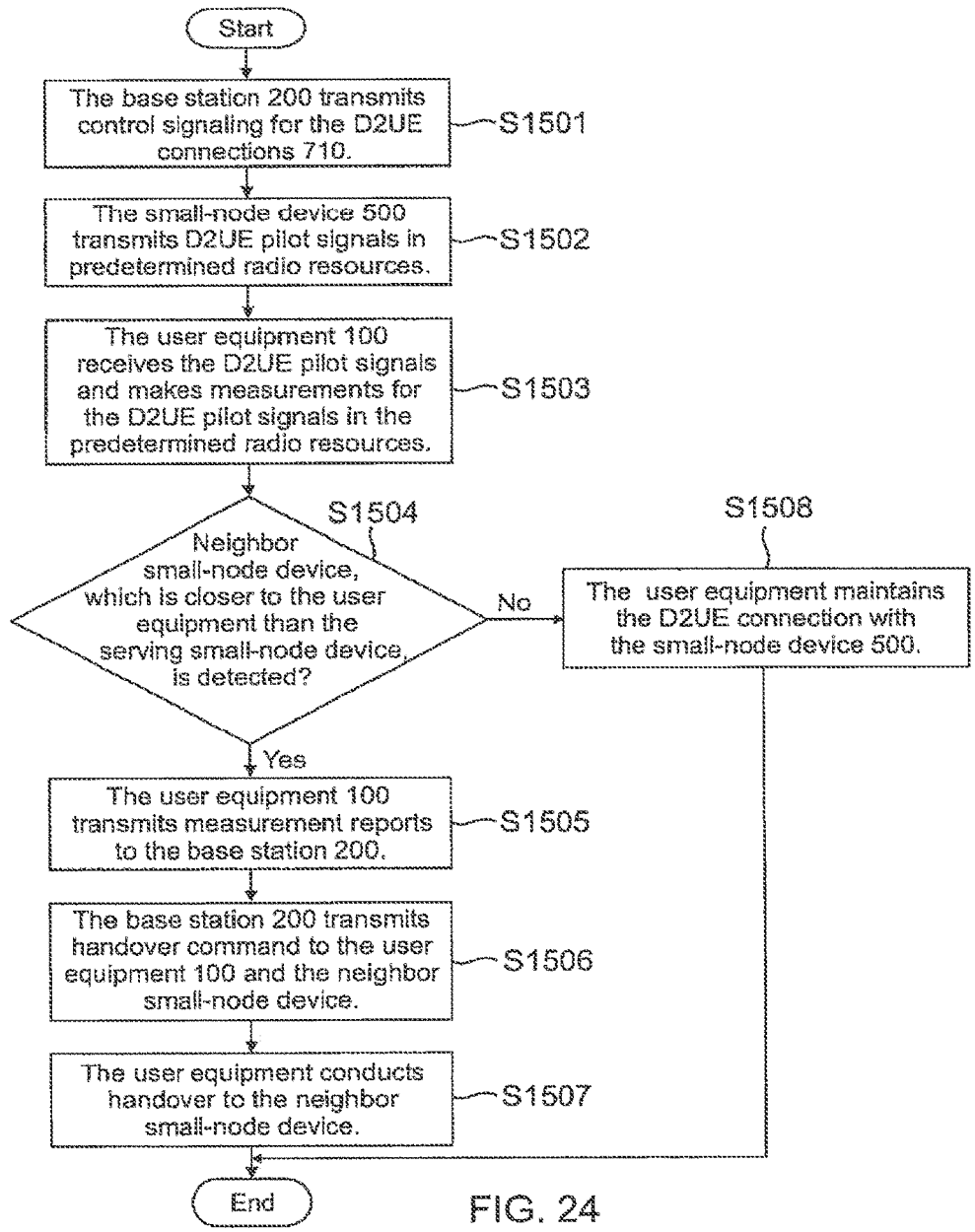
FIG. 24 is a flowchart for a D2UE handover method.

Referring to FIG. 24, an operation of the mobile communication system according to an embodiment is illustrated. The operation is related to mobility control in D2UE connection 710. The operation may correspond to steps S1103 to S1112 in FIG. 17A.

Steps S1501 to S1503 are analogous to steps S1301 to S1303 of FIG. 21. The only difference is that steps S1301 to S1303 are conducted before the D2UE connection has been established whereas steps S1501 to S1503 are conducted after the D2UE connection is established. Even if the D2UE connection is established, the user equipment has to make measurements for known or unknown neighbor small-node devices. In this sense, the measurements in steps S1301 to S1303 are equivalent to steps S1501 to S1503. Therefore, further explanation for steps S1501 to S1503 is omitted.

In a step S1504, user equipment 100 determines whether there are neighbor small-node devices that are closer to the user equipment 100 than the serving small-node device. As indicated above, the serving small-node device denotes the small-node device that is currently communicating with user equipment 100. More specifically, if the radio link quality of the neighbor small-node device is higher than that of the serving small-node device, the determination in step S1504 may be deemed to be positive.

In the determination of step S1505, hysteresis may be taken into account. More specifically, if the following expression is true (Radio link quality of Neighbor cell)>(Radio link quality of Serving cell)+Hyst where Hyst corresponds to the hysteresis, then the determination of step S1404 is deemed to be positive. For example, Hyst may be 3 dB. In addition, a time domain hysteresis may also be used. The time domain hysteresis may be called time-to-trigger.

If a closer neighbor small-node device is detected (step S1504: YES), the user equipment transmits measurement reports to the base station in a step S1505. These measurement reports include the determination of the closer neighbor small-node device.

In a step S1506, the base station transmits a handover command to the user equipment. The base station transmits control signaling to the neighbor small-node device for handover preparation. Furthermore, the base station may inform the serving small-node device that the user equipment is handed over to the neighbor small-node device.

In a step S1507, the user equipment conducts the handover to the neighbor small-node device.

Conversely, if no closer neighbor small-node device is detected (step S1504: NO), the user equipment maintains the D2UE connection with the small-node device in a step S1508.

Figure 25:
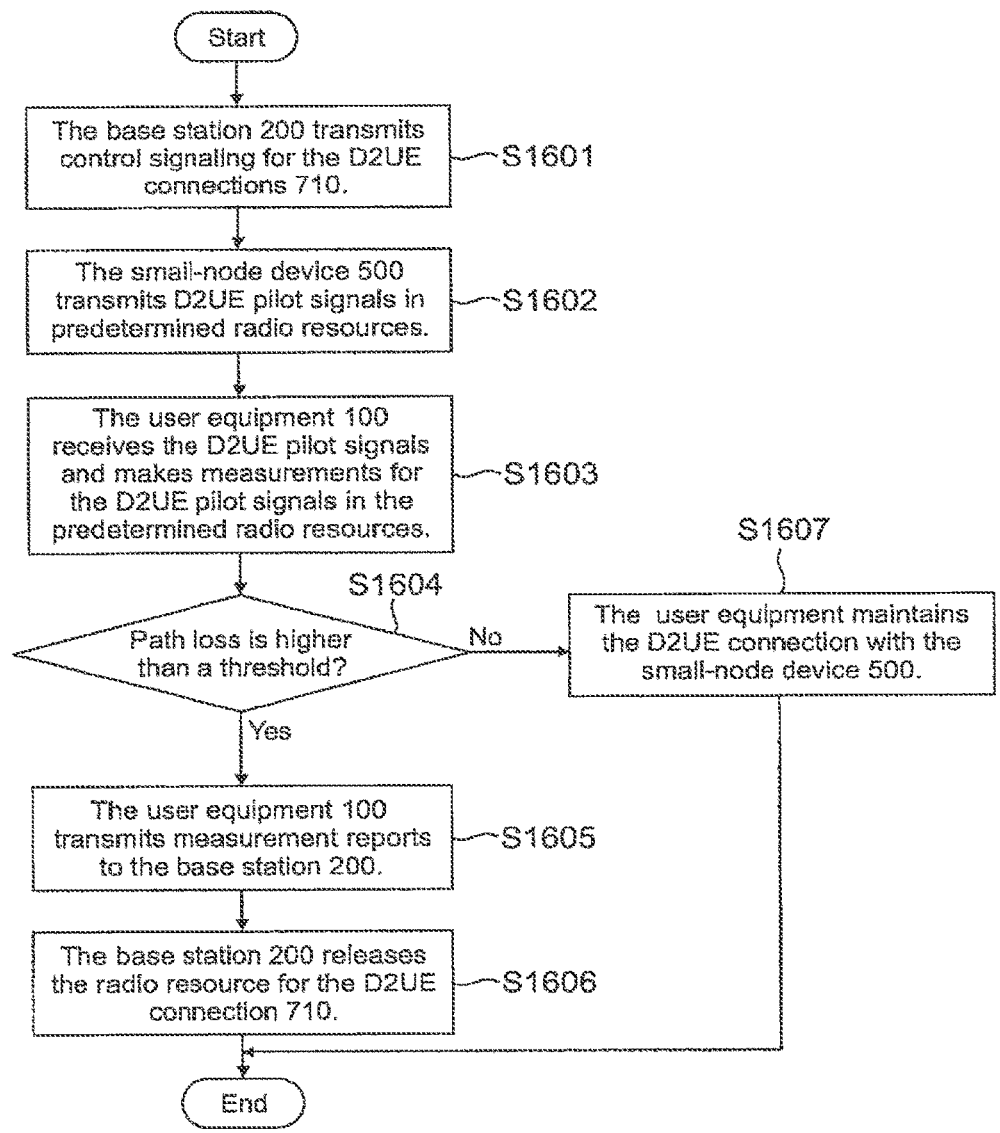
FIG. 25 is a flowchart for a D2UE link release method that is responsive to path loss measurements.

Referring to FIG. 25, an operation of the mobile communication system according to an embodiment is illustrated. The operation is related to mobility control in D2UE connection 710. The operation is conducted while the D2UE connection is established already. Steps S1601 to S1603 are analogous to steps S1301 to S1303 of FIG. 21. The only difference is that the steps S1301 to S1303 are conducted before the D2UE connection is established whereas steps S1601 to S1603 are conducted after the D2UE connection is established. Therefore, further explanation for steps S1601 to S1603 is omitted herein.

In a step S1604, the user equipment determines whether the path loss is higher than a threshold. More specifically, the user equipment determines whether the path loss for the serving small-node device is higher than the threshold. The base station may inform the user equipment of the threshold by using the control signaling in step S1601.

In steps S1602 and 1603, the user equipment measures the path loss by using the D2UE pilot signals but other signals or channels may be used for the path loss measurements. For example, pilot signals for the channel estimation or demodulation in D2UE connection 710 may be used for the path loss measurements. The pilot signals for the channel estimation or demodulation may provide better accuracy for path loss measurements than the D2UE pilot signals, which are used for mobility measurements. If the path loss is calculated by using other signals or channels, transmission power information of the other signals or channels may be included in the other signals or channels. The user equipment may calculate the path loss based on the received power of the other signals or channels and the transmission power of the other signals or channels.

If the path loss for the serving small-node device is higher than the threshold (step S1604: YES), the user equipment transmits measurement reports to the base station in a step S1605. The measurement reports indicate that the path loss for the serving small-node device is higher than the threshold.

In a step S1606, the base station releases the radio resource for D2UE connection 710. More specifically, base station 200 sends control messages to release D2UE connection 710. As a result, D2UE connection 710 is released.

If the path loss for the serving small-node device is not higher than the threshold (step S1604: NO), user equipment 100 maintains the D2UE connection with the small-node device 500 in a step S1607.

In the above examples, other values which represent the radio link quality besides the path loss may be used. For example, at least one of the received power of the pilot signal, the SIR of the pilot signal, the received quality of the pilot signal, and the like may be used. In this case, if the radio link quality is lower than a threshold, the decision should be YES is step S1604, otherwise the decision should be NO in step S1604. Based on the radio resource management described in FIG. 25, interfering D2UE links can be removed such that good system quality can be maintained.

In other embodiments, some of conventional BS2UE operations may be omitted in D2UE connection 710. More specifically, at least one of the following operations may be omitted:

Transmitting broadcast channels in DL
Transmitting common reference signals in DL
Transmitting primary synchronization signals/secondary synchronization signals in DL
Transmitting paging signals in DL
Transmitting dedicated RRC signaling related to RRC procedures, such as connection establishment, connection re-establishment, connection setup, connection reconfiguration, connection release, and the like
Transmitting control signaling for handover, such as control information of measurement configuration, measurement control, handover command, handover complete and the like Furthermore, some others of conventional BS2UE operations may be supported in D2UE connection 710 in some embodiments. More specifically, at least one of the following operations may be supported:

Transmitting PDCCH in DL
Transmitting PHICH in DL
Transmitting PCFICH in DL
Transmitting PUCCH in UL
Transmitting PUSCH in UL
Transmitting PRACH in UL
Uplink power control
DL power control
Adaptive modulation and coding for DL and UL
DRX
HARQ Traffic Measurements In mobile communication systems, it is quite important to collect measurement results in the radio interface. The measurement results can be utilized for parameter optimization, determining whether additional base stations should be installed, handing off to additional base stations or additional carriers, etc. This parameter optimization may be denoted as network optimization in general. In addition, the measurement results can be utilized for self-organized network (SON) purposes. The measurement results can be given to the SON entity and the SON entity modifies some of parameters based on the measurement results. Generally speaking, as the number of nodes increases, complexity and cost for such measurements increases. Therefore, if network operators utilize a lot of small nodes, such as Pico base stations or Femto base stations, how to collect such measurement results efficiently is a challenging problem.

Figure 26:
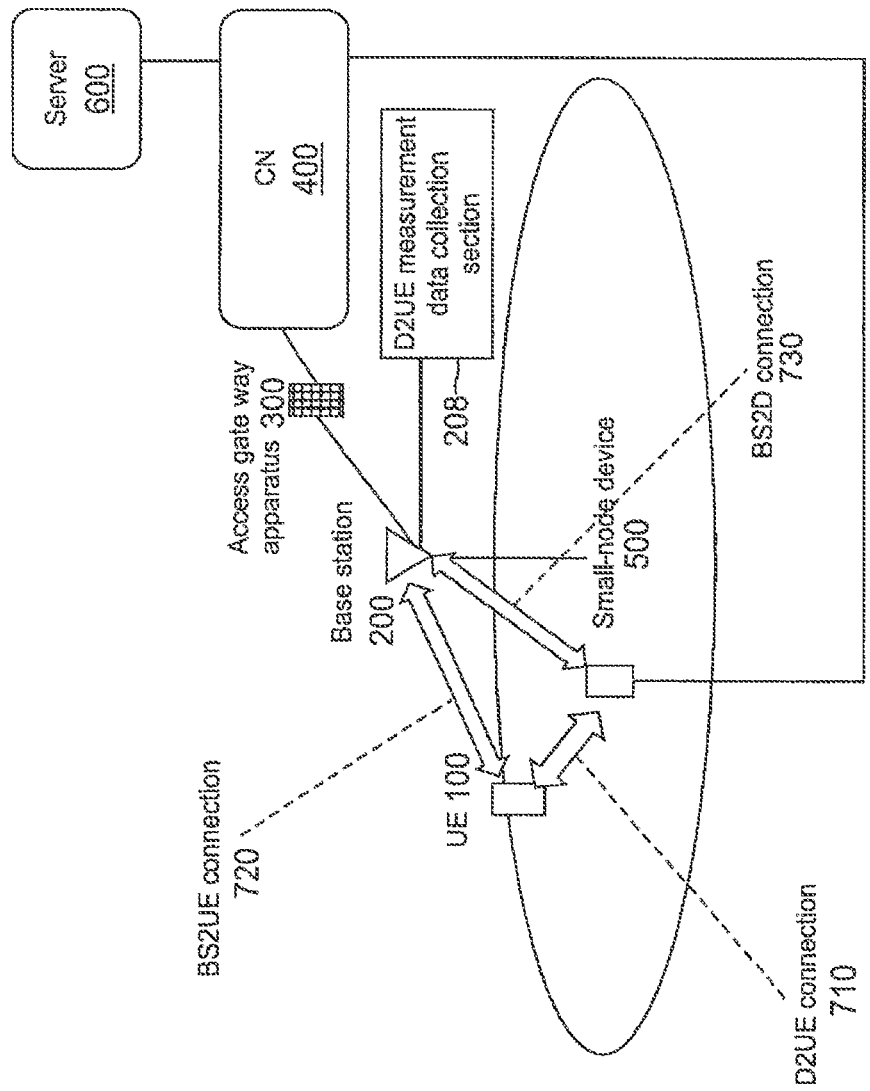
FIG. 26 illustrates a modification of the architecture shown in FIG. 2 to include a D2UE measurement data collection section.

In the present disclosure, the addition of the small-node device presents such a measurement problem. Since the number of the small-node devices is larger than the existing deployed base stations, more efficient measurement procedures and network optimization are required. These measurement procedures may be explained as follows:

FIG. 26 illustrates an example communication system. As compared to the system discussed with regard to FIG. 2, the system of FIG. 26 is analogous except that a D2UE measurement data collection section 208 for base station 200 is added. D2UE measurement data collection section 208 is configured to collect measurement data for the D2UE link.

D2UE measurement data collection section 208 is shown in FIG. 26 as being external to base station 200, but it may be located inside the base station 200 and may be integrated into base station 200. Alternatively, D2UE measurement data collection section 208 may be located in other nodes, such as access gateway 300 or a node in core network 400. There are two kinds of measurement data in the system of FIG. 26. One is the measurement data which are measured in base station 200, and the other is the measurement data which are measured in small-node device 500. In the following, these two kinds of measurement data will be explained separately.

Measurement Data Measured in the Base Station 200:

FIG. 27A shows examples of measurements conducted by base station 200. In this embodiment, D2UE communication control section 204 performs the measurements listed in FIG. 27A because section 204 conducts radio link connection control for D2UE connection 710 as described above and can thus readily make the measurements. The radio link connection control includes at least one of establishing/configuring/re-configuring/re-establishing/releasing D2UE connection 710. Furthermore, the radio link connection control may include handover or radio link failure handling for D2UE connection 710.

D2UE communication control section 204 makes the measurements and sends the measurement results to D2UE measurement data collection section 208. A measurement index #0 in FIG. 27A corresponds to the number of D2UE connections. The number of D2UE connections may be the total number of D2UE connections in the macro cell coverage area in which base station 200 provides radio communication service for user equipment 100. Alternatively, the number of D2UE connections may equal the D2UE connections for the small-node device. According to this measurement item, network operators can detect how many D2UE connections are utilized in the macro coverage area or in each small-node device. Such information can be utilized when network operators determine whether or not new small-node device should be installed. If the number of the D2UE connections in small-node device 500 is larger than a threshold value, network operators may determine that a new small-node device should be installed.

Alternatively, network operators may determine that radio resources for the small-node device should be increased if the number of the D2UE connections for small-node device 500 is larger than a threshold value. The radio resource may be the frequency resource. For example, network operators may determine that frequency carriers for the D2UE connections handled by the small-node device should be increased if the number of the D2UE connections in small-node device 500 is larger than the threshold value.

In addition to the number of D2UE connections, the number of logical channels in the D2UE connections may be measured as part of measurement item #0. Alternatively, the number of D2UE connections may be measured for each logical channel. More specifically, the number of D2UE connections in which logical channel supporting best effort packets is transferred may be measured.

A measurement index #1 corresponds to the radio resources used by the D2UE connections. The radio resources for the D2UE connections may correspond to the radio resources for all D2UE connections in the macro cell coverage area. Alternatively, the radio resources may correspond to those used by each small-node device. Responsive to this measurement item, network operators can detect how much radio resource is utilized for the D2UE connections in the macro coverage area or in each small-node device. Such information can be utilized when network operators determine whether a new small-node device should be installed. For example, if the amount of the radio resources in the D2UE connections used by the small-node device is larger than a threshold value, network operators may determine that a new small-node device should be installed. Alternatively, network operators may determine that radio resources for the small-node device should be increased if the amount of the radio resources in the D2UE connections for the small-node device is larger than the threshold value.

The radio resource may be the frequency domain resource. For example, network operators may determine that frequency carriers for the D2UE connections handled by the small-node device should be increased if the amount of the radio resource for the small-node device is larger than the threshold value. Alternatively, the radio resource may be the time-frequency resource.

The measurements of the radio resource may be done separately for DL (from the small-node device to the user equipment) and UL (from the user equipment to the small-node device). Instead of the actual radio resource, the usage of the radio resource may be measured. The usage of the radio resource may be calculated as follows:

$$usage_{\#1} = \frac{r(T)}{\text{total\_r}(T)}$$

where r(T) is the amount of assigned radio resource during time period T, total_r(T) is the amount of available radio resource during time period T, and T is the time period during which the measurement is performed.

Measurement index #2 corresponds to a data rate in the D2UE connections. The data rate in the D2UE connections may be the total data rate in the D2UE connections in the macro cell coverage area. Alternatively, the data rate in the D2UE connections may be the data rate in each small-node device. According to this measurement item, network operators can detect how much data rate is achieved for the D2UE connections in the macro coverage area or for each small-node device.

The data rate may be calculated in the Physical layer, the MAC layer, the RLC layer, or the PDCP layer. Moreover, the data rate may be calculated for each logical channel in the D2UE connections. The data rate may be calculated separately for downlink (from small-node device to user equipment) and uplink (from user equipment to small-node device). A status report may be utilized for the calculation. For example, the actual data transmission is conducted in D2UE connection 710 but the status report for D2UE connection 710 may be transmitted to base station 200 utilizing BS2UE connection 720 through BS2UE communication section 102 in user equipment 100. The status report transmission from user equipment 100 to base station 200 is illustrated in FIG. 27B. The status report (which may include status for each logical channel) may be thus transmitted both in D2UE connection 710 and in BS2UE connection 720. The status report may include status for each logical channel. As a result, D2UE communication control section 204 in base station 200 can easily utilize the status report to see how many bits are transmitted in the D2UE connection per second. The number of bits per second corresponds to the data rate in D2UE connection 710. Alternatively, D2UE communication control section 204 may calculate the amount of transferred data in D2UE connection 710 utilizing a sequence number in the status report. The change of the sequence number during one time duration corresponds to the amount of transferred data during the time duration.

In the above example, user equipment 100 transmits the status report to base station 200. However, BS2D communication section 502 in small-node device 500 may alternatively transmit a status report to base station 200 through BS2D connection 730. The data rate may correspond to one D2UE connection in one small-node device. Alternatively, the data rate may be the sum of the data rate for multiple D2UE connections in a single small-node device. In yet another embodiment, the data rate may be the sum of the data rate for all the D2UE connections in the macro coverage area. For example, a total data rate (Total_data_rate) for all the D2UE connections may be calculated using the following equation:

$$\text{Total\_data\_rate} = \sum_{n=1}^{N} \text{data\_rate}(n)$$

where data_rate is the data rate for one D2UE connection, n is the index of the D2UE connections, and N is the total number of the D2UE connections. Such information can be utilized by network operators to determine whether a new small-node device should be installed as discussed above with regard to the analogous user-equipment-reported data rate measurement.

Measurement index #3 of FIG. 27B corresponds to a success rate of the D2UE connection establishment. The success rate of the D2UE connection establishment (Rate$_3$) may be defined as follows:

$$Rate_{\#3} = \frac{N_1}{N_1 + N_2}$$

where $N_1$ is the number of successful D2UE connection establishments and $N_2$ is the number of unsuccessful D2UE connection establishments. The success rate of the D2UE connection establishment may be that for all the D2UE connections in the macro cell coverage area. Alternatively, the success rate of the D2UE connection establishment may be determined for each small-node device. A failure rate of the D2UE connection establishment may be measured instead of the success rate of the D2UE connection establishment. The failure rate of the D2UE connection establishment may be defined as follows:

(Failure rate of D2UE connection establishment)=1−(Success rate of D2UE connection establishment)

According to the success (or failure) of the D2UE connection establishment, network operators can determine whether some radio interface parameters should be modified. For example, if the success rate is lower than a threshold value, network operators require a change in the radio interface parameters.

A measurement index #4 corresponds to a handover success rate in the D2UE connections. The handover success rate (Rate$_{\#4}$) may be defined as follows:

$$Rate_{\#4} = \frac{N_3}{N_3 + N_4}$$

where $N_3$ is the number of successful handovers in the D2UE connections and $N_4$ is the number of unsuccessful handover in the D2UE connections. The handover success rate may be that for all the D2UE connections in the macro cell coverage area. Alternatively, the success rate of the D2UE handover for individual small-node devices may be measured. In yet another alternative embodiment, the handover failure rate in the D2UE connections may be measured instead of the success rate. The handover failure rate in the D2UE connections may be defined as follows:

(Failure rate of the handover in the D2UE connections)=1−(Success rate of the handover in the D2UE connections)

According to this handover success (or failure) measurement item, network operators can determine whether the handover parameters should be modified. For example, if the handover success rate is lower than a threshold value, network operators may require a modification of the handover parameters.

Measurement index #5 corresponds to a success rate of D2UE connection re-establishments. The success rate of the connection re-establishments in the D2UE connections (Rate$_5$) may be defined as follows:

$$Rate_{\#5} = \frac{N_5}{N_5 + N_6}$$

where $N_5$ is the number of successful connection re-establishments in the D2UE connections, and $N_6$ is the number of unsuccessful connection re-establishments in the D2UE connections. The success rate of the D2UE connection re-establishments may be that for all the D2UE connections in the macro cell coverage area. Alternatively, the success rate may correspond to individual D2UE connections. Alternatively, a failure rate of the D2UE connection re-establishments may be measured instead of the success rate of the connection re-establishments in the D2UE connections. The failure rate of the connection re-establishments in the D2UE connections may be defined as follows:

(Failure rate of the connection re-establishments in the D2UE connections)=1−(Success rate of the connection re-establishments in the D2UE connections).

Responsive to this measurement item, network operators can determine whether some D2UE connection re-establishments parameters should be modified. For example, if the success rate of the D2UE connection re-establishments is lower than a threshold value, network operators may determine that some D2UE connection re-establishments parameters should be modified.

Measurement index #6 corresponds to the number of D2UE connection handovers in the D2UE connections. This number may be that for all the D2UE connections in the macro cell coverage area. Alternatively, the number may be that for the D2UE connection handovers for the small-node device. Responsive to this measurement item, network operators can determine whether D2UE connection handover parameters should be modified. For example, if the number of handovers in the D2UE connections is higher than a threshold value (which may imply that some ping-pong problems exist in the handovers), network operators may require some modifications for the handover parameters.

Measurement index #7 corresponds to the number of radio link failures in the D2UE connections. This number may be that for all the radio link failures in the macro cell coverage area. Alternatively, the number may that for small-node device radio link failures. The number of radio link failures may be reported by the user equipment 100 over BS2UE connection 720. Alternatively, it may be reported by small-node device 500 over BS2D connection 730. The report on the radio link failures may be included in the control signaling in step S1301. Through this measurement item, network operators can determine whether some of the radio interface parameters should be modified. For example, if the number of radio link failures in the D2UE connections is higher than a threshold value (which may imply that some of the radio interface parameters are not optimized), network operators may determine that some of the radio interface parameters should be modified.

Finally, a measurement index #8 of FIG. 27A corresponds to the number of D2UE connection re-establishments. This number may be that for all the D2UE connections in the macro cell coverage area. Alternatively, the number may be that the D2UE connection re-establishments in each of the small-node device. Using this measurement item, network operators can determine whether some of the radio interface parameters should be modified. For example, if the number of connection re-establishments in the D2UE connections is higher than a threshold value (which may imply that some of the radio interface parameters are not optimized), network operators may determine that some of the radio interface parameters should be modified.

Measurement Data in the Small-Node Device 500:

FIG. 28 shows examples of measurement items which are measured in the small-node device 500. D2UE communication section 504 (FIG. 11A) makes the measurements listed in FIG. 28 whereas BS2D communication section 502 sends the measurement results to the base station via BS2D connection 730. The measurement results may be sent to base station 200 as part of the control signaling. The measurement results are transferred to the D2UE measurement data collection section 208. The D2UE measurement data collection section 208 can thus readily obtain the measurement results for the D2UE connections by utilizing BS2D connection 730, which makes the collection of the measurements very efficient.

A measurement index #A0 of FIG. 28 corresponds to a central processing unit (CPU) usage rate in small-node device 500. The CPU usage rate may be used to determine whether or not a congestion level in the small-node device is relatively high. For example, if the CPU usage rate is higher than a threshold value, the network operators may determine that a new small-node device should be installed.

A measurement index #A1 corresponds to a memory usage rate in small-node device 500. The memory usage rate may also be utilized to determine whether the congestion level in the small-node device is relatively high. For example, if the memory usage rate is higher than a threshold value, the network operators may deter that a new small-node device or additional memory should be installed.

A measurement index #A2 corresponds to a buffer usage rate of buffer in the small-node device 500 and is thus analogous to measurement index #A1. The buffer usage rate may also be utilized to determine whether the congestion level in the small-node device is relatively high. For example, if the buffer usage rate is higher than a threshold value, the network operators may determine that new small-node device or additional buffer should be installed.

A measurement index #A3 is a baseband processing usage rate in the small-node device. The baseband usage rate may also be utilized to determine whether the congestion level in the small-node device is relatively high. The indices A0 through A3 thus correspond to a processing load in the small-node device.

A measurement index #A4 corresponds to an amount of radio resources in the D2UE connections. The radio resources may correspond to that which is actually utilized for data transmission as opposed to that which is assigned by base station 200 for the D2UE connections. In such a case, the utilized radio resource may correspond to the congestion level in the D2UE connections. The amount of the utilized radio resource in the D2UE connections may thus be used to determine whether the congestion level in small-node device 500 is relatively high as compared to a threshold value. If the threshold value is exceeded, network operators may require that new small-node device be installed. The measurements of the utilized radio resource may be done separately for DL (from the small-node device to the user equipment) and UL (from the user equipment to the small-node device).

A measurement index #A5 corresponds to a backhaul usage rate in the small-node device to determine whether the congestion level in the backhaul link is relatively high as compared to, for example, a threshold value. If the threshold value is exceeded, the network operators may determine that additional bandwidth for the backhaul link should be installed.

A measurement index #A6 corresponds to the D2UE connection data rate. The data rate may be calculated in the Physical layer, the MAC layer, the RLC layer, or the PDCP layer. The data rate may be calculated by setting an average period as a time when data to be transmitted are present in the transmission buffer. For example, if there is data only in a period of 300 ms in a measurement period of 500 ins, the data rate is calculated by averaging over the period of 300 ms and not over the remaining periods. Alternatively, the data rate may be calculated over all the measurement period regardless of the presence/absence of the data to be transmitted in the transmission buffer. The measurements of the data rate may be done separately for DL (from the small-node device to the user equipment) and UL (from the user equipment to the small-node device). The data rate may be calculated for each logical channel in the D2UE connections.

The data rate in the D2UE connections may be utilized to determine whether the congestion level in small-node device 500 is relatively high. For example, the amount of the data rate may be compared to a threshold value. If the threshold value is not exceeded, network operators may determine that the congestion level is relatively high such that a new small-node device should be installed.

A measurement index #A7 corresponds to a time duration for communications in the D2UE connections. In some embodiments, the radio resource for the D2UE connections is assigned by base station 200, but the radio resource is used only when there is data to be transmitted in the D2UE connections. The time duration for D2UE communications thus corresponds to a time duration when data is actually transmitted. The time duration may be utilized to investigate data traffic patterns, i.e. to investigate whether data is bursty or not.

In contrast to index #A7, a measurement index #A8 corresponds to a time duration for which there is no data communications in the D2UE connections. This time duration can also be used to investigate data traffic patterns.

A measurement index #A9 corresponds to the path loss in the D2UE connection. The path loss may be utilized to estimate actual coverage area in which the small-node device provides radio communication services. The network operators may utilize such information as compared to a threshold to determine whether new small-node devices should be installed in the area. The path loss measurement may be an average value of the path loss for the D2UE connections that are handled by small-node device 500.

A measurement index #A10 corresponds to a radio link quality in the D2UE connection. The radio link quality may be utilized to estimate the communication quality in the coverage area for which the small-node device provides radio communication services. The network operators may utilize such information to determine whether some of the radio interface parameters should be modified. The radio link quality may be an average value of the radio link quality for the D2UE connections which are handled by the small-node device 500. The radio link quality may be at least one of a signal-to-interference ratio in the D2UE connections and a channel quality indicator (CQI) in the D2UE connections. More specifically, if the radio link quality for the D2UE connections is lower than a threshold, the network operators may determine that some of the radio interface parameters should be modified. The measurements of the radio link quality may be done separately for DL (from the small-node device to the user equipment) and UL (from the user equipment to the small-node device).

A measurement index #A11 corresponds to a block error rate (BLER) for the D2UE connection. The BLER may be utilized to estimate communication quality in the small-node device 500 coverage area. The network operators may utilize such information to determine whether or not some of the radio interface parameters should be modified. The BLER may be average value of the BLER for the D2UE connections that are handled by small-node device 500. A bit error rate may be utilized instead of the BLER. If the BLER for the D2UE connections is higher than a threshold, the network operators may determine that some of the radio interface parameters should be modified. The measurements of the BLER may be done separately for DL (from the small-node device to the user equipment) and UL (from the user equipment to the small-node device).

A measurement index #A12 corresponds to a received signal power for the D2UE connections. The received signal power is utilized to estimate communication quality in the small-node device coverage area. The network operators may utilize such information when they determine whether or not some of the radio interface parameters should be modified. The received signal power may be an average value of the received signal power for the D2UE connections that are handled by small-node device 500. If the received signal power for the D2UE connections is higher than a threshold, the network operators may determine that some of the radio interface parameters should be modified. The measurements of the received signal power may be done separately for DL (from the small-node device to the user equipment) and UL (from the user equipment to the small-node device). For DL, the user equipment may report the received signal power to the small-node device.

A measurement index #A13 corresponds to a transmitted signal power for the D2UE connections. The transmitted signal power is utilized to estimate communication quality in the small-node device coverage area in which small-node device 500 provides radio communication services. The network operators may utilize such information when they determine whether or not some of the radio interface parameters should be modified. The transmitted signal power may be an average value of the transmitted signal power for the D2UE connections which are handled by small-node device 500. The measurements of the transmitted signal power may be done separately for DL (from the small-node device to the user equipment) and UL (from the user equipment to the small-node device). For UL, the user equipment may report the transmitted signal power to the small-node device. If the transmitted signal power for the D2UE connections is higher than a threshold, the network operators may determine that some of the radio interface parameters should be modified.

A measurement index #A14 corresponds to an interference power for the D2UE connections. The interference power is utilized to estimate communication quality in the coverage area which small-node device 500 provides radio communication services. The network operators may utilize such information when they determine whether some of the radio interface parameters should be modified. The interference power may be an average value of the interference power for the D2UE connections which are handled by the small-node device 500. If the interference power for the D2UE connections is higher than a threshold, the network operators may determine that some of the radio interface parameters should be modified. The measurements of the interference power may be done separately for DL (from the small-node device to the user equipment) and UL (from the user equipment to the small-node device). For DL, the user equipment may report the interference power to the small-node device.

A measurement index #A15 corresponds to location information of the small-node device 500. The location information may be utilized for SON operation.

A measurement index #A16 corresponds to the number of user equipment for which data to be transmitted is present in the transmission buffer. This number may be utilized to determine whether the congestion level in small-node device 500 is relatively high. If the number of user equipment for which data to be transmitted is present is higher than a threshold value, network operators may determine that the congestion level is relatively high such that a new small-node device should be installed. The measurements of the number of user equipment for which data to be transmitted is present may be done separately for DL (from the small-node device to the user equipment) and UL (from the user equipment to the small-node device). For UL, user equipment 100 may report to small-node device 500 whether there is data to be transmitted in its transmission buffer. The number of user equipment having data to be transmitted may be calculated for each logical channel in the D2UE connections, i.e. the number of logical channels having data to be transmitted may be calculated. User equipment for which data to be transmitted is present may be denoted as an active user.

A measurement index #A17 corresponds to the number of user equipment whose data rate is lower than a threshold. This number may be utilized to determine whether the congestion level in the small-node device is relatively high. If the number of user equipment whose data rate is lower than a threshold is higher than another threshold value, network operators may determine that the congestion level is relatively high such that new small-node devices should be installed. The measurements of the number of user equipment for whose data rate is lower than a threshold may be done separately for DL (from the small-node device to the user equipment) and UL (from the user equipment to the small-node device). The number of user equipment whose data rate is lower than a threshold may be calculated for each logical channel in the D2UE connections.

A measurement index #A18 corresponds to a number of inactive user equipment in the D2UE connections. In some embodiments, the radio resource for the D2UE connections is assigned by the base station, but the radio resource is used only when there is data to be transmitted. Thus there is a time duration when there is no data to be transmitted. The inactive user equipment corresponds to the ones that have no data to be transmitted in the D2UE connection.

Regardless of whether the user equipment and/or the small-node device make the traffic measurements, D2UE measurement data collection section 208 may utilize some parts of the measurement data described above for call admission control of the D2UE connections. For example, D2UE measurement section 208 may determine that new D2UE connections should be prohibited if the number of D2UE connections in the small-node device is higher than a threshold. Other measurement items, such as the amount of the utilized radio resources may be used for the call admission control instead of the number of D2UE connections. The call admission control may be performed by D2UE communication control section 204 instead of D2UE measurement data collection section 208.

The operation of the above-described base station, the user equipment, and the small-node device may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in an ASIC. Such an ASIC may be arranged in the base station, the user equipment, and the small-node device. As a discrete component, such a storing medium and processor may be arranged in the base station, the user equipment, and the small-node device.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

What is claimed is:

1. A network device in a cellular telecommunications system, comprising:
    a first communication circuit that receives a first control-plane message from a base station (BS) over a first communication link;
    a second communication circuit that transmits user-plane data to a user equipment (UE) over a second communication link established at a request of the first control-plane message; and
    a third communication circuit that receives the user-plane traffic data from a server over a third communication link,
    wherein the second communication link and a communication link for transmitting user-plane data from the base station to the user equipment can use different carrier frequencies simultaneously.

2. The network device of claim 1, wherein the user-plane data transmitted from the second communication circuit is received at the UE at the same time as the user-plane data transmitted from the BS.

3. A user equipment (UE) in a cellular telecommunication system, comprising:
    a first communication circuit that receives control-plane data and first user-plane data from a base station (BS) over a first communication link; and
    a second communication circuit that receives second user-plane data from a network device using a second communication link,
    wherein the first communication circuit receives a first control-plane message from the BS over the first communication link,
    wherein the second communication circuit establishes the second communication link at a request of the first control-plane message, and
    wherein the first communication link and the second communication link can use different carrier frequencies simultaneously.

4. The user equipment of claim 3, wherein the user equipment receives the first user-plane data and the second user-plane data simultaneously.

5. A base station (BS) for controlling a user equipment (UE) and a network device in a cellular telecommunications network, comprising:
- a first communication circuit that exchanges user-plane and control-plane data with the UE using a first communication link, and exchanges control-plane data with the network device using a second communication link; and
- a processor that controls an establishment and also a release/reconfiguration/handover of a third communication link, which is established between the UE and the network device, at a request of a first control-plane message transmitted to at least one of the UE and the network device using a respective one of the first and second communication links,
- wherein the control unit is further configured to identify user-plane data to be exchanged between the UE and the network device using the third communication link, and
- wherein the first communication link and the third communication link can use different carrier frequencies simultaneously.

6. The base station of claim 5, wherein the user plane data transmitted from the first communication circuit using a first communication link is received at the UE at the same time as the user plane data transmitted from the network device.

7. A method of communicating using a network device in a cellular telecommunication system, comprising:
- at the network device, receiving a first control-plane message from a base station (BS) over a first communication link;
- at the network device, establishing a second communication link at a request of the first control-plane message with a user equipment;
- at the network device, receiving downlink user-plane data from a server over a third communication link; and
- from the network device, transmitting the downlink user-plane data over the second communication link to the user equipment, and
- wherein the second communication link and a communication link for transmitting user-plane data from the base station to the user equipment can use different carrier frequencies simultaneously.

8. A method of communicating using a user equipment (UE) in a cellular telecommunication system, comprising:
- at the UE, receiving a first control-plane message and first user-plane data from a base station (BS) over a first communication link;
- at the UE, establishing a second communication link with a network device at a request of the first control-plane message;
- at the UE, receiving second user-plane data from the network device over the second communication link; and
- wherein the first communication link and the second communication link can use different carrier frequencies simultaneously.

9. A method of communicating using a base station (BS) for controlling a user equipment (UE) and a network device in a cellular telecommunication, comprising:
- at the BS, exchanging user-plane data and control-plane message with the UE using a first communication link and exchanging control-plane message with the network device using a second communication link;
- at the BS, controlling an establishment and also a release/reconfiguration/handover of a third communication link, which is established between the UE and the network device, at a request of a first control-plane message transmitted to at least one of the UE and the network device using the respective one of the first and second communication links; and
- at the BS, identifying user-plane data to be exchanged between the UE and the network device using the third communication link,
- wherein the network device receives the user-plane data from a server, and
- wherein the first communication link and the third communication link can use different carrier frequencies simultaneously.

* * * * *